(12) United States Patent
Chu

(10) Patent No.: US 12,479,564 B2
(45) Date of Patent: Nov. 25, 2025

(54) DOOR ASSEMBLY FOR A FUSELAGE OF AN AERIAL VEHICLE

(71) Applicant: Wei Keong Chu, Puchong (MY)

(72) Inventor: Wei Keong Chu, Puchong (MY)

( * ) Notice: Subject to any disclaimer, the term of this patent is extended or adjusted under 35 U.S.C. 154(b) by 80 days.

(21) Appl. No.: 18/539,743

(22) Filed: Dec. 14, 2023

(65) Prior Publication Data

US 2025/0196993 A1    Jun. 19, 2025

(51) Int. Cl.
*B64U 20/00* (2023.01)
*B64C 1/14* (2006.01)
*B64C 1/22* (2006.01)
*E05F 15/00* (2015.01)
*B64U 101/66* (2023.01)

(52) U.S. Cl.
CPC ............. *B64C 1/1415* (2013.01); *B64C 1/22* (2013.01); *B64U 20/00* (2023.01); *E05F 15/00* (2013.01); *B64U 2101/66* (2023.01); *E05Y 2201/624* (2013.01); *E05Y 2201/702* (2013.01); *E05Y 2201/704* (2013.01); *E05Y 2201/716* (2013.01); *E05Y 2201/722* (2013.01); *E05Y 2900/502* (2013.01)

(58) Field of Classification Search
CPC ..... B64C 1/1415; B64C 1/22; B64U 2101/66; E05Y 2900/502
See application file for complete search history.

(56) References Cited

U.S. PATENT DOCUMENTS

| | | | |
|---|---|---|---|
| 3,174,712 A * | 3/1965 | Ricard | B64C 1/1415 89/1.51 |
| 4,470,566 A | 9/1984 | Fitzgerald | |
| 5,335,880 A * | 8/1994 | Klug | B64C 1/1415 105/280 |
| 10,807,715 B2 | 10/2020 | Shannon | |
| 11,459,082 B2 * | 10/2022 | Pirklbauer | B64D 9/00 |
| 11,834,179 B1 * | 12/2023 | Albrecht | B64D 1/02 |
| 12,065,233 B2 * | 8/2024 | Wallenås | B64D 9/00 |
| 2011/0315822 A1 * | 12/2011 | Fairchild | E05F 15/652 244/129.5 |
| 2021/0123278 A1 * | 4/2021 | Chambers | E05D 15/248 |

* cited by examiner

*Primary Examiner* — Justin M Benedik
(74) *Attorney, Agent, or Firm* — Preston Smirman; SMIRMAN IP LAW, PLLC

(57) ABSTRACT

A door assembly for a fuselage of an aerial vehicle is described, including a pair of complementary door pieces, and an actuation mechanism that includes a first transmission member. The first transmission member actuates either one or both door pieces for portions thereof to be in a sliding action with respect to the fuselage while maintaining close conformity thereto as either one or both of them are actuated to either meet or separate. Further disclosed are various embodiments of the door assembly, and a related aerial vehicle and system for delivering goods.

19 Claims, 26 Drawing Sheets

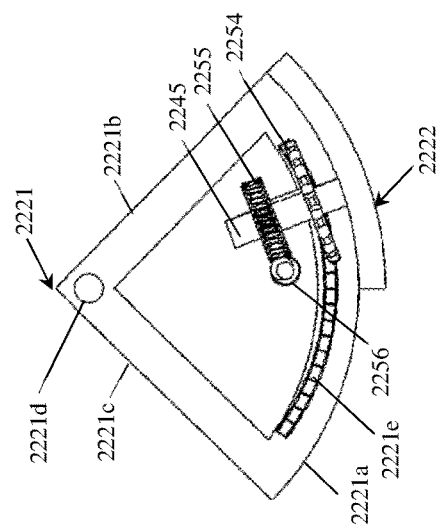
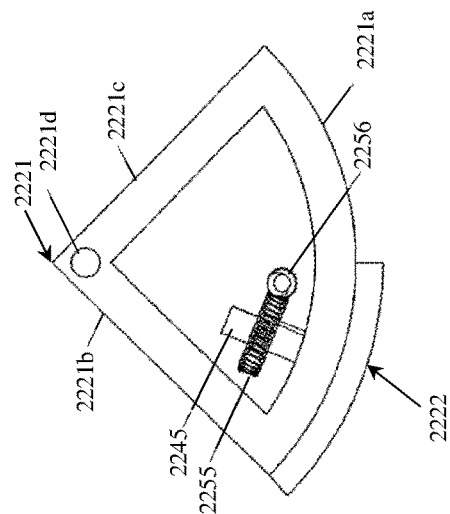
FIG. 29
FIG. 32
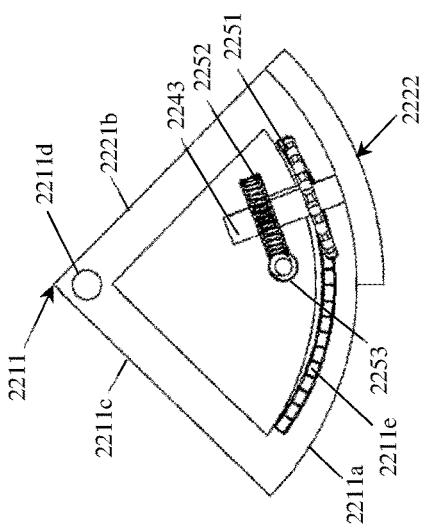
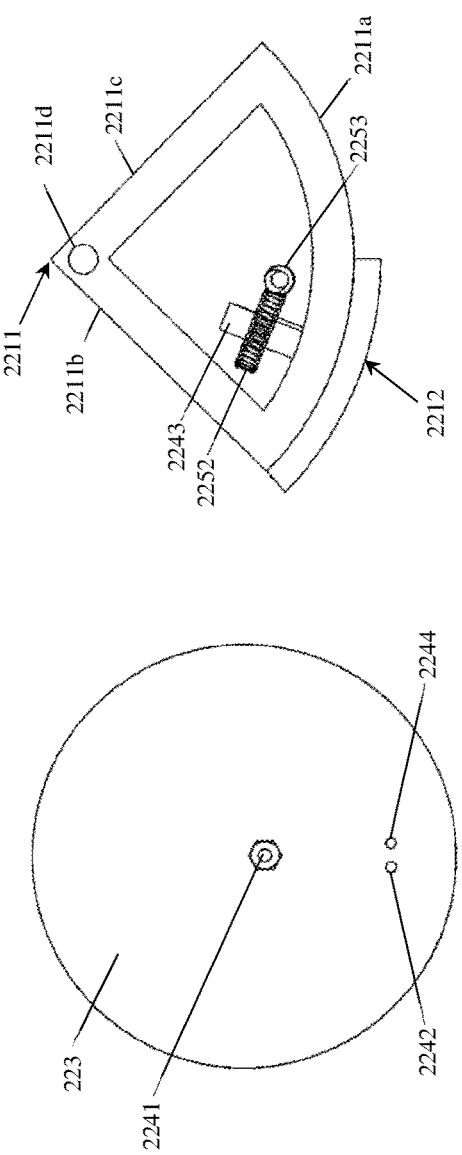
FIG. 30
FIG. 27
FIG. 28

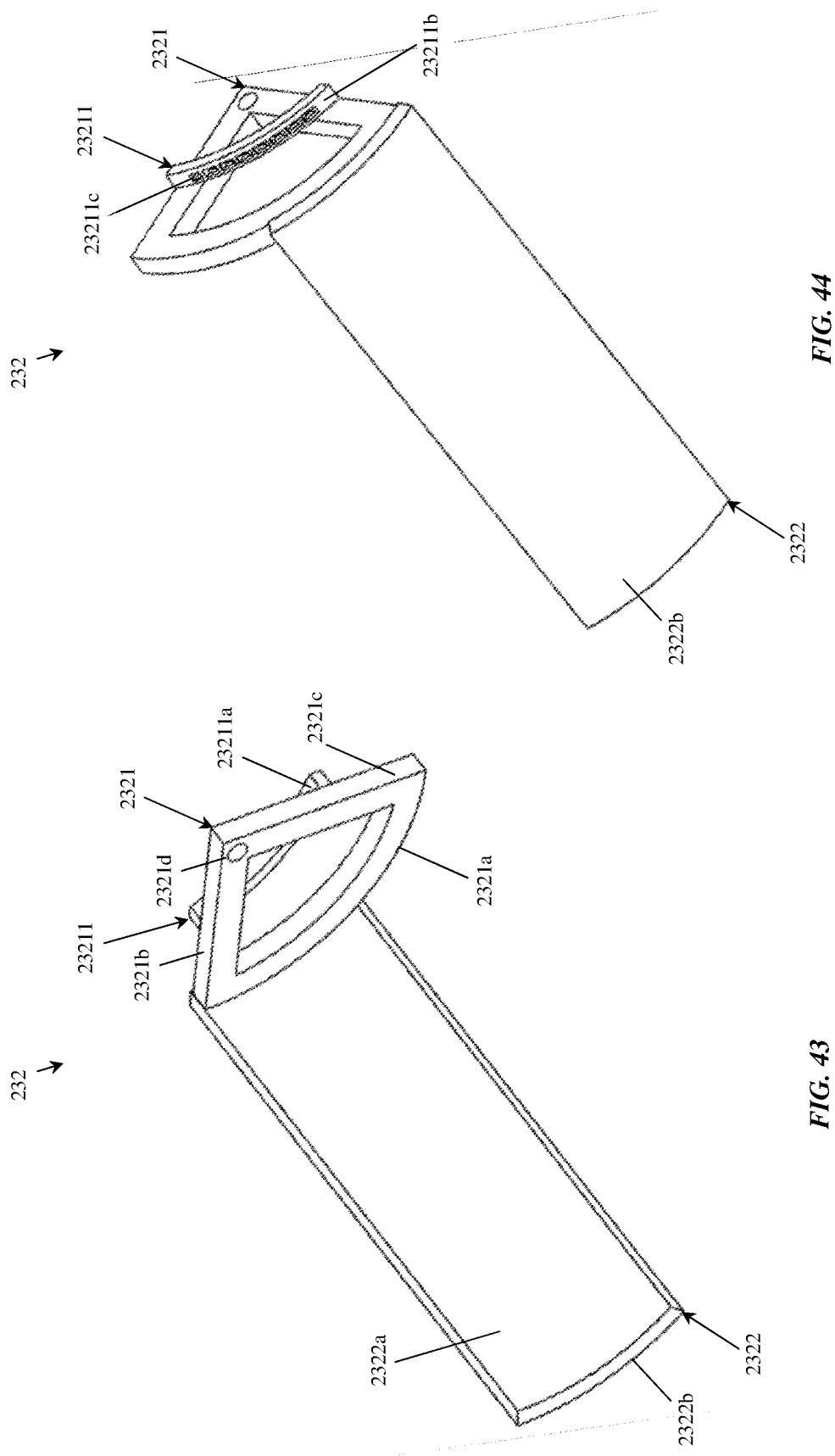

DOOR ASSEMBLY FOR A FUSELAGE OF AN AERIAL VEHICLE

FIELD OF THE INVENTION

The invention relates to a door assembly for aerial vehicles. More specifically, the invention relates to at least one door assembly for use within a fuselage of an aerial vehicle, to enable said aerial vehicle to perform pick-up, transport, and drop-off of delivery goods.

BACKGROUND OF THE INVENTION

Aerial vehicles, such as unmanned aerial vehicles (UAVs), have met increased use in recent years, and various attempts have been made for their deployment within the postal or delivery industry to carry out last-mile delivery or person-to-person delivery. Conventional aerial vehicles that carry out last-mile delivery or person-to-person delivery either (i) directly carry delivery goods externally for delivery to a single recipient, or (ii) carry an external receptacle that shall contain delivery goods for delivery to a single recipient.

However, it is to be noted that conventional aerial vehicles that carry out last-mile delivery or person-to-person delivery exhibit various disadvantages.

Firstly, conventional aerial vehicles may have poor aerodynamic performance since the delivery goods and/or the receptacle may have a non-aerodynamic shape. This increases the drag and/or turbulence experienced by the aerial vehicle. Furthermore, such means to carry out last-mile delivery or person-to-person delivery severely limits the range and payload capacity of the aerial vehicle.

Secondly, the detachability of the delivery goods or the external receptacle from the conventional aerial vehicles presents a security concern as the delivery goods or the external receptacle may become detached from them during transportation. Also, the aerial vehicle may be susceptible to thievery as it travels to the recipient for drop-off of the delivery goods.

Thirdly, conventional aerial vehicles do not support direct pick-up or drop-off of delivery goods in an automated manner, as there is still manual involvement in loading the delivery goods onto them. In some cases, users such as senders are required to manually re-attach the delivery goods and/or the external receptacle of the aerial vehicle to complete the pick-up. Furthermore, users such as recipients are required to manually interact with the aerial vehicle after receiving their delivery goods, which may involve closing a hatch of the aerial vehicle, or re-attaching the external receptacle to the aerial vehicle.

Fourthly, conventional aerial vehicles do not support pick-up and delivery of delivery goods at multiple locations in a secure manner. More specifically, they are not configured with means to carry a plurality of delivery goods that may be segregated based on their intended recipients, and are thus unable to carry out last-mile delivery or person-to-person delivery to multiple recipients along a flight path.

Among prior arts that may relate to aerial vehicles that carry out last-mile delivery or person-to-person delivery but suffer from the aforementioned issues include the U.S. Pat. No. 10,807,715B2, which discloses an aerial vehicle in the form of a UAV equipped with a retriever that retrieves an apparatus having delivery goods. The apparatus is to be secured, lifted, and delivered by the UAV. After delivery, the retriever retrieves the apparatus so that the UAV can be loaded with delivery goods at a different site.

Among prior arts that may relate to door assemblies for aerial vehicles such as include the U.S. Pat. No. 4,470,566A, which discloses a canopy-type door for a fuselage of an aerial vehicle, more specifically, a freight aircraft. However, it is evident that the door assembly as presented in this prior art requires a large clearance and is not load-bearing members. Notably, for aerial vehicles that are intended to carry out last-mile delivery or person-to-person delivery, budget and space are at a premium. Hence, the configurations for a door assembly taught by the aforementioned prior art are inherently unsuitable for aerial vehicles that carry out last-mile delivery or person-to-person delivery.

Accordingly, it would be desirable to have a door assembly for an aerial vehicle that performs last-mile delivery or person-to-person delivery, which shall enable the aerial vehicle to be capable of (i) performing pick-up of delivery goods in an automated manner, (ii) accommodating a plurality of delivery goods therewithin in a secure manner, and (iii) travelling across one or more locations to drop-off delivery goods to corresponding recipients in an automated manner.

SUMMARY OF THE INVENTION

The main objective of the invention is to provide at least one door assembly for a fuselage of an aerial vehicle that preferably carries out last-mile delivery or person-to-person delivery. The door assembly is to substantially enable the aerial vehicle to perform pick-up, transport, and delivery of delivery goods. To achieve this objective, the door assembly is made to have complementary door pieces that are actuated by a transmission member so that it performs pick-up, transport, and delivery of delivery goods.

Advantageously, the door assembly provided by the present invention shall enable an aerial vehicle to be capable of securing delivery goods within itself until it drops off the said delivery goods to a designated recipient. With this, the aerial vehicle would be able to protect the delivery goods therewithin from the external environment. Furthermore, the delivery goods are prevented from being seen or known by other parties during their delivery. Additionally, accidental receipt of delivery goods by an unintended recipient shall be avoided.

The present invention intends to provide a door assembly for a fuselage of an aerial vehicle, comprising a pair of complementary door pieces, and an actuation mechanism that includes a first transmission member. The first transmission member actuates either one or both door pieces for portions thereof to be in a sliding action with respect to the fuselage while maintaining close conformity thereto as either one or both of them are actuated to either meet or separate.

Preferably, the actuation mechanism enables the door pieces to counter-rotate for the door pieces to scoop staged delivery goods, so that the delivery goods are supported thereon them, as they are actuated to meet, and the door pieces to release the delivery goods supported thereon, as they are actuated to separate.

Preferably, the door pieces comprise a first door piece that includes a first frame and a first panel, and a second door piece that includes a second frame and a second panel.

Preferably, the first door piece is formed by an arc periphery of the first frame being joined to a concave portion of the first panel laterally at a first end of the first panel, and the second door piece is formed by an arc periphery of the second frame being joined to a concave portion of the second panel laterally near a first end of the second panel.

Preferably, the first frame further comprises a serrated surface profile that is formed a distance away from its arc periphery and facing away from the first end of the first panel, and the second frame further comprises a serrated surface profile that is formed a distance away from its arc periphery and facing towards the first end of the second panel.

Preferably, the actuation mechanism further comprises a second transmission member and a third transmission member located between the first frame and the second frame, a first support member in which the first frame and the second frame are hinged thereto, and a second support member and a third support member located between the first frame and the second frame.

Preferably, the second support member is parallel to the first support member, and is mounted with the third transmission member, and the third support member is parallel to a surface normal of both panels of the door pieces, and is mounted with the first transmission member and second transmission member. The third transmission member is engaged with the second transmission member, and the first transmission member is engaged to the serrated surface profiles of both frames of the door pieces. A rotation by the third transmission member is to be transferred to the second transmission member to cause the first transmission member to actuate both door pieces to rotate with respect to the first support member for them to meet or separate.

Preferably, the plurality of transmission members further comprises a fourth transmission member, a fifth transmission member, and a sixth transmission member located between the first frame and the second frame, and a fourth support member and a fifth support member located between the first frame and the second frame.

Preferably, the second support member is parallel to the first support member, and is mounted with the third transmission member, the third support member is parallel to a surface normal of the first panel, and is mounted with the first transmission member and second transmission member, the fourth support member is parallel to the first support member, and is mounted with the sixth transmission member, and the third support member is parallel to a surface normal of the second panel, and is mounted with the fourth transmission member and fifth transmission member. The third transmission member is engaged to the second transmission member, the first transmission member is engaged to the serrated surface profile of the first frame, the sixth transmission member is engaged to the fifth transmission member, and the fourth transmission member is engaged to the serrated surface profile of the second frame. A rotation by the third transmission member or sixth transmission member to be transferred to the second transmission member or the fourth transmission member to cause the first transmission member to actuate the first door piece to rotate with respect to the first support member, or the fourth transmission member to actuate the second door piece to rotate with respect to the first support member, for the door pieces to meet or separate.

Preferably, the first door piece is formed by an arc periphery of the first frame being joined to a concave portion of the first panel laterally at a first end of the first panel, and the second door piece is formed by an arc periphery of the second frame being joined to a concave portion of the laterally at a first end of the second panel.

Preferably, the first panel further comprises a serrated surface profile that is formed at a distance away from its first end, and the second frame further comprises an arcuate member at a distance away from its arc periphery and facing towards the first end of the second panel, with the arcuate member having a serrated surface profile. The arcuate member is positioned above the serrated surface profile of the second panel for the serrated surface profile of the arcuate member to be aligned thereto.

Preferably, the actuation mechanism further comprises a first support member in which the first frame and the second frame are hinged thereto, and a second support member located between the first frame and the second frame.

Preferably, the second support member is parallel to the first support member, and is mounted with the first transmission member, with the first transmission member being engaged to both the serrated surface profile of the first panel and the serrated surface profile of the arcuate member. A rotation by the first transmission member is to actuate both door pieces to rotate with respect to the first support member for them to meet or separate.

Preferably, the first panel further comprises a serrated surface profile that is formed at a distance away from its first end, and the second panel further comprises a serrated surface profile that is formed at a distance away from its first end.

Preferably, the actuation mechanism further comprises a second transmission member located between the first frame and the second frame, a first support member in which the first frame and the second frame are hinged thereto, and a second support member and a third support member located between the first frame and the second frame.

Preferably, the second support member is parallel to the first support member, and is mounted with the first transmission member, and the third support member is parallel to the first support member, and is mounted with the second transmission member. The first transmission member is engaged to the serrated surface profile of the first panel, and the second transmission member is engaged to the serrated surface profile of the second panel. A rotation by the first transmission member or the second transmission member actuates the first door piece to rotate with respect to the first support member, or the second door piece to rotate with respect to the first support member, for the door pieces to meet or separate.

Preferably, the first frame has a first radial periphery and a second radial periphery, and the second frame has a first radial periphery and a second radial periphery.

Preferably, the first frame and the second frame have an angle formed therebetween as the door pieces are actuated to either meet or separate, with the angle being formed between the first radial periphery of the first frame and the second radial periphery of the second frame, or being formed between the second radial periphery of the first frame and the first radial periphery of the second frame.

The present invention further intends to provide an aerial vehicle comprising a fuselage formed with at least one access portion, and at least one door assembly that corresponds to the access portion that enables opening or closing of the access portion, comprising a pair of complementary door pieces, and an actuation mechanism that includes a first transmission member. The first transmission member actuates either one or both door pieces to counter-rotate for portions thereof to be in a sliding action with respect to the fuselage while maintaining close conformity thereto as either one or both of them are actuated to either meet or separate so that the door pieces scoop staged delivery goods, for the delivery goods to be supported thereon them and enter the fuselage through the access portion, as they are actuated to meet, and the door pieces release the delivery goods supported thereon from the fuselage as they are actuated to separate.

The present invention further intends to provide a system for delivering goods, comprising an aerial vehicle that comprises a fuselage formed with at least one access portion, and at least one door assembly that corresponds to the access portion that enables opening or closing of the access portion, comprising a pair of complementary door pieces, and an actuation mechanism that includes a first transmission member. The first transmission member actuates either one or both door pieces to counter-rotate for portions thereof to be in a sliding action with respect to the fuselage while maintaining close conformity thereto as either one or both of them are actuated to either meet or separate so that the door pieces scoop staged delivery goods, for the delivery goods to be supported thereon them and enter the fuselage through the access portion, as they are actuated to meet, and the door pieces release the delivery goods supported thereon from the fuselage as they are actuated to separate.

The present invention further intends to provide a fuselage, for an aerial vehicle, which is formed with at least one access portion, with an opening or closing of the access portion being enabled by a corresponding door assembly of the access portion, the door assembly comprising a pair of complementary door pieces, and an actuation mechanism that includes a first transmission member. The first transmission member actuates either one or both door pieces to counter-rotate for portions thereof to be in a sliding action with respect to the fuselage while maintaining close conformity thereto as either one or both of them are actuated to either meet or separate so that the door pieces scoop staged delivery goods, for the delivery goods to be supported thereon them and enter the fuselage through the access portion, as they are actuated to meet, and the door pieces release the delivery goods supported thereon from the fuselage as they are actuated to separate.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

To facilitate an understanding of the invention, there is illustrated in the accompanying drawings the preferred embodiments from an inspection of which when considered in connection with the following description, the invention, its construction and operation and many of its advantages would be readily understood and appreciated.

FIG. 27 is a diagram illustrating a rear view of the door assembly of the second example embodiment as shown in FIG. 22.

FIG. 28 is a diagram illustrating a front view of the door assembly of the second example embodiment as shown in FIG. 22, when it is in a close state.

FIG. 29 is a diagram illustrating a rear view of the first door piece of the door assembly of the second example embodiment as shown in FIG. 22, together with the support members and transmission members.

FIG. 30 is a diagram illustrating a front view of the first door piece of the door assembly of the second example embodiment as shown in FIG. 22, together with the support members and transmission members.

FIG. 31 is a diagram illustrating a rear view of the second door piece of the door assembly of the second example embodiment as shown in FIG. 22, together with the support members and transmission members.

FIG. 32 is a diagram illustrating a front view of the second door piece of the door assembly of the second example embodiment as shown in FIG. 22, together with the support members and transmission members.

FIG. 43 is a diagram illustrating a perspective top view of the second door piece of the door assembly of the third example embodiment as shown in FIG. 35.

FIG. 44 is a diagram illustrating a perspective bottom view of the second door piece of the door assembly of the third example embodiment as shown in FIG. 35.

DETAILED DESCRIPTION OF THE INVENTION

Figure 1:
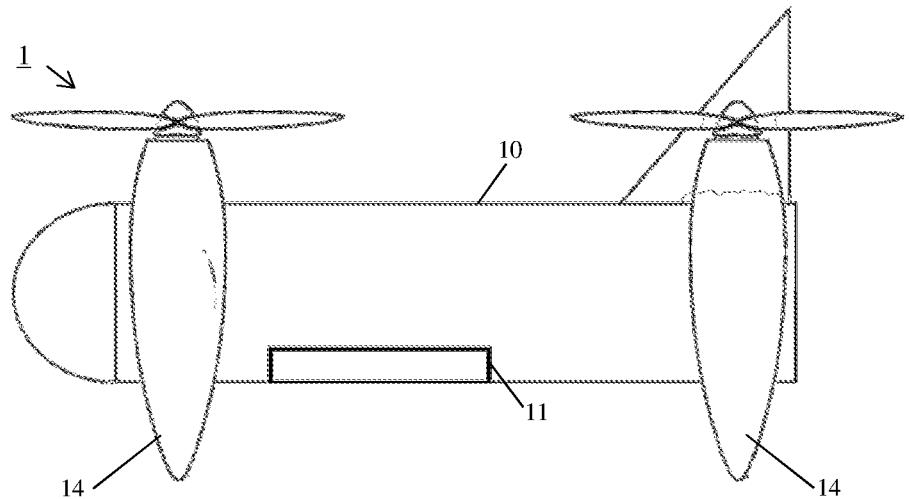
FIG. 1 is a diagram illustrating a side view of a preferred aerial vehicle in which the door assembly of the present invention is installed therewithin.

The present invention relates to a door assembly for aerial vehicles that enables said vehicles to perform any one or a combination of a pick-up operation, a transportation operation, and a drop-off operation. The door assembly may further secure delivery goods within the body of the aerial vehicle. There is further provided a system for delivering goods involving an aerial vehicle having at least one door assembly of the present invention.

According to the concept of the invention, the door assembly is to act as (i) a hatch of the aerial vehicle for delivery goods to enter or exit the body of the aerial vehicle, (ii) a collector of goods to perform a pick-up operation via a scooping or dredging action, and (iii) a platform that securely supports the delivery goods as the aerial vehicle travels across one or more locations to drop-off delivery goods to corresponding recipients. It is to be noted that the invention may also be presented in a number of different embodiments with common elements.

From here on, it should be noted that the aerial vehicles in which the door assembly is to be used therein are preferably pilotless aircrafts that may include, but shall not be limited to, unmanned aerial vehicles (UAVs), drones (remote-controlled or autonomous), or the like. Most preferably, the aerial vehicles in which the door assembly is to be used therein are capable of carrying out last-mile delivery or person-to-person delivery. However, it is to be noted the applicability of the door assembly may further extend to other kinds of aerial vehicles such as piloted aircrafts, or the like.

From here on, it should be noted that the aerial vehicles may further be capable of performing vertical take-off and landing (VTOL) operations. By way of example, the aerial vehicle may be equipped with tilt-wing assemblies that allow it to orient its direction of propulsion during its lift-off, travel, and landing. However, it is to be noted that the aerial vehicles may also not be limited to performing VTOL operations, and they may, by way of example, be capable of performing conventional take-off & landing (CTOL) operations, short take-off & vertical landing (STOL) operations, short take-off & vertical landing (STOVL) operations, vertical or short take-off & landing (V/STOL) operations, or the like.

The invention will now be described in greater detail, by way of example, with reference to the figures. For ease of reference, common reference numerals or series of numerals will be used throughout the figures when referring to the same or similar features common to the figures.

Figure 2:
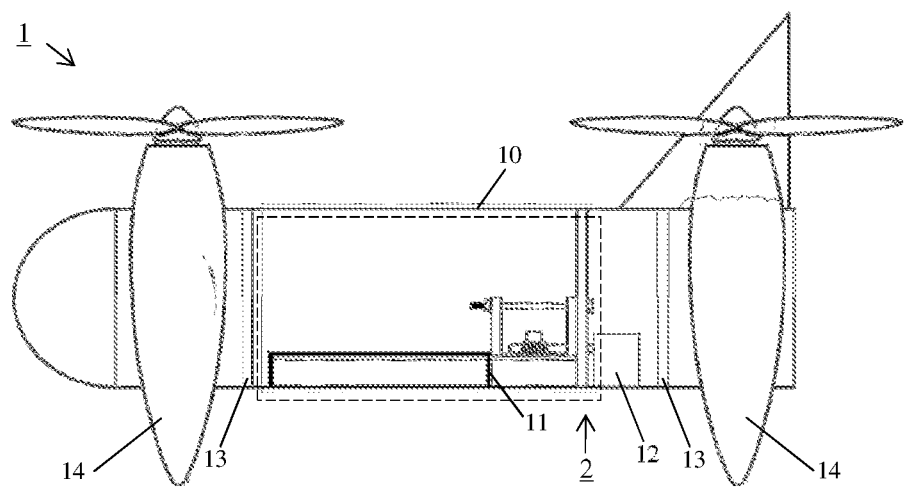
FIG. 2 is a diagram illustrating a side view of a preferred aerial vehicle that further illustrates the door assembly of the present invention is installed therewithin.
Figure 4:
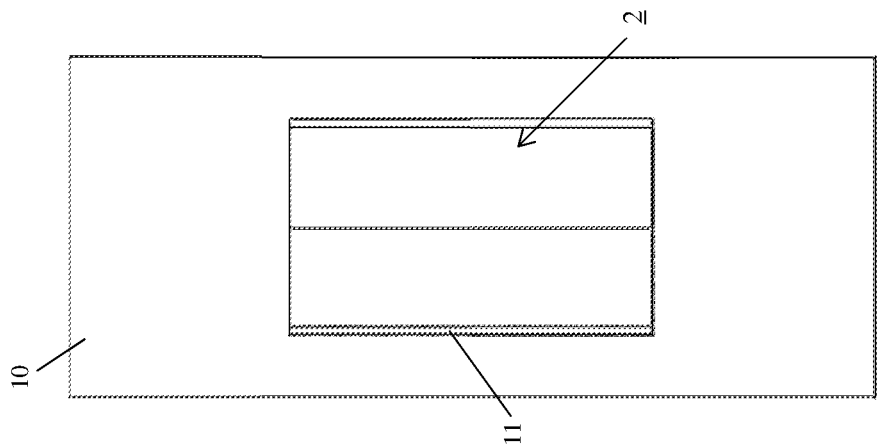
FIG. 4 is a diagram illustrating a bottom view of the preferred aerial vehicle in which the door assembly of the present invention is installed therewithin.
Figure 3:
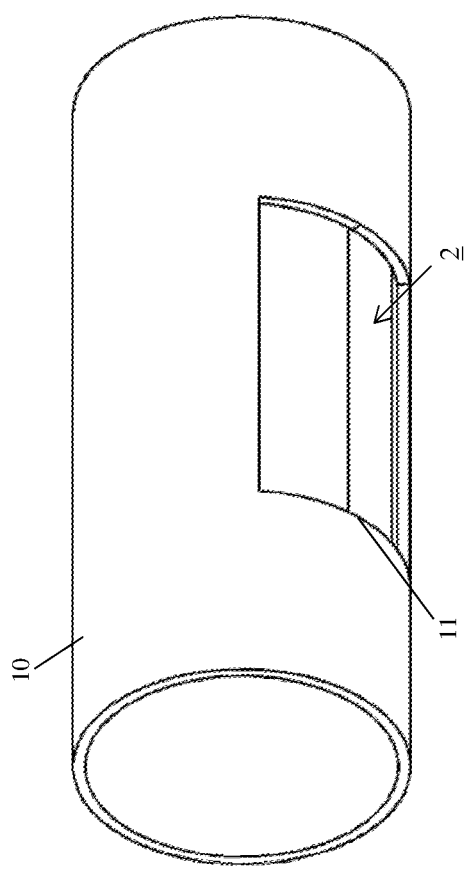
FIG. 3 is a diagram illustrating a perspective bottom view of the preferred aerial vehicle in which the door assembly of the present invention is installed therewithin.

FIGS. 1-4 are depictions of a preferred aerial vehicle 1 and a door assembly 2 as provided by the present invention. In particular, FIG. 1 illustrates a side view of the aerial vehicle 1. FIG. 2 also illustrates a side view of the aerial vehicle 1, but further depicts the door assembly 2 installed therewithin. FIG. 3 illustrates a perspective bottom view of the aerial vehicle 1. FIG. 4 illustrates a bottom view of the aerial vehicle 1.

Preferably, the aerial vehicle 1 is a UAV capable of performing VTOL operations, but it may be any other form of vehicles capable of flight with capabilities as previously described.

As shown in FIGS. 1-4, the aerial vehicle 1 has a body 10 that is formed with at least one cut-out 11. The body 10 is preferably a fuselage of the aerial vehicle 1, and the cut-out 11 preferably defines an access portion of the aerial vehicle 1. In particular, the body 10 is substantially cylindrical; hence, the cut-out 11 has a substantial degree of curvature. The cut-out 11 preferably has a quadrilateral shape, but it may be of any other permissible shape.

As shown in FIGS. 1-4, the aerial vehicle 1 has at least one door assembly 2 that is preferably positioned to be adjacent to the cut-out 11. Preferably, the door assembly 2 is to substantially conform to body 10; hence, its components may be configured to have a substantial degree of curvature as well.

From here on, the body 10 of the aerial vehicle 1 may also be referred to as the fuselage 10 of the aerial vehicle 1. Moreover, the cut-out 11 of the aerial vehicle 1 may also be referred to as the access portion 11 of the aerial vehicle 1.

As shown in FIGS. 1-4, there is further at least one driving unit 12 within the aerial vehicle 1 that serves to provide a force or forces to the door assembly 2 for it to perform its related operations.

As shown in FIGS. 1-4, there may be provided one or more partitions 13 within the aerial vehicle 1 that serves to define a compartment within the aerial vehicle 1 which corresponds to the said door assembly 2.

As shown in FIGS. 1-4, the aerial vehicle 1 may be further included with tilt-wing assemblies 14 that shall enable the aerial vehicle 1 to capable of performing vertical take-off and landing (VTOL) operations.

FIGS. 5-21 are depictions of the door assembly 2 in a first example embodiment 21, which shall henceforth be directly referred as the "first example embodiment."

Figure 5:
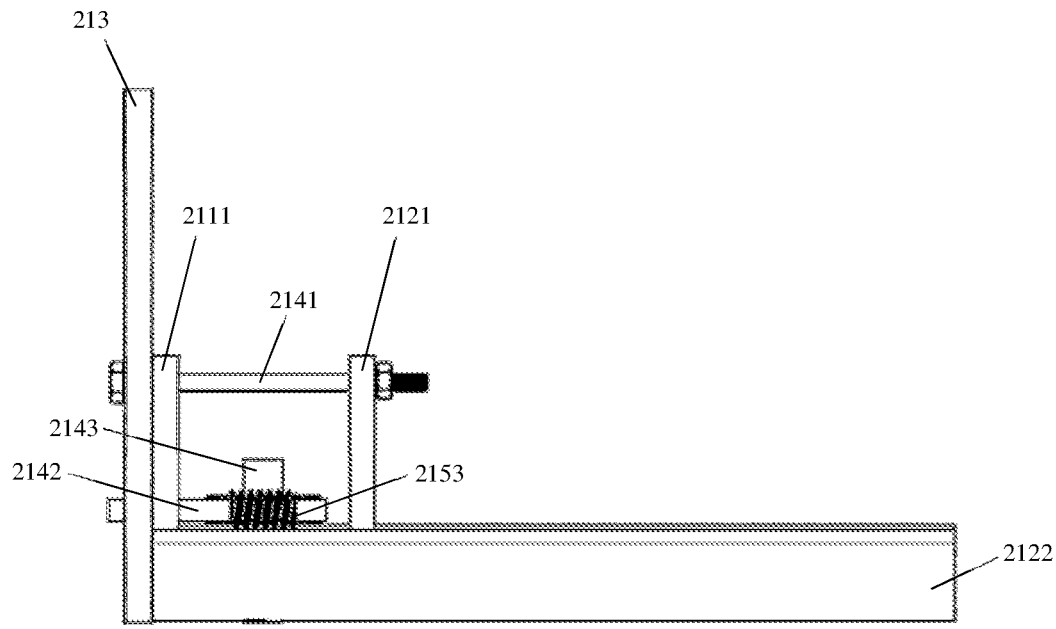
FIG. 5 is a diagram illustrating a side view of the door assembly, as provided by the present invention, in a first example embodiment.
Figure 6:
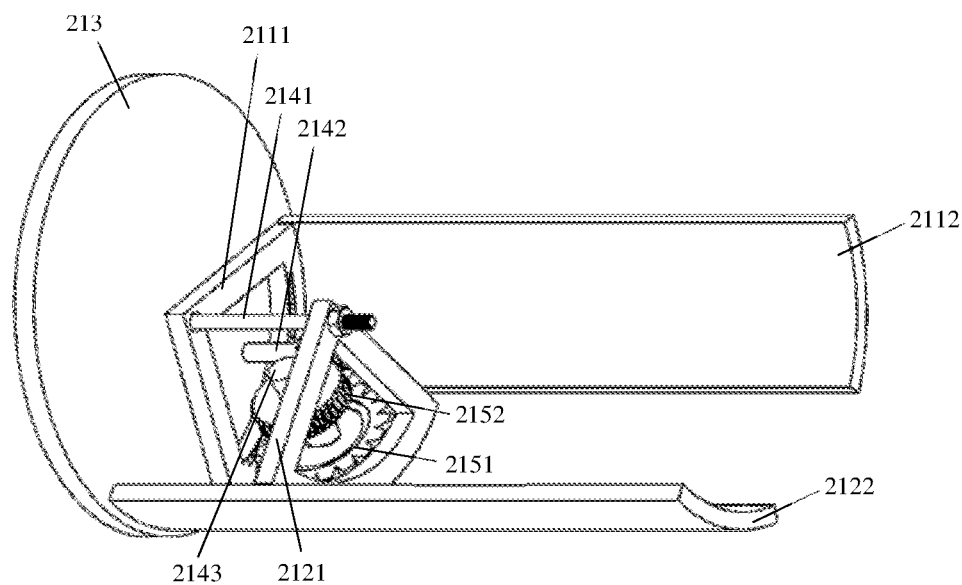
FIG. 6 is a diagram illustrating a perspective view of the door assembly, as provided by the present invention, in the first example embodiment.

In particular, FIG. 5 illustrates a side view of this first example embodiment 21, and FIG. 6 a perspective view of this first example embodiment 21.

Figure 9:
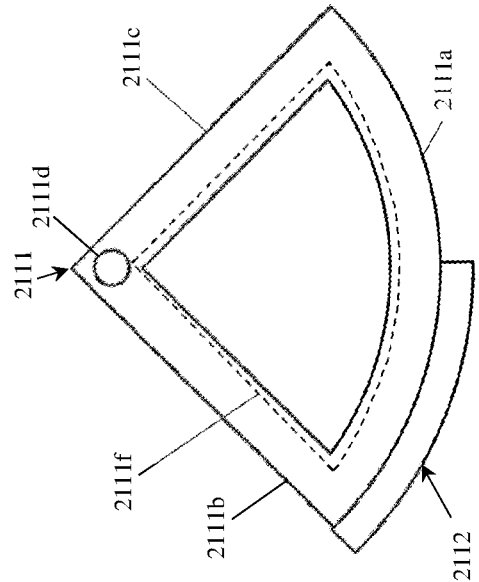
FIG. 9 is a diagram illustrating a rear view of the first door piece of the door assembly of the first example embodiment as shown in FIGS. 5-6.
Figure 10:
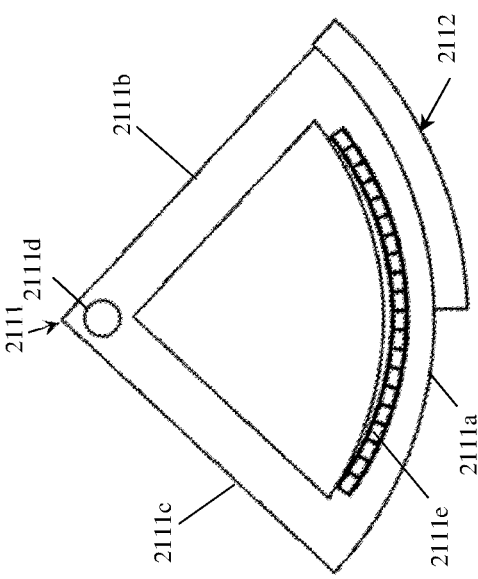
FIG. 10 is a diagram illustrating a front view of the first door piece of the door assembly of the first example embodiment as shown in FIGS. 5-6.
Figure 8:
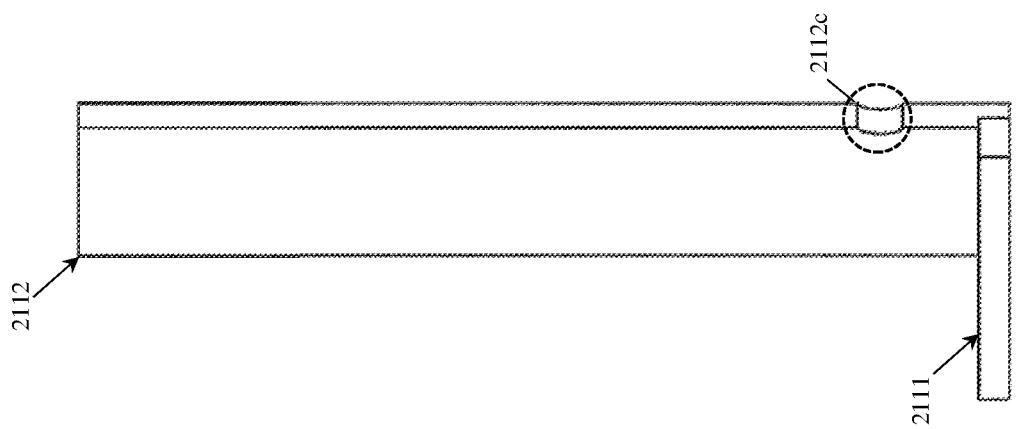
FIG. 8 is a diagram illustrating a side view of the first door piece of the door assembly of the first example embodiment as shown in FIGS. 5-6.
Figure 7:
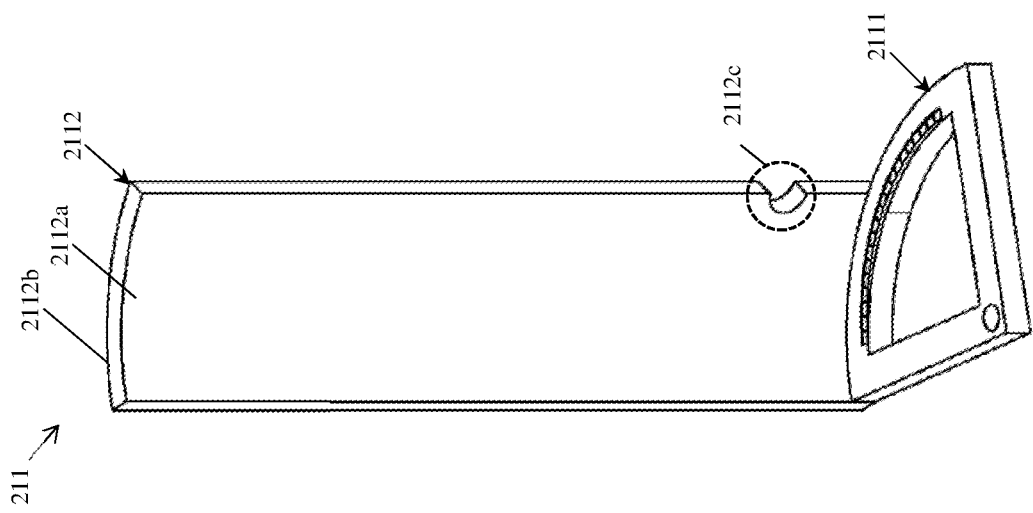
FIG. 7 is a diagram illustrating a perspective view of a first door piece of the door assembly of the first example embodiment as shown in FIGS. 5-6.

In particular, FIGS. 7-10 illustrates a first door piece 211 of the first example embodiment 21. More specifically, FIG. 7 illustrates its perspective view, FIG. 8 illustrates its side view, FIG. 9 illustrates its rear view, and FIG. 10 illustrates its front view.

Figure 13:
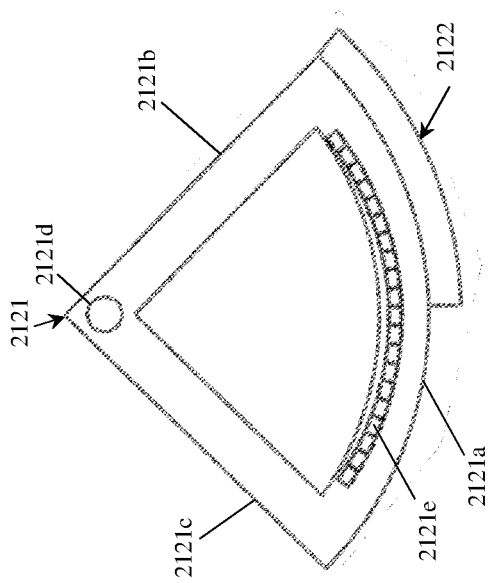
FIG. 13 is a diagram illustrating a rear view of the second door piece of the door assembly of the first example embodiment as shown in FIGS. 5-6.
Figure 14:
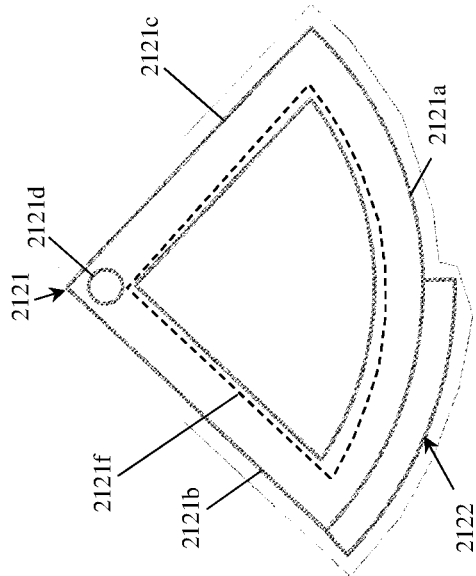
FIG. 14 is a diagram illustrating a front view of the second door piece of the door assembly of the first example embodiment as shown in FIGS. 5-6.
Figure 12:
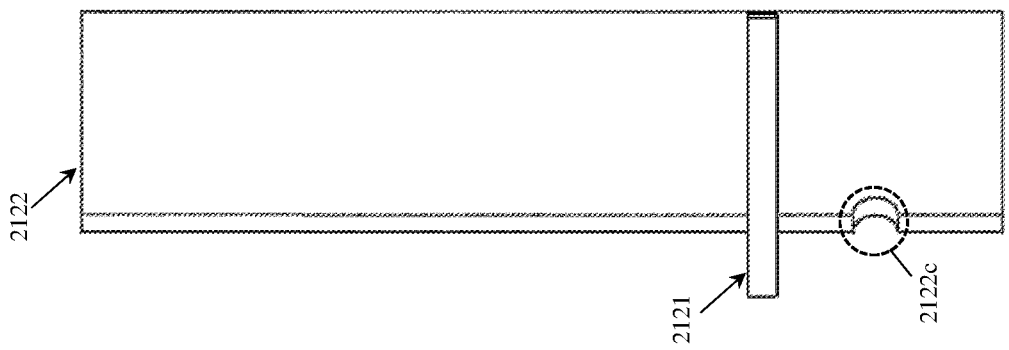
FIG. 12 is a diagram illustrating a side view of the second door piece of the door assembly of the first example embodiment as shown in FIGS. 5-6.
Figure 11:
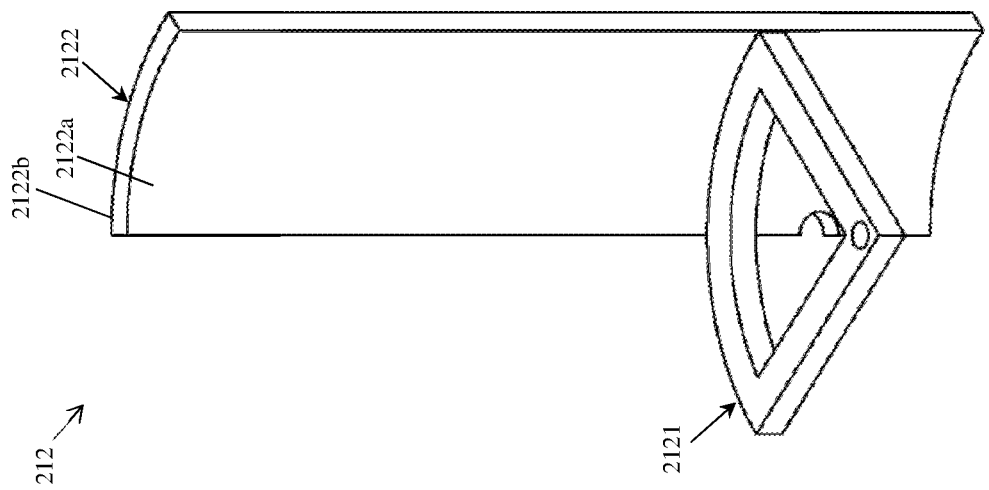
FIG. 11 is a diagram illustrating a perspective view of a second door piece of the door assembly of the first example embodiment as shown in FIGS. 5-6.

In particular, FIGS. 11-14 illustrate a second door piece 212 of the first example embodiment 21. More specifically, FIG. 11 illustrates its perspective view, FIG. 12 illustrates its side view, FIG. 13 illustrates its rear view, and FIG. 14 illustrates its front view.

Figure 16:
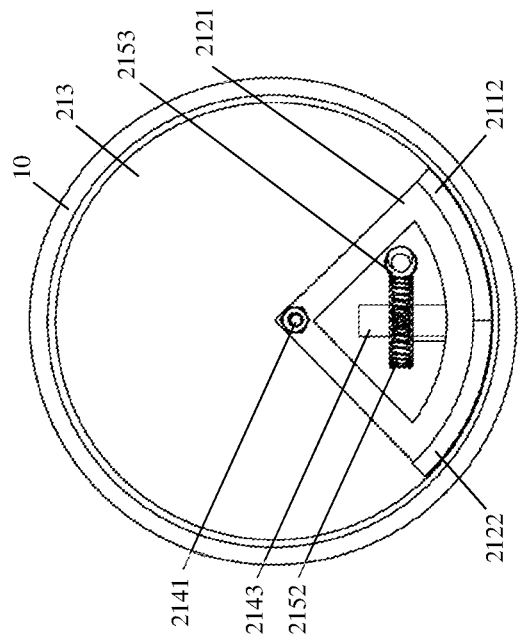
FIG. 16 is a diagram illustrating a front view of the door assembly of the first example embodiment as shown in FIGS. 5-6, when it is in a close state.
Figure 17:
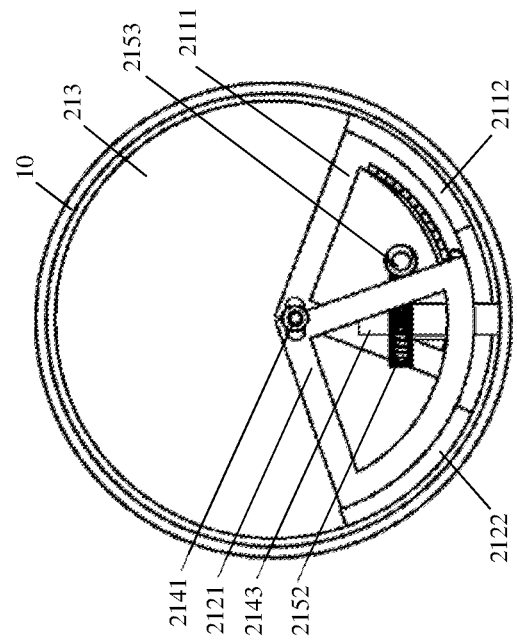
FIG. 17 is a diagram illustrating a front view of the door assembly of the first example embodiment as shown in FIGS. 5-6, when it is in an open state.
Figure 15:
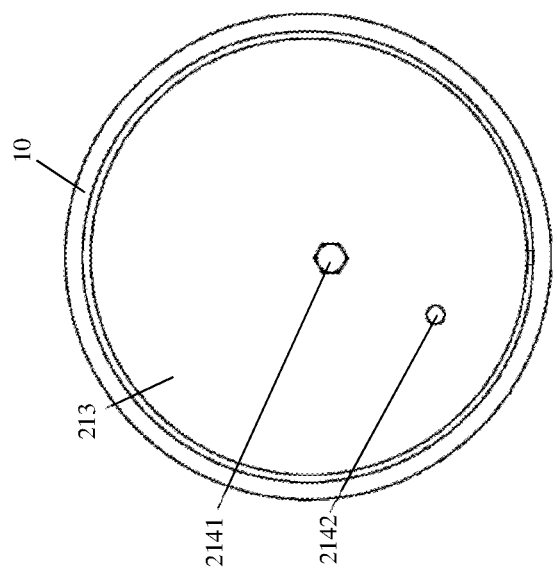
FIG. 15 is a diagram illustrating a rear view of the door assembly of the first example embodiment as shown in FIGS. 5-6.

In particular, FIGS. 15-17 illustrate rear and front views of the first example embodiment 21. More specifically, FIG. 15 illustrates its rear view, FIG. 16 illustrates its front view when it is in a close state, and FIG. 17 illustrates its front view when it is in an open state.

Figure 19:
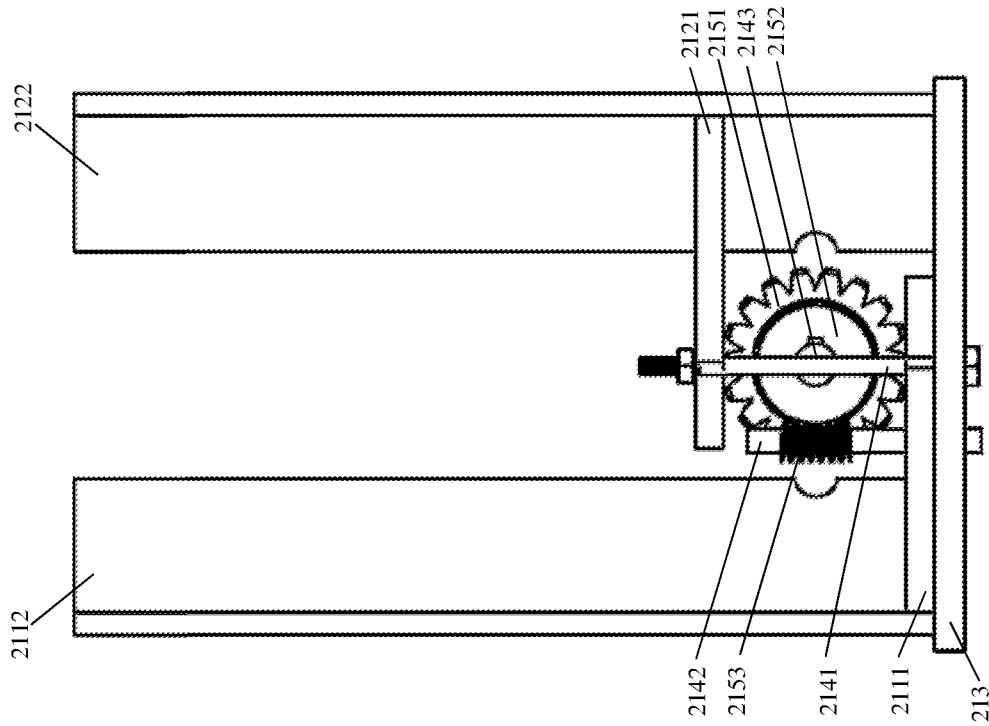
FIG. 19 is a diagram illustrating a top view of the door assembly of the first example embodiment as shown in FIGS. 5-6, when it is in an open state.
Figure 18:
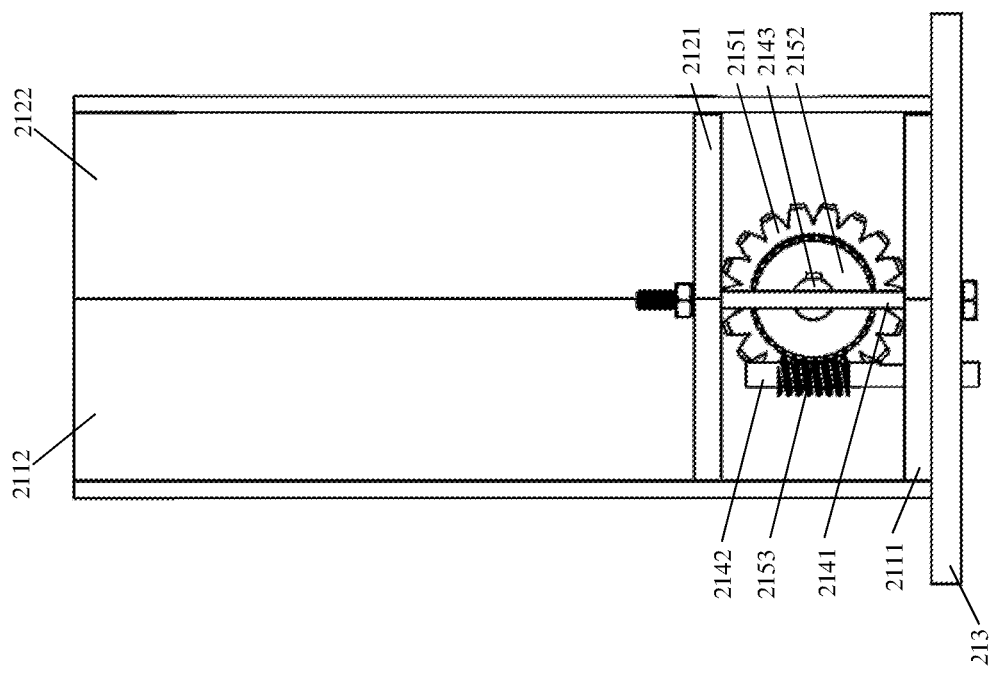
FIG. 18 is a diagram illustrating a top view of the door assembly of the first example embodiment as shown in FIGS. 5-6, when it is in a close state.

In particular, FIGS. 18-19 illustrate top views of the first example embodiment 21. More specifically, FIG. 18 its top view when it is in a close state, and FIG. 19 illustrates its top view when it is in an open state.

Figure 21:
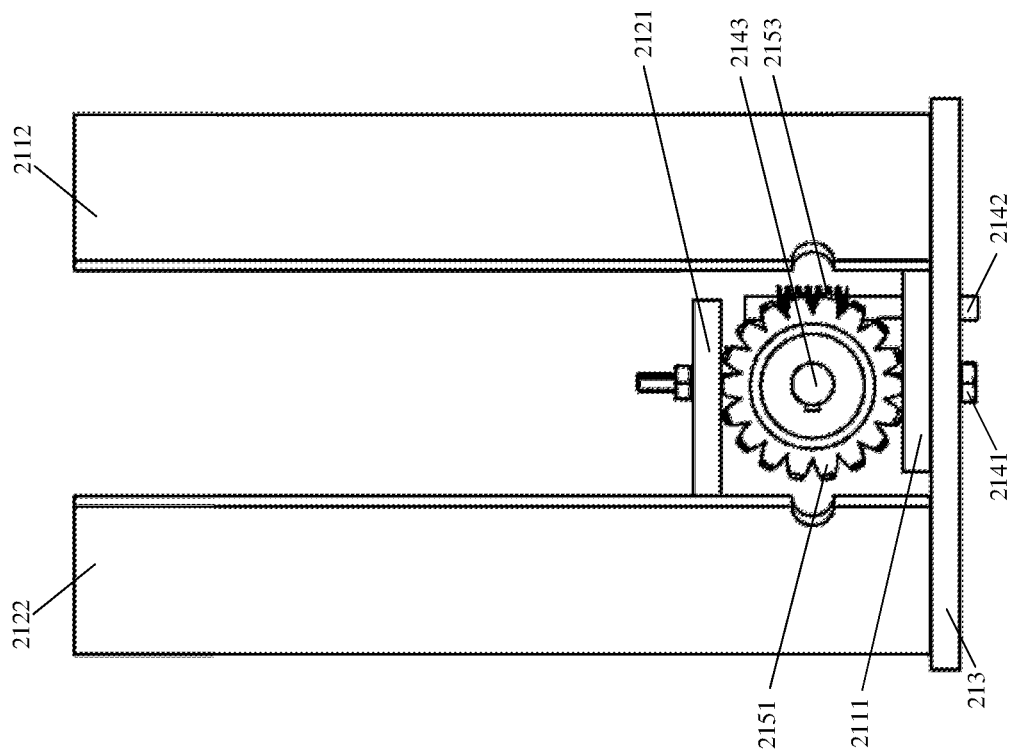
FIG. 21 is a diagram illustrating a bottom view of the door assembly of the first example embodiment as shown in FIGS. 5-6, when it is in an open state.
Figure 20:
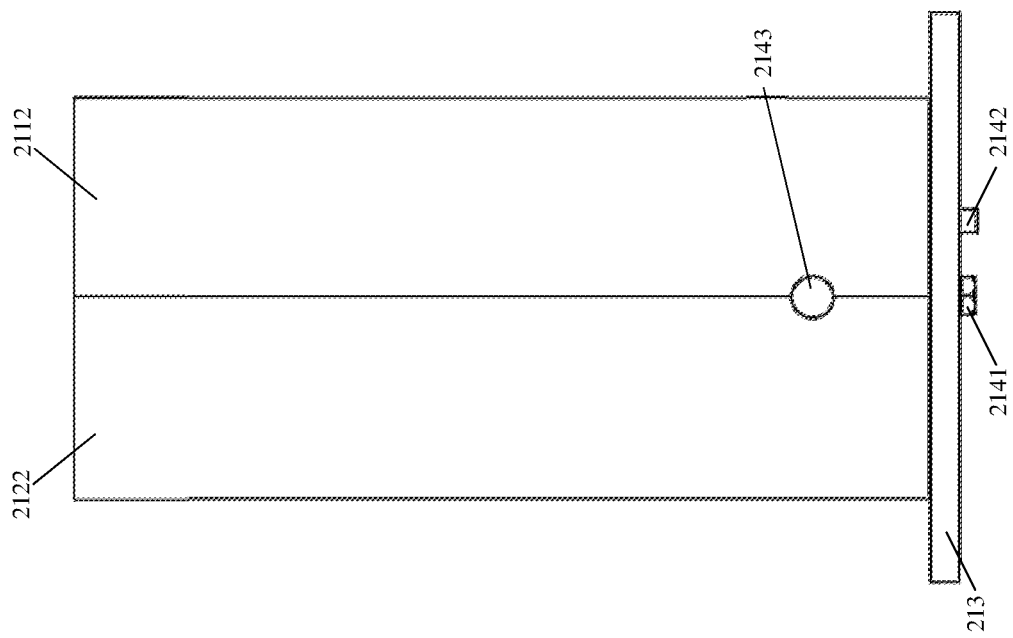
FIG. 20 is a diagram illustrating a bottom view of the door assembly of the first example embodiment as shown in FIGS. 5-6, when it is in a close state.

In particular, FIGS. 20-21 illustrate bottom views of the first example embodiment 21. More specifically, FIG. 20 its bottom view when it is in a close state, and FIG. 21 illustrates its bottom view when it is in an open state.

The first example embodiment 21 shall now be described based on FIGS. 5-21.

The first example embodiment 21 at least comprises a first door piece 211, a second door piece 212, and a plate piece 213 in which the first door piece 211 and the second door piece 212 is in substantial connection thereto. Furthermore, for this first example embodiment 21 to operate accordingly, it further comprises a plurality of support members, and a plurality of transmission members. These support members and transmission members may enable the first example embodiment 21 is be included with one gear train, which actuates the first door piece 211 and the second door piece 212.

Within the first example embodiment 21, its first door piece 211 comprises a first frame 2111 and first panel 2112, which are preferably joined together as a single unit.

The first frame 2111 is a structure that is shaped to conform to the lateral cross-section of fuselage 10 of the aerial vehicle 1. Accordingly, the first frame 2111 may be a structure having a substantially has a semi-circular or hemi-circular outline that includes an arc periphery 2111a, and radial peripheries that include a first radial periphery 2111b and a second radial periphery 2111c.

The first panel 2112 is an elongated structure that is also preferably shaped to conform to the inner walls of the fuselage 10 of the aerial vehicle 1. Accordingly. the first panel 2112 may be a structure that has a concave portion 2112a and convex portion 2112b. Furthermore, along a longitudinal edge of the first panel 2112 there a notched portion 2112c formed thereon. Preferably, the notched portion 2112c is in the form of a cut-out that is semi-circular or hemi-circular in shape.

The first frame 2111 is joined along the first panel 2112 at a first end of the first panel 2112. More specifically, portions of the arc periphery 2111a of the first frame 2111 are joined to the concave portion 2112a of the first panel 2112, along the lateral extent of the concave portion 2112a. Preferably, the first panel 2112 has a lateral geodesic length that is about half the arc length of the arc periphery 2111a. Alternatively, the first panel 2112 may a lateral geodesic length that covers the entire arc length of the arc periphery 2111a.

The first frame 2111 further includes a receiving point 2111d. This receiving point 2111d is to act as a point of rotation of the first frame 2111 in which the first frame 2111 rotates thereabout. This receiving point 2111d may be an aperture that is formed on the first frame 2111. More specifically, the receiving point 2111d is located along an imaginary line drawn diagonally across the first frame 2111 from an intersection between its radial peripheries 2111b, 2111c.

The first frame 2111 further includes a serrated surface profile 2111e. This serrated surface profile 2111e may be an uneven or rough trace formed along the first frame 2111 at a distance away from the arc periphery 2111a of the first frame 2111, and follows the outline of the arc periphery 2111a. Furthermore, the serrated surface profile 2111e may extend and reach either one or both radial peripheries 2111b, 2111c of the first frame 2111. It is to be noted that for the first frame 2111, its serrated surface profile 2111e is faced away from the first end of the first panel 2112.

The first frame 2111 further includes a mass-reducing portion 2111f, which is preferably a cut-out formed within the first frame 2111 that follows the shape of the first frame 2111. The mass-reducing portion 2111f is to reduce the structural mass of the first frame 2111 while also maintain its structural integrity. Preferably, the mass-reducing portion 2111f formed thereon is appropriately sized for accommodation of the receiving point 2111d and the serrated surface profile 2111e on the first frame 2111.

Within the first example embodiment 21, its second door piece 212 comprises a second frame 2121 and first panel 2122, which are preferably joined together as a single unit.

The second frame 2121 is a structure that is shaped to conform to the lateral cross-section of fuselage 10 of the aerial vehicle 1. Accordingly, the second frame 2121 may be a structure having a substantially semi-circular or hemi-circular outline that includes an arc periphery 2121a, and radial peripheries that include a first radial periphery 2121b and a second radial periphery 2121c.

The second panel 2122 is an elongated structure that is also preferably shaped to conform to the inner walls of the fuselage 10 of the aerial vehicle 1. Accordingly. the second panel 2122 may be a structure that has a concave portion 2122a and convex portion 2122b. Furthermore, along a longitudinal edge of the second panel 2122, there is a notched portion 2122c formed thereon. Preferably, the notched portion 2122c is in the form of a cut-out that is semi-circular or hemi-circular in shape.

The second frame 2121 is joined to the second panel 2122 at a distance away from a first end of the second panel 2122. More specifically, portions of the arc periphery 2121a of the second frame 2121 are joined to the concave portion 2122a of the second panel 2122, along the lateral extent of the concave portion 2122a. Preferably, the second panel 2122 has a lateral geodesic length that is about half the arc length of the arc periphery 2121a. Alternatively, the second panel 2122 may have a lateral geodesic length that covers the entire arc length of the arc periphery 2121a.

The second frame 2121 further includes a receiving point 2121d. This receiving point 2121d is to act as a point of rotation of the second frame 2121 in which the second frame 2121 rotates thereabout. This receiving point 2121d may be an aperture that is formed on the second frame 2121. More specifically, the receiving point 2121d is located along an imaginary line drawn diagonally across the second frame 2121 from an intersection between its radial peripheries 2121b, 2121c.

The second frame 2121 further includes a serrated surface profile 2121e. This serrated surface profile 2121e may be an uneven or rough trace formed along the second frame 2121 at a distance away from the arc periphery 2121a of the second frame 2121, and follows the outline of the arc periphery 2121a. Furthermore, the serrated surface profile 2121e may reach either one or both radial peripheries 2121b, 2121c of the second frame 2121. It is to be noted that for the second frame 2121, its serrated surface profile 2121e is faced towards the first end of the second panel 2122.

The second frame 2121 further includes a mass-reducing portion 2121f, which is preferably a cut-out formed within the second frame 2121 that follows the shape of the second frame 2121. The mass-reducing portion 2121f is to reduce the structural mass of the second frame 2121 while also maintaining its structural integrity. Preferably, the mass-reducing portion 2121f formed thereon is appropriately sized for accommodation of the receiving point 2121d and the serrated surface profile 2121e on the second frame 2121.

It is noted that the first door piece 211 and the second door piece 212 are to be dimensionally similar to each other. More specifically, the first frame 2111 and the second frame 2121 are congruent. More specifically, the first panel 2112 and the second panel 2122 have similar lateral and longitudinal lengths.

Furthermore, when the first example embodiment 21 is formed from the assembly of the first door piece 211 and the second door piece 212, (i) the first frame 2111 and the second frame 2121 are substantially aligned to each other, (ii) the first panel 2112 and the second panel 2122 are substantially in symmetry with each other with their notched portions 2112c, 2122c substantially being in alignment.

Within the first example embodiment 21, the plate piece 213 is to act as a foundational support for the first door piece 211 and the second door piece 212. The plate piece 213 is preferably shaped to conform to the lateral cross-section of fuselage 10 of the aerial vehicle 1. Accordingly, the plate piece 213 may be a disc-like or substantially circular structure. The plate piece 213 is to be affixed along the inner circumference and along a lateral centre axis of the fuselage 10 of the aerial vehicle 1. Preferably, the plate piece 213 may be affixed thereto by means of an interference fit, fasteners, bonding material, or the like.

The plate piece 213 may be formed with cut-outs. Accordingly, there is a first cut-out located at a centre of the plate piece 213, and a second cut-out located between the circumference of plate piece 213 and the centre of the plate piece 213. The first cut-out and the second cut-out are apertures formed along the plate piece 213. Alternatively, the second cut-out is a notch formed and located along the circumference of the plate piece 213 that further furrows towards the centre of the plate piece 213.

The plate piece 213 may have a front-facing surface and a rear-facing surface. More specifically, the front-facing surface of the plate piece 213 is defined to be a surface that is oriented towards the door pieces 211, 212, whereas the rear-facing surface of the support piece 213 is defined to be a surface that is oriented away from the door pieces 211, 212.

Within the first example embodiment 21, its plurality of support members includes a first support member 2141, a second support member 2142, and a third support member 2143.

The first support member 2141 is a shaft or rod-like structure that acts as an intermediary that connects both door pieces 211, 212 to the plate piece 213. Preferably, the first support member 2141 may be mounted upon the plate piece 213. More specifically, a first end of the first support member 2141 is affixed onto the centre of the plate piece 213 at its front-facing surface, and a second end of the first support member 2141 projects along the longitudinal direction of the fuselage 10 of the vehicle 1 as a free end.

Regarding the first support member 2141, the first door piece 211 and the second door piece 212 are rotatably hinged thereto. For the first door piece 211, its frame 2111 is hinged to the first support member 2141 via its receiving point 2111d. For the second door piece 212, its frame 2112 is hinged to the first support member 2141 via its receiving point 2121d. The first door piece 211 and the second door piece 212 are to freely rotate about the first support member 2141 via their receiving points 2111d, 2121d. Moreover, both door pieces 211, 212 are hinged to the first support member 2141 in a manner such that the first frame 2111 of the first door piece 211 is in substantial alignment with the second frame 2121 of the second door piece 212, or vice versa.

Regarding the first support member 2141, the first frame 2111 of the first door piece 211 is hinged there along at a first location, while the second frame 2121 of the second door piece 212 is hinged there along at a second location. Preferably, this second location is nearer to a second end of the first support member 2141 compared to the first location. Alternatively, this second location may be at the second end of the first support member 2141.

With this, there is a space that is defined to be between the first frame 2111 of the first door piece 211 and the second frame 2121 of the second door piece 212, which shall henceforth be referred to as a "transmission member space."

The second support member 2142 and the third support member 2143 are shafts or rod-like structures that act as gear train intermediaries between at least one driving unit and the door pieces 211, 212.

The second support member 2142 has a first end that is connected to the driving unit. The remaining portions of the second support member 2142 penetrate through the first cut-out formed on the plate piece 213 to reach the transmission member space. The second support member 2142 may have a length that extends until its second end substantially adjacent or near to the first frame 2111 of the first door part 211. Preferably, the second support member 2142 is parallel to the first support member 2141.

The third support member 2143 has a first end that is connected to the fuselage 10 of the aerial vehicle 1. The remaining portions of the third support member 2143 penetrate through both notched portions 2121c, 2122c formed on the first panel 2112 and the second panel 2122 to reach the transmission member space. The third support member 2143 may have a length that extends until its second end is within the transmission member space. Preferably, the third support member 2143 is perpendicular and adjacent to the second support member 2142.

Within the first example embodiment 21, its plurality of transmission members includes a first transmission member 2151, a second transmission member 2152, and a third transmission member 2153.

In particular, within the first example embodiment 21, the one gear train is formed by the first transmission member 2151, the second transmission member 2152, and the third transmission member 2153. This gear train shall actuate both door pieces 211, 212.

The first transmission member 2151 is mounted on the third support member 2143. More specifically, the first transmission member 2151 is along the third support member 2143, and is in engagement with both the frames 2111, 2121 of the door pieces 211, 212. Even more specifically, the first transmission member 2151 is in engagement with both serrated surface profiles 2111e, 2121e of the frames 2111, 2121 of the door pieces 211, 212. Preferably, the first transmission member 2151 is in the form of a gear, and by way of example, it may be a conventional spur gear, helical gear, or the like.

The second transmission member 2152 is mounted on the third support member 2143, more specifically, near or at the second end of the third support member 2143 and above the first transmission member 2151. Preferably, the second transmission member 2152 is in the form of a worm wheel. By way of example, the second transmission member 2152 may be a conventional spur gear, or the like.

The third transmission member 2153 is mounted on the second support member 2142. More specifically, the third transmission member 2153 is along the second support member 2142, and is in engagement with the second transmission member 2152. Preferably, the third transmission member 2153 is in the form of a worm, i.e. a gear in a form of a screw. By way of example, the first transmission member may be a throated worm, non-throated worm, enveloping worm, or the like.

FIGS. 16-21 illustrate the first example embodiment 21 assuming one or more states, which include a close state and an open state. These states may be defined by a separation angle that defines a degree of separation between the panels 2112, 2122 of the door pieces 211, 212. The separation angle may be an angle between the first radial periphery 2111*b* of the first frame 2111 of the first door piece 211, and the second radial periphery 2121*c* of the second frame 2121 of the second door piece 212. Alternatively, the separation angle may be defined to be an angle between the second radial periphery 2111*c* of the first frame 2111 of the first door piece 211, and the first radial periphery 2121*b* of the second frame 2121 of the second door piece 212.

The operational steps of the first example embodiment 21 for it to transition from the close state to the open state shall now be described. These steps are to occur in a near-simultaneous manner or a sequential manner.

In a first step of opening, the step of driving the second support member 2142 to axially rotate about a first direction is performed. This first direction may be, for example, a clockwise direction. With this, the third transmission member 2153 is driven to axially rotate about the first direction as well.

In a second step of opening, the step of driving the first transmission member 2151 and the second transmission member 2152, by the third transmission member 2153, is performed. More specifically, since the third transmission member 2153 is in engagement with the second transmission member 2152, an axial rotation of the third transmission member 2153 causes the second transmission member 2152 to axially rotate about a second direction with respect to the third support member 2143. This second direction may be, for example, a clockwise direction. Since both the first transmission member 2151 and the second transmission member 2152 are mounted on the third support member 2143, the first transmission member 2151 axially rotates about the second direction as well.

In a third step of opening, the step of actuating the door pieces 211, 212 by the first transmission member 2151, is performed. In particular, the first transmission member 2151, which in engagement with the serrated surface profiles 2111*e*, 2121*e* of the frames 2111, 2121, causes the frames 2111, 2121 to rotatably move during its axial rotation along the second direction, thereby causing a rotation of both door pieces 211, 212 with respect to the first support member 2141. Moreover, since the serrated surface profiles 2111*e*, 2121*e* engaged with the first transmission member 2151 are in substantial opposition with respect to each other, the axial rotation of the first transmission member 2151 further causes both door pieces 211, 212 to move in opposing directions and away from each other. Preferably, each door piece 211, 212 experiences an equal and opposing force, and shall rotatably move, or counter-rotate, by an equal angle and distance with respect to each other while hinged to the first support member 2141.

In a fourth step of opening, the step of moving the door pieces 211, 212 by rotation of the first transmission member 2151 until both panels 2112, 2122 are at a maximum separation angle between each other. Preferably, this occurs when the first transmission member 2151 had traversed or tracked through portions of or an entire arc of the serrated surface profiles 2111*e*, 2121*e* of the frames 2111, 2121. With this, the panels 2112, 2122 will be maximally separated from each other. The first example embodiment 21 will now be in the open state.

The operational steps of the first example embodiment 21 for it to transition from the open state to the close state shall now be described. These steps are to occur in a near-simultaneous manner or a sequential manner.

In a first step of closing, the step of driving the second support member 2142 to axially rotate about a third direction is performed. This third direction, may be, for example, an anticlockwise direction. With this, the third transmission member 2153 is driven to axially rotate about the third direction as well.

In a second step of closing, the step of driving the first transmission member 2151 and the second transmission member 2152, by the third transmission member 2153, is performed. More specifically, since the third transmission member 2153 is in engagement with the second transmission member 2152, an axial rotation of the third transmission member 2153 causes the second transmission member 2152 to axially rotate about a fourth direction with respect to the third support member 2143. This fourth direction, may be, for example, an anti-clockwise direction. Since both the first transmission member 2151 and the second transmission member 2152 are mounted on the third support member 2143, the first transmission member 2151 axially rotates about the fourth direction as well.

In a third step of closing, the step of actuating the door pieces 211, 212 by the first transmission member 2151, is performed. In particular, the first transmission member 2151, which in engagement with the serrated surface profiles 2111*e*, 2121*e* of the frames 2111, 2121, causes the frames 2111, 2121 to rotatably move during its axial rotation along the fourth direction, thereby causing a rotation of both door pieces 211, 212 with respect to the first support member 2141. Moreover, since the serrated surface profiles 2111*e*, 2121*e* engaged with the first transmission member 2151 are in substantially opposing locations with respect to each other, the axial rotation of the first transmission member 2151 further causes both door pieces 211, 212 to move in opposing directions and approach each other. Preferably, each door piece 211, 212 experiences an equal and opposing force, and shall rotatably move, or counter-rotate, by an equal angle and distance with respect to each other while hinged to the first support member 2141.

In a fourth step of closing, the step of moving the door pieces 211, 212 by rotation of the first transmission member 2151 until both panels 2112, 2122 are at a minimum separation angle between each other. Preferably, this occurs when the first transmission member 2151 had traversed or tracked through portions of or an entire arc of the serrated surface profiles 2111*e*, 2121*e* of the frames 2111, 2121. With this, the panels 2112, 2122 will be minimally separated from each other and preferably meet. The first example embodiment 21 will now be in the close state.

Notably, within the first example embodiment 21, its plurality of support members 2141-2143 and its transmission member 2151-2153 are appropriately configured for their intended operations.

In particular, the first support member 2141 is static and to remain unrotated along its axial axis throughout the operation of the door assembly 2.

Furthermore, the first support member 2141 may further include one or more position-securing means for ensuring the first frame 2111 and second frame 2121 remain in a fixed position as they are hinged to the first support member 2141 via their receiving points 2111d, 2121d in a rotatable manner. This ensures that the first frame 2111 and second frame 2121 do not deviate from their positions during their intended operations. By way of example, the position-securing means may be fasteners in the form of nuts and/or bolts, ribbed portions formed on the surface of first support member 2141, or the like.

Furthermore, the first frame 2111 and second frame 2121 may be configured to have friction-reducing means to reduce their frictional contact with first support member 2141 at their receiving points 2111d, 2121d. By way of example, between the receiving points 2111d, 2121d and the first support member 2141, there may be a plurality of ball bearings, lubricants, or the like.

In particular, the second support member 2142 is kinetic, and shall undergo an axial rotation. A first end of the second support member 2142 is connected to a driving unit that drives the second support member 2142 to rotate as described. Hence, the third transmission member 2153 located along or at a second end of the second support member 2142 shall rotate accordingly for a transfer of forces from the driving unit to the second transmission member 2152.

In particular, the third support member 2143 is kinetic or at least semi-kinetic, and it shall undergo an axial rotation in its entirety or portions thereof. Notably, a first end of the third support member 2143 is connected to the fuselage 10 of the aerial vehicle 1. Notably as well, both the first transmission member 2151 and second transmission member 2152 are to axially rotate as the second transmission member 2152 is driven by the third transmission member 2153. As such, it is preferable that at least the portions along the third support member 2143 in which the second transmission member 2152 and third transmission member 2153 are mounted thereon is kinetic, and undergoes rotation along its axial direction, so that the first transmission member 2151 may allow the first example embodiment 21 to change between an open state and a close state.

It is to be noted that the aforementioned configurations may be similarly applied upon the rest of the example embodiments of the door assembly 2 whenever permissible.

FIGS. 22-34 are depictions of the door assembly 2 in a second example embodiment 22, which shall henceforth be directly referred to as the "second example embodiment."

Figure 22:
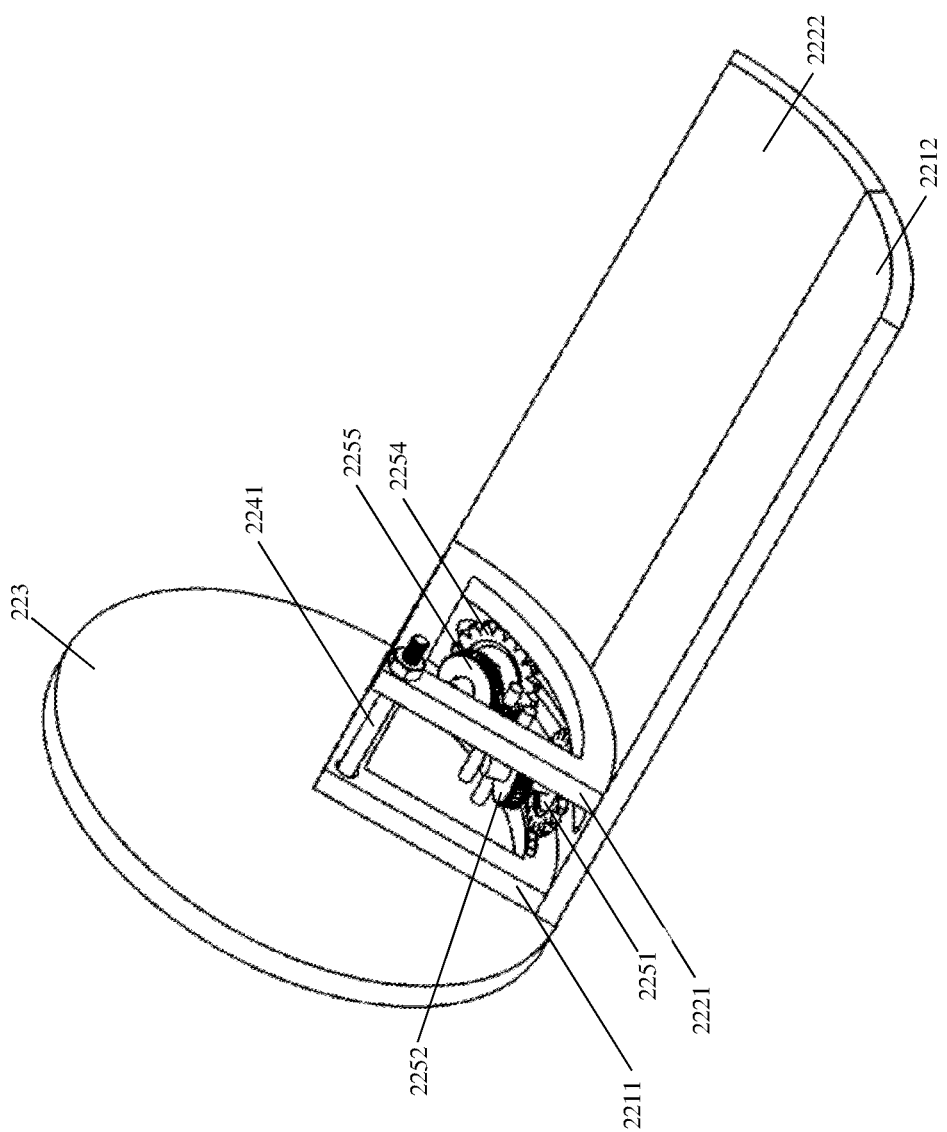
FIG. 22 is a diagram illustrating a perspective view of the door assembly, as provided by the present invention, in a second example embodiment.

In particular, FIG. 22 illustrates a perspective view of this second example embodiment 22.

Figure 23:
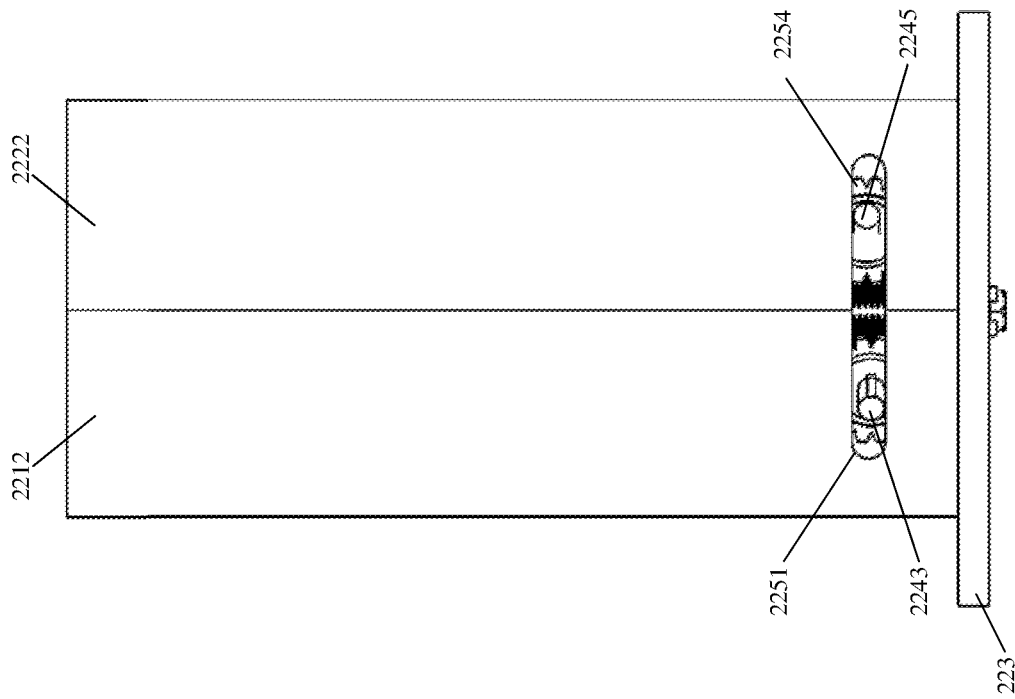
FIG. 23 is a diagram illustrating a top view of the door assembly of the second example embodiment as shown in FIG. 22, when it is in a close state.
Figure 24:
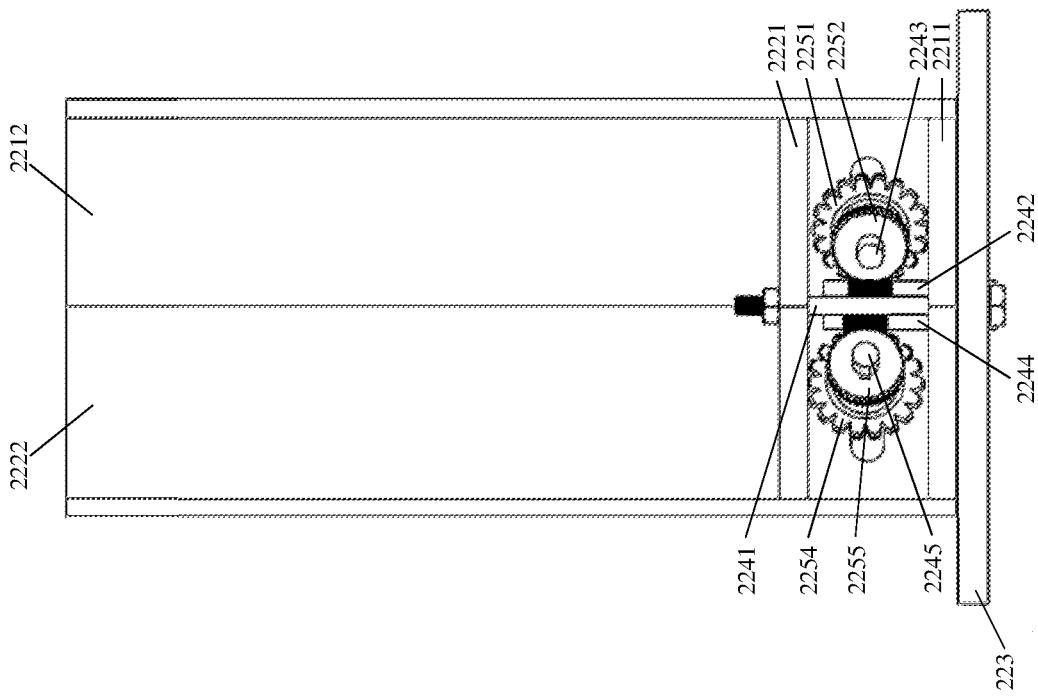
FIG. 24 is a diagram illustrating a bottom view of the door assembly of the second example embodiment as shown in FIG. 22, when it is in a close state.

In particular, FIGS. 23-24 illustrate the top views of the second example embodiment 22. More specifically, FIG. 23 illustrates its top view when it is in a close state, and FIG. 23 illustrates its bottom view when it is in a close state.

Figure 26:
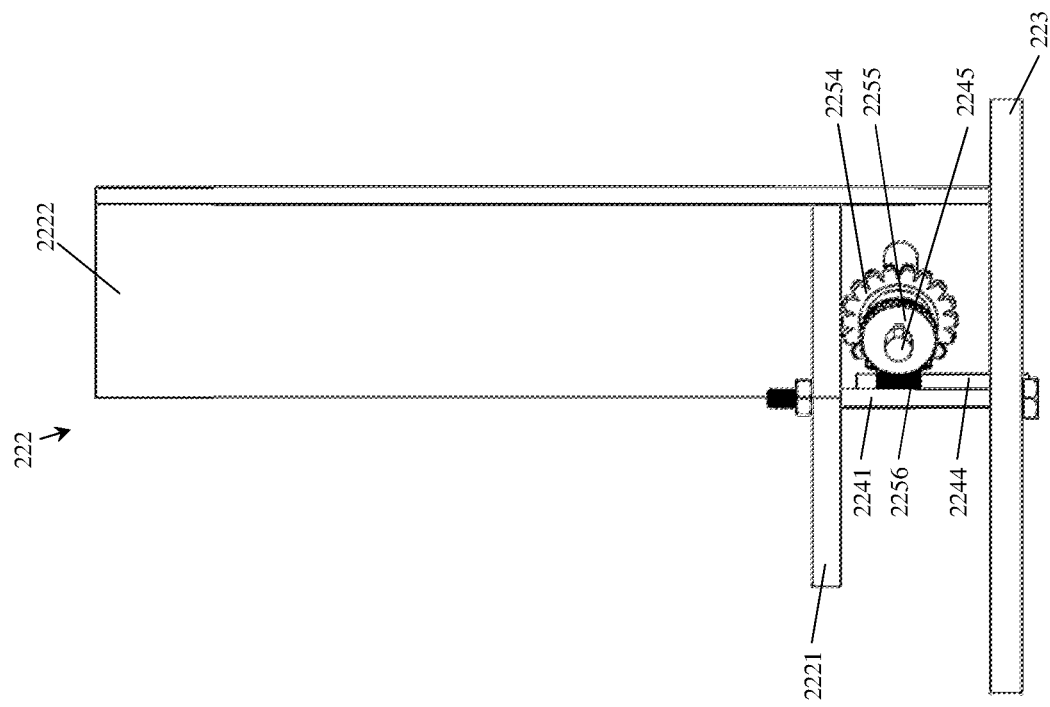
FIG. 26 is a diagram illustrating a top view of a second door piece of the door assembly of the second example embodiment as shown in FIG. 22, together with the support members and transmission members.
Figure 25:
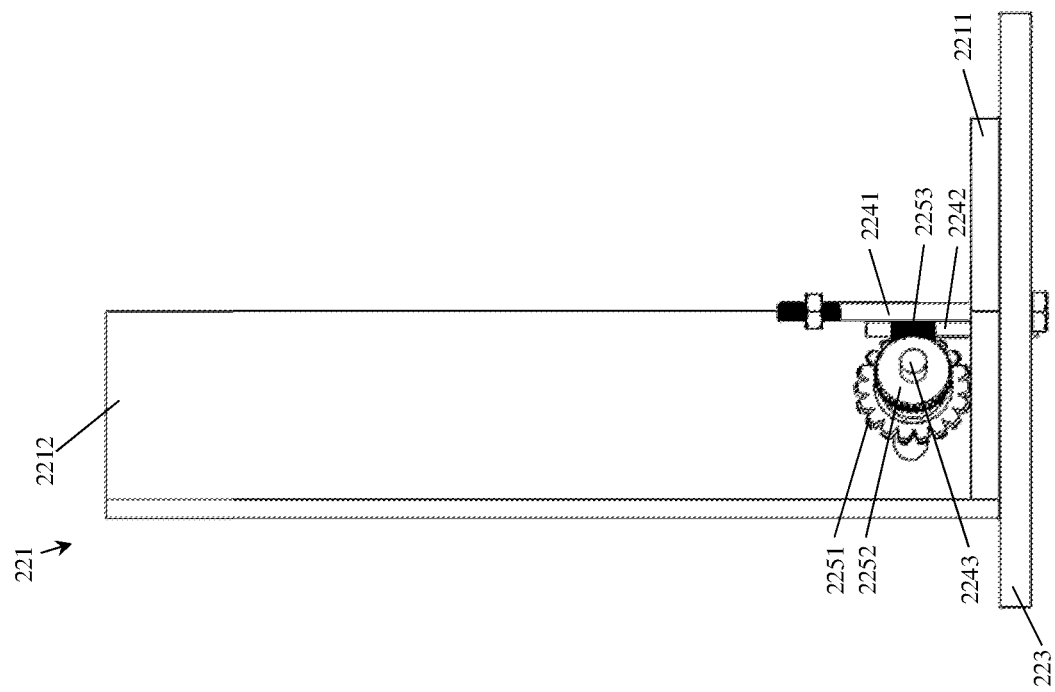
FIG. 25 is a diagram illustrating a top view of the first door piece of the door assembly of the second example embodiment as shown in FIG. 22, together with the support members and transmission members.

In particular, FIGS. 25-26 illustrate top views of the door pieces of the second example embodiment 22. More specifically, FIG. 25 illustrates a top view of its first door piece together with the support members and transmission members, and FIG. 26 illustrates a top view of its second door piece together with the support members and transmission members.

In particular, FIGS. 27-28 illustrate the rear and front views of the second example embodiment 22. More specifically, FIG. 27 illustrates its rear view, and FIG. 28 illustrates its front view when it is in a close state.

In particular, FIGS. 29-30 illustrate rear and front views of the first door piece of the second example embodiment 22. More specifically, FIG. 29 illustrates its rear view, and FIG. 30 illustrates its front view.

In particular, FIGS. 31-32 illustrate rear and front views of the second door piece of the second example embodiment 22. More specifically, FIG. 31 illustrates its rear view, and FIG. 32 illustrates its front view.

Figure 33:
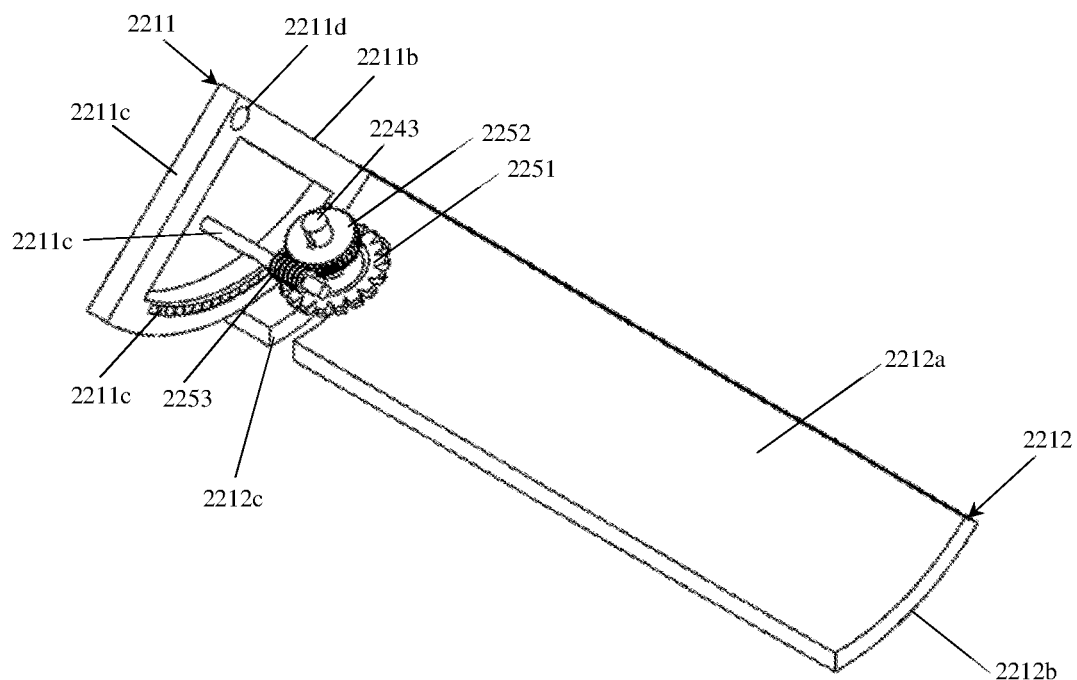
FIG. 33 is a diagram illustrating a perspective front view of the first door piece of the door assembly of the second example embodiment as shown in FIG. 22.
Figure 34:
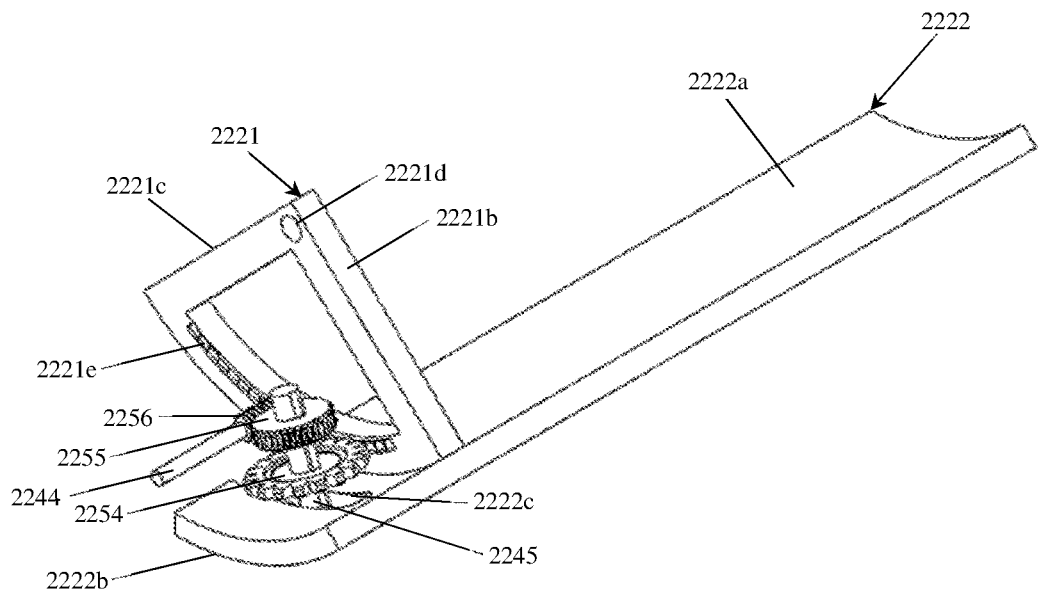
FIG. 34 is a diagram illustrating a perspective rear view of the second door piece of the door assembly of the second example embodiment as shown in FIG. 22.

In particular, FIGS. 33-34 illustrate perspective views of the door pieces of the second example embodiment 22. More specifically, FIG. 33 illustrates a perspective front view of the first door piece, and FIG. 33 illustrates a perspective rear view of the second door piece.

The second example embodiment 22 shall now be described based on FIGS. 22-34.

The second example embodiment 22 at least comprises a first door piece 221, a second door piece 222, and a plate piece 223 in which the first door piece 221 and the second door piece 222 are in substantial connection thereto. Furthermore, for this second example embodiment 22 to operate accordingly, it further comprises a plurality of support members, and a plurality of transmission members.

However, within the second example embodiment 22, it is configured to have two gear trains instead of having one gear train as per the first example embodiment 22. More specifically, the second example embodiment 22 has a first gear train that actuates one door piece, while the second gear train actuates the remaining door piece. Hence, the number of support members and transmission members within the second example embodiment 22 is more than that within the first example embodiment 21.

Within the second example embodiment 22, its first door piece 221 includes a first frame 2211 and a first panel 2212. Its first frame 2211 includes an arc periphery 2211a, radial peripheries that include a first radial periphery 2211b and a second radial periphery 2211c, a receiving point 2211d, a serrated surface profile 2211e, and a mass-reducing portion. Its first panel 2212 includes a concave portion 2212a and a convex portion 2212b. These aforementioned features of the first door piece 221 of the second example embodiment 22 are substantially similar to those of the first door piece 211 of the first example embodiment 21 in terms of their structure and configuration, and hence, their descriptions thereof shall not be repeated.

Within the second example embodiment 22, its second door piece 222 includes a second frame 2221 and a second panel 2222. Its second frame 2221 includes an arc periphery 2221a, radial peripheries that include a first radial periphery 2221b and a second radial periphery 2221c, a receiving point 2221d, a serrated surface profile 2221e, and a mass-reducing portion. Its second panel 2222 includes a concave portion 2222a and a convex portion 2222b. These aforementioned features of the second door piece 222 of the second example embodiment 22 are substantially similar to those of the second door piece 212 of the first example embodiment 21 in terms of their structure and configuration, and hence, their descriptions thereof shall not be repeated.

Within the second example embodiment 22, the first panel 2212 of the first door piece 221 further includes a first notched portion 2212c that is formed along its longitudinal edge. Similarly, the second panel 2222 of the second door piece 222 further includes a second notched portion 2222c that is formed along its longitudinal edge. These notched portions 2212c, 2222c substantially extend laterally along the first panel 2212 and second panel 2222, respectively, to allow for (i) accommodation of the first gear train and the second gear train, and (ii) movement of either one or both the first door piece 221 and the second door piece 222. These notched portions 2212c, 2222c may be in the form of a cut-out having sharp corners and/or rounded corners.

Within the second example embodiment 22, it is noted that the first door piece 221 and the second door piece 222 are dimensionally similar to each other. More specifically, the first frame 2211 and the second frame 2221 are congruent. More specifically, the first panel 2212 and the second panel 2222 have similar lateral and longitudinal lengths.

Furthermore, when the second example embodiment 22 is formed from assembly of the first door piece 221 and the second door piece 222, (i) the first frame 2211 and the second frame 2221 are substantially aligned to each other, and (ii) the first panel 2212 and the second panel 2222 are substantially in symmetry with each other with their notched portions 2212c, 2222c substantially being in alignment.

Within the second example embodiment 22, its plate piece 223 may be substantially similar to the plate piece 213 of the first example embodiment 21 in terms of its structure and configuration, except for the number and location of its cut-outs.

Accordingly, the plate piece 223 includes a first cut-out, a second cut-out, and a third cut-out. The first cut-out is located at a centre of the plate piece 223, the second cut-out is located between the circumference of the plate piece and the centre of the plate piece, and the third cut-out is located between the circumference of plate piece 223 and the centre of the plate piece 223 and adjacent to the second cut-out. Alternatively, the second cut-out and the third cut-out are adjacent notches formed and located along the circumference of the plate piece 223 that further furrows towards the centre of the plate piece 223.

The remaining features of the plate piece 223 of the second example embodiment 22 are substantially similar to those of the plate piece 213 of the first example embodiment 21 in terms of their structure and configuration, and hence, their descriptions thereof shall not be repeated.

Within the second example embodiment 22, its plurality of support members includes a first support member 2241, a second support member 2242, and a third support member 2243, a fourth support member 2244, and a fifth support member 2245.

The first support member 2241 of the second example embodiment 22 is substantially similar to the first support member 2141 of the first example embodiment 21 in terms of its structure and configuration with the door pieces. Hence, its description thereof shall not be repeated. With this, it is understood that there is a space that is defined to be between the first frame 2211 of the first door piece 221 and the second frame 2221 of the second door piece 222, which shall henceforth be referred to as a "transmission member space."

The second support member 2242 and the fourth support member 2244 are shafts or rod-like structures that act as gear train intermediaries between at least one driving unit and the door pieces 221, 222.

The second support member 2242 has a first end that is connected to a driving unit, and its remaining portions penetrate through the second cut-out formed on the plate piece 223 to reach the transmission member space. The fourth support member 2244 also has a first end that is connected to a driving unit, and its remaining portions penetrates through the third cut-out formed on the plate piece 223 to reach the transmission member space. The first end of the second support member 2242 and the fourth support member 2244 may be connected to different driving units or a diving unit of the same.

The second support member 2242 and the fourth support member 2244 have lengths that extend until their second ends are substantially adjacent or near to the first frame 2211 of the first door piece 221. Furthermore, the second support member 2242 may be positionally nearer to the first panel 2211 compared to the fourth support member 2244, while the fourth support member 2244 may be positionally nearer to the second panel 2222 compared to the second support member 2242. Preferably, the second support member 2242 and the fourth support member 2244 are both coplanar with respect to a longitudinal axis of the fuselage 10, and they are also both parallel to the first support member 2241.

The third support member 2243 and the fifth support member 2245 are shafts or rod-like structures that act as gear train intermediaries between at least one driving unit and the door pieces 221, 222.

The third support member 2243 has its first end connected to the fuselage 10 of the aerial vehicle 1, and its remaining portions penetrate through the first notched portion 2212c of the first panel 2212 to reach the transmission member space. The fifth support member 2245 has its first end connected to the fuselage 10 of the aerial vehicle 1, and its remaining portions penetrate through the second notched portion 2222c of the second panel 2222 to reach the transmission member space.

The third support member 2243 has a length that extends until its second end is substantially within the transmission member space, and is perpendicular to a surface normal of the first panel 2212. The fifth support member 2245 has a length that extends until its second end is substantially within the transmission member space, and is perpendicular to a surface normal of the second panel 2222.

Within the second example embodiment 22, its plurality of transmission members includes a first transmission member 2251, a second transmission member 2252, a third transmission member 2253, a fourth transmission member 2254, a fifth transmission member 2255, and a sixth transmission member 2256.

In particular, within the second example embodiment 22, the first gear train is formed by the first transmission member 2251, the second transmission member 2252, and the third transmission member 2253. Whereas, the second gear train is formed by the fourth transmission member 2254, the fifth transmission member 2255, and the sixth transmission member 2256. For the first gear train, the first transmission member 2251 may only actuate either one of the door pieces. For the second gear train, the fourth transmission member 2254 may only actuate the remaining door piece.

The transmission members related to the first gear train within the second example embodiment 22 shall now be described.

The first transmission member 2251 is mounted on the third support member 2243. More specifically, the first transmission member 2251 is along the third support structure 2243, and is in engagement with the first frame 2211 of the first door piece 221. Even more specifically, the first transmission member 2251 is in engagement with the serrated surface profiles 2211e of the first frame 2211 of the first door piece 221.

The second transmission member 2252 is mounted on the third support member 2243 as well. More specifically, the second transmission member 2252 is mounted near or at the second end of the third support member 2243 and above the first transmission member 2251.

The third transmission member 2253 is mounted the second support member 2242. More specifically, the third transmission member 2253 is along the second support member 2242 and is in engagement with the second transmission member 2252.

The transmission members related to the second gear train within the second example embodiment 22 shall now be described.

The fourth transmission member 2254 is mounted on the fifth support member 2245. More specifically, the fourth transmission member 2254 is along the fifth support member 2245, and is in engagement with the second frame 2221 of the second door piece 222. Even more specifically, the fourth transmission member 2254 is in engagement with the serrated surface profiles 2221e the second frame 2221 of the second door piece 222.

The fifth transmission member 2255 is mounted the fifth support member 2245. More specifically, the fifth transmission member 2255 is mounted near or at the second end of the fifth support member 2245 and above the fourth transmission member 2254.

The sixth transmission member 2256 is mounted on the fourth support member 2244. More specifically, the sixth transmission member 2256 is along the fourth support member 2244 and is in engagement with the fifth transmission member 2255.

The first transmission member 2251 and the fourth transmission member 2254 may be in the form of a conventional spur gear, helical gear, or the like.

The second transmission member 2252 and the fifth transmission member 2255 may be in the form of a worm wheel. By way of example, they may be in the form of a conventional spur gear, helical gear, or the like.

The third transmission member 2253 and the sixth transmission member 2256 may be in the form of a worm, i.e. a gear in a form of a screw. By way of example, they may be throated worms, non-throated worms, enveloping worms, or the like.

The second example embodiment 22 may assume one or more states, which include a close state and an open state. These states may be defined by a separation angle that defines a degree of separation between the panels 2212, 2222 of the door pieces 221, 222. Similar to the first example embodiment 21, the separation angle may be an angle between the first radial periphery 2211b of the first frame 2211 of the first door piece 221, and the second radial periphery 2221c of the second frame 2221 of the second door piece 222. Alternatively, the separation angle may be defined to be an angle between the second radial periphery 2211c of the first frame 2211 of the first door piece 221, and the first radial periphery 2221b of the second frame 2221 of the second door piece 222.

The operational steps of the second example embodiment 22 for it to transition from the close state to the open state shall now be described. These steps are to occur in a near-simultaneous manner or a sequential manner.

In a first step of opening, the step of driving second support member 2242 to axially rotate about a first direction is performed and driving fourth support member 2244 to axially rotate about a second direction is performed. The first direction may be, for example, a clockwise direction, and the second direction, may be, for example, an anti-clockwise direction. With this, the third transmission member 2253 is driven to axially rotate about the first direction, and the sixth transmission member 2256 is driven to axially rotate about the second direction.

In a second step of opening, the step of driving the first transmission member 2251 and the second transmission member 2252, by the third transmission member 2253, and driving the fourth transmission member 2254 and the fifth transmission member 2255, by the sixth transmission member 2256.

More specifically, since the third transmission member 2253 is in engagement with the second transmission member 2252, an axial rotation of the third transmission member 2253 causes the second transmission member 2252 to axially rotate about a third direction with respect to the third support member 2243. The third direction may be, for example, a clockwise direction. Since both the first transmission member 2251 and the second transmission member 2252 are mounted on the third support member 2243, the first transmission member 2251 axially rotates about the third direction as well.

More specifically, since the sixth transmission member 2256 is in engagement with the fifth transmission member 2255, an axial rotation of the sixth transmission member 2256 causes the fifth transmission member 2255 to axially rotate about a fourth direction with respect to the fifth support member 2245. The fourth direction may be, for example, an anti-clockwise direction. Since both the fourth transmission member 2254 and the fifth transmission member 2255 are mounted on the fifth support member 2245, the fourth transmission member 2254 axially rotates about the fourth direction as well.

In a third step of opening, the step of actuating the door pieces 221,222 by the first transmission member 2251 and the fourth transmission member 2254 is performed.

More specifically, the first transmission member 2251, which in engagement with the serrated surface profiles 2211e the first frame 2211 causes the first frame 2211 to rotatably move during its axial rotation along the third direction, thereby causing a rotation of the first door piece 221 with respect to the first support member 2241.

More specifically, the fourth transmission member 2254, which in engagement with the serrated surface profiles 2221e the second frame 2221 causes the second frame 2221 to rotatably move during its axial rotation along the fourth direction, thereby causing a rotation of the second door piece 222 with respect to the first support member 2241.

Since the third direction and the fourth direction are opposite of each other, during the third step, the first door price 221 and the second door piece 222 shall move in opposing directions and away from each other. Preferably, each door piece 221, 222 experiences an equal and opposing force, and shall rotatably move, or counter-rotate, by an equal angle and distance with respect to each other while hinged to the first support member 2241.

In a fourth step of opening, the step of moving the door pieces 221, 222 until both frames 2211, 2221 are at a maximum separation angle between each other.

In particular, this occurs when the first transmission member 2251 had traversed or tracked through portions of or an entire arc of the serrated surface profiles 2211e of the first frame 2211, and the fourth transmission member 2254 had traversed or tracked through portions of or an entire arc of the serrated surface profiles 2221e of the second frame 2221. With this, the panels 2212, 2222 will be maximally separated from each other. The second example embodiment 22 will now be in an open state.

The operational steps of the door assembly 2 in its second example embodiment 22 for it to transition from the open state to the close shall now be described. These steps correspond to closing of the door assembly 2 in its second example embodiment 22 and are to occur in a near-simultaneous manner or a sequential manner.

In a first step of closing, the step of driving second support member 2242 to axially rotate about a fifth direction is performed and driving fourth support member 2244 to axially rotate about a sixth direction is performed. The fifth direction may be, for example, an anti-clockwise direction, and the sixth direction, may be, for example, a clockwise direction. With this, the third transmission member 2253 is driven to axially rotate about the fifth direction, and the sixth transmission member 2256 is driven to axially rotate about the sixth direction.

In a second step of closing, the step of driving the first transmission member 2251 and the second transmission member 2252, by the third transmission member 2253, and driving the fourth transmission member 2254 and the fifth transmission member 2255, by the sixth transmission member 2256.

More specifically, since the third transmission member 2253 is in engagement with the second transmission member 2252, an axial rotation of the third transmission member 2253 causes the second transmission member 2252 to axially rotate about a seventh direction with respect to the third support member 2243. The seventh direction may be, for example, an anti-clockwise direction. Since both the first transmission member 2251 and the second transmission member 2252 are mounted on the third support member 2243, the first transmission member 2251 axially rotates about the seventh direction as well.

More specifically, since the sixth transmission member 2256 is in engagement with the fifth transmission member 2255, an axial rotation of the sixth transmission member 2256 causes the fifth transmission member 2255 to axially rotate about an eighth direction with respect to the fifth support member 2245. The eighth direction may be, for example, a clockwise direction. Since both the fourth transmission member 2254 and the fifth transmission member 2254 are mounted on the fifth support member 2245, the fourth transmission member 2254 axially rotates about the eighth direction as well.

In a third step of closing, the step of actuating the door pieces 221,222 by the first transmission member 2251 and the fourth transmission member 2254 is performed.

More specifically, the first transmission member 2251, which in engagement with the serrated surface profiles 2211e of the first frame 2211 causes the first frame 2211 to rotatably move during its axial rotation along the seventh direction, thereby causing a rotation of the first door piece 221 with respect to the first support member 2241.

More specifically, the fourth transmission member 2254, which in engagement with the serrated surface profiles 2221e the second frame 2221 causes the second frame 2221 to rotatably move during its axial rotation along the eighth direction, thereby causing a rotation of the second door piece 222 with respect to the first support member 2241.

Since the seventh direction and the eighth direction are opposite of each other, during the third step, the first door price 221 and the second door piece 222 shall move in opposing directions and approach each other. Preferably, each door piece 221, 222 experiences an equal and opposing force, and shall rotatably move, or counter-rotate, by an equal angle and distance with respect to each other while hinged to the first support member 2241.

In a fourth step of closing, the step of moving the door pieces 221, 222 until both frames 2211, 2221 are at a minimum separation angle between each other.

In particular, this occurs when the first transmission member 2251 had traversed or tracked through portions of or an entire arc of the serrated surface profiles 2211e of the first frame 2211, and the fourth transmission member 2254 had traversed or tracked through portions of or an entire arc of the serrated surface profiles 2221e of the second frame 2221. With this, the panels 2212, 2222 will be minimally separated from each other and preferably meet. The second example embodiment 22 will now be in a close state.

FIGS. 35-44 are depictions of the door assembly 2 in a third example embodiment 23, which shall henceforth be directly referred as the "third example embodiment."

Figure 35:
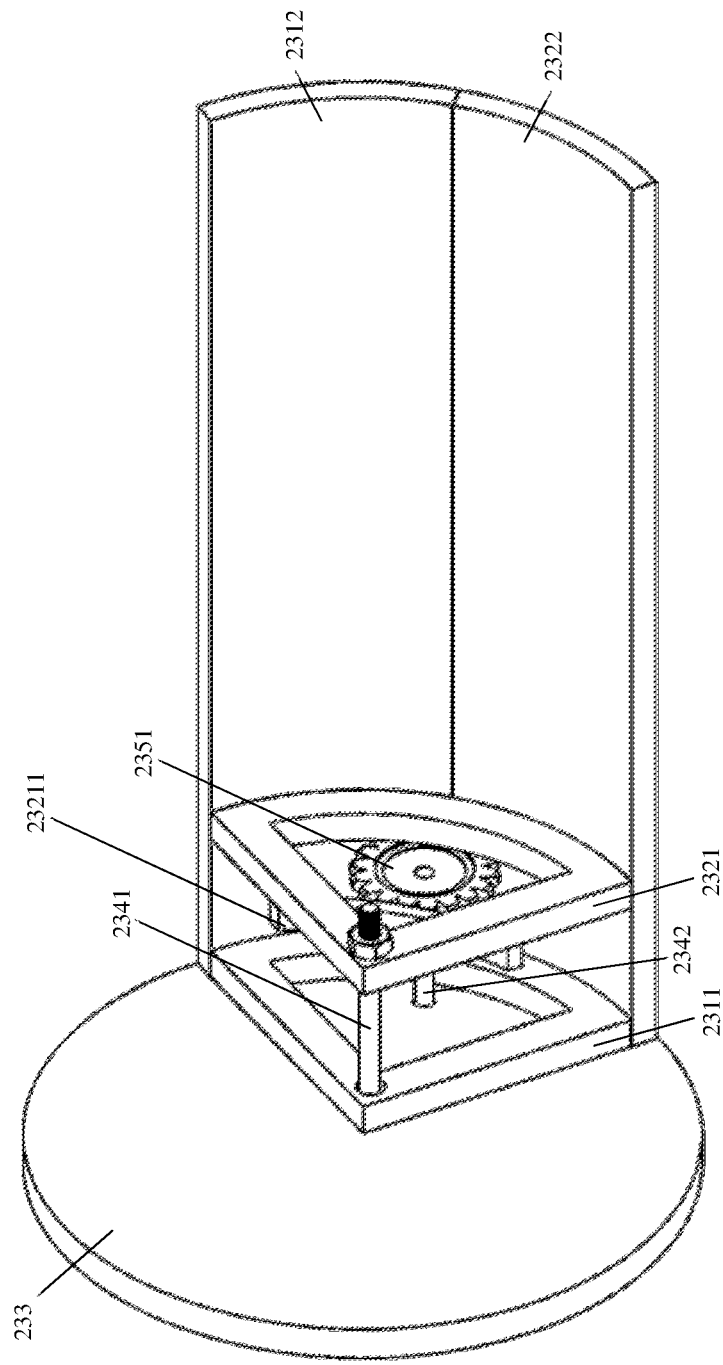
FIG. 35 is a diagram illustrating a perspective view of the door assembly, as provided by the present invention, in a third example embodiment.

In particular, FIG. 35 illustrates a perspective view of this third example embodiment 23.

Figure 36:
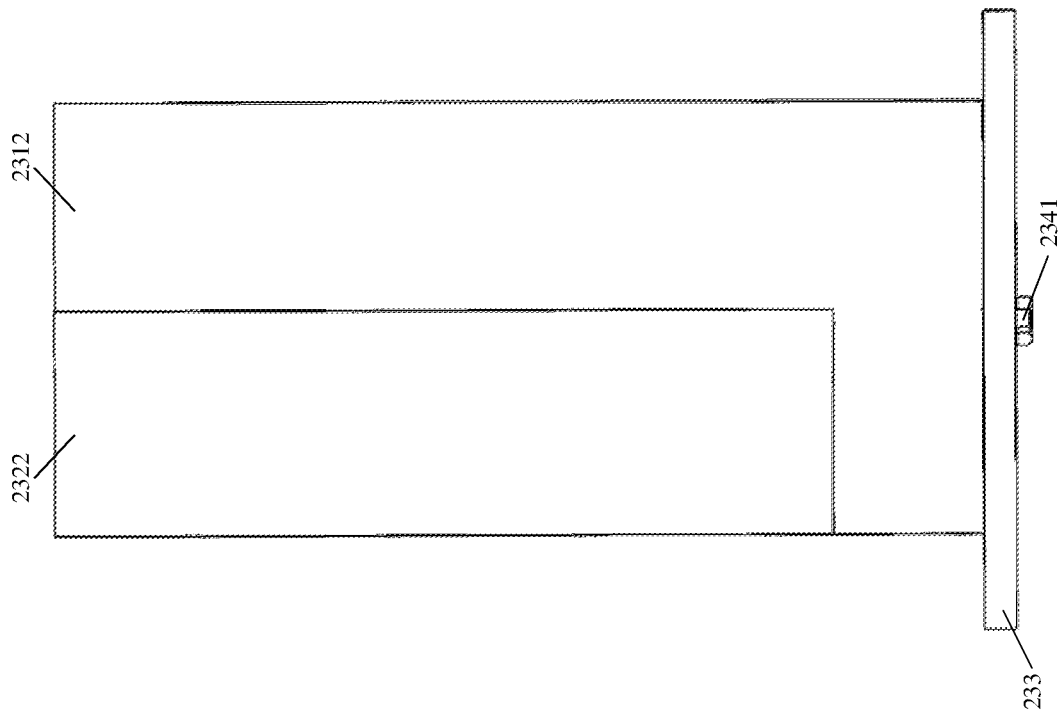
FIG. 36 is a diagram illustrating a top view of the door assembly of the third example embodiment as shown in FIG. 35, when it is in a close state.
Figure 37:
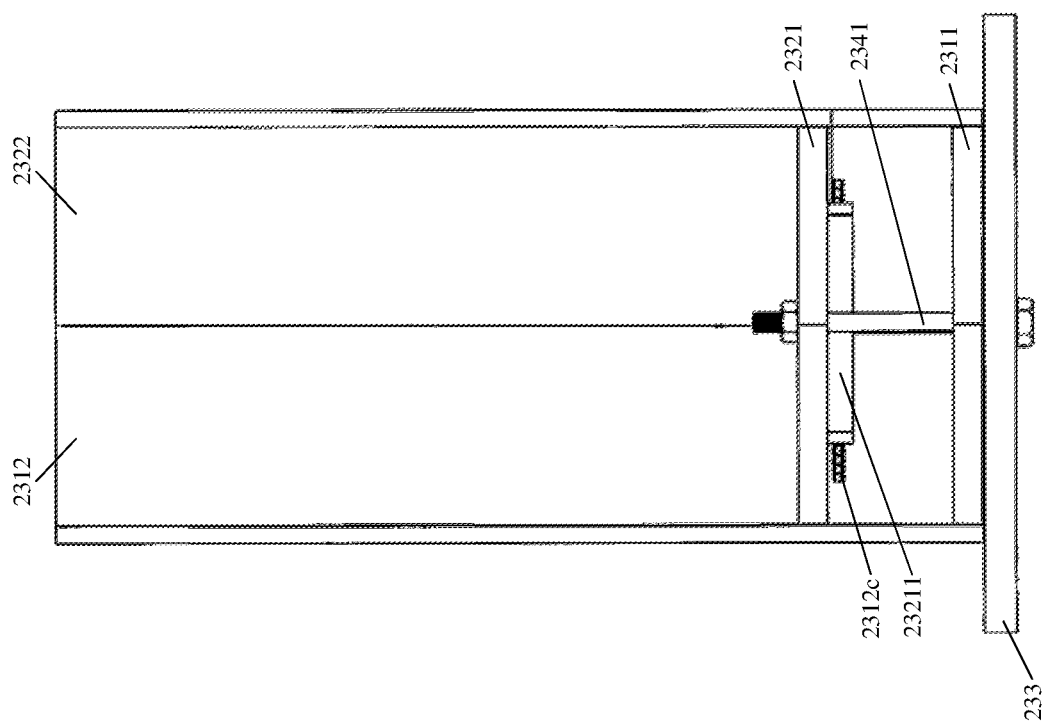
FIG. 37 is a diagram illustrating a bottom view of the door assembly of the third example embodiment as shown in FIG. 35, when it is in a close state.

In particular, FIGS. 36-37 illustrate top views of the third example embodiment 23. More specifically, FIG. 36 illustrates its top view when it is in a close state, and FIG. 37 illustrates its bottom view when it is in a close state.

Figure 38:
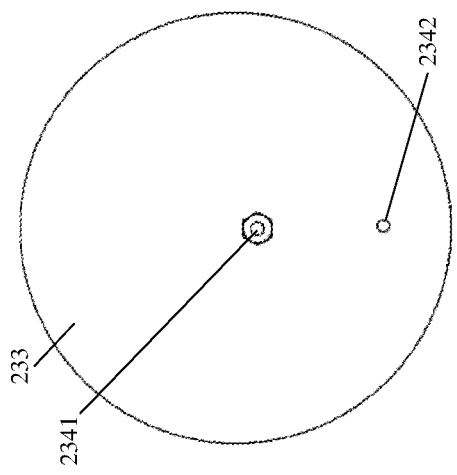
FIG. 38 is a diagram illustrating a rear view of the door assembly of the third example embodiment as shown in FIG. 35.
Figure 39:
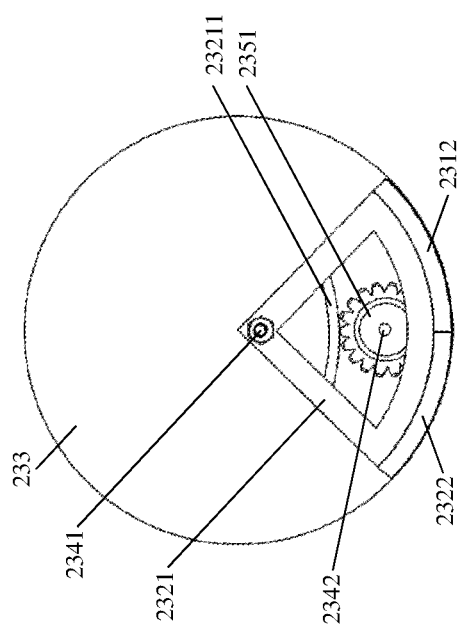
FIG. 39 is a diagram illustrating a front view of the door assembly of the third example embodiment as shown in FIG. 35, when it is in a close state.

In particular, FIGS. 38-39 illustrate rear and front views of the third example embodiment 23. More specifically, FIG. 38 illustrates its rear view, and FIG. 39 illustrates its front view when it is in a close state.

Figure 40:
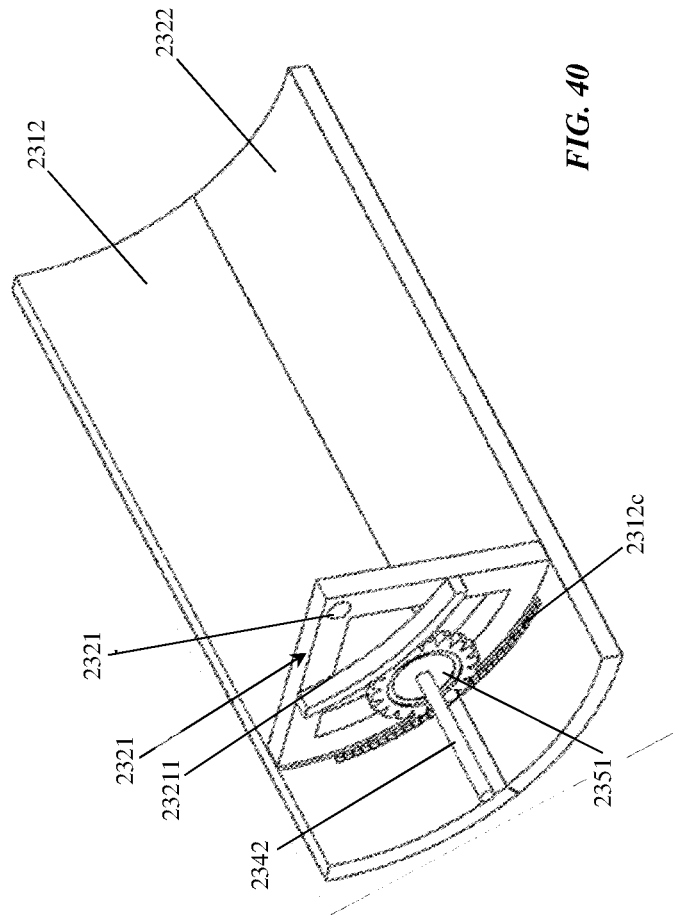
FIG. 40 is a diagram illustrating a perspective rear view of the first door piece and the second door piece of the door assembly of the third example embodiment as shown in FIG. 35, when it is in a close state.
Figure 41:
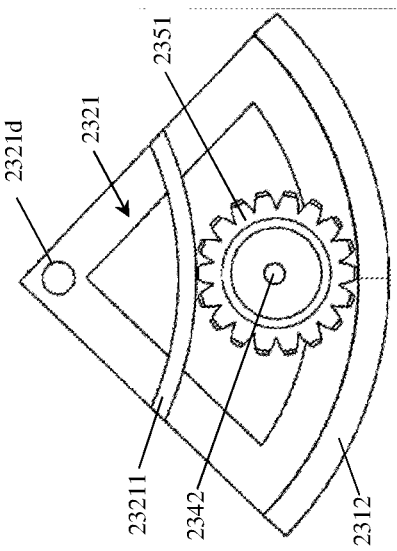
FIG. 41 is a diagram illustrating a rear view of the first door piece and the second door piece of the door assembly of the third example embodiment as shown in FIG. 35, when it is in a close state.

In particular, FIGS. 40-41 illustrate further perspective views of the third example embodiment 23 without its plate piece. More specifically, FIG. 40 illustrates a perspective rear view without its plate piece, and FIG. 41 illustrates its rear view without its plate piece when it is in a close state.

Figure 42:
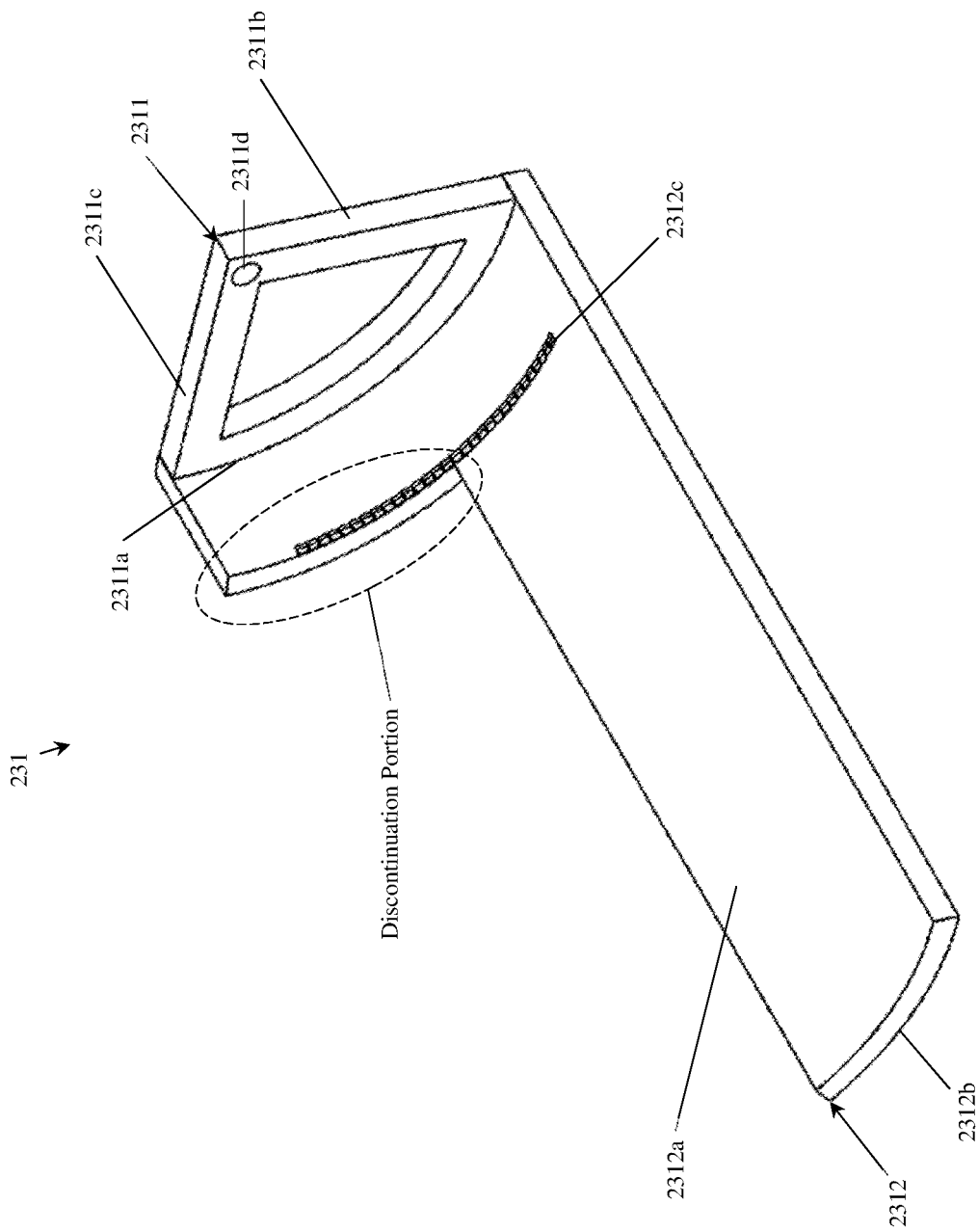
FIG. 42 is a diagram illustrating a perspective top view of the first door piece of the door assembly of the third example embodiment as shown in FIG. 35.

In particular, FIG. 42 illustrates a perspective view of the first door piece of the third example embodiment 23.

In particular, FIGS. 43-44 illustrate perspective views of the second door piece of the third example embodiment 23. More specifically, FIG. 43 illustrates its perspective top view, and FIG. 44 illustrates its perspective bottom view.

The third example embodiment 23 shall now be described based on FIGS. 35-44.

The third example embodiment 23 at least comprises a first door piece 231, a second door piece 232, and a plate piece 233 in which the first door piece 231 and the second door piece 232 are in substantial connection thereto. Furthermore, for this third example embodiment 23 to operate accordingly, it further comprises a plurality of support members, and a plurality of transmission members.

However, within the third example embodiment 23, it has no gear train as it is configured to have one gear that directly actuates both door pieces 231, 232 in a manner that is different from the first example embodiment 21. More specifically, the said gear is substantially engaged with one panel of a door piece and one frame of a remaining door piece. Hence, the configuration of the support members and transmission members within the third example embodiment 23 differs from the first example embodiment 21.

Within the third example embodiment 23, its first door piece 231 includes a first frame 2311 and a first panel 2312. Its first frame 2311 includes an arc periphery 2311a, radial peripheries that include a first radial periphery 2311b and a second radial periphery 2311c, a receiving point 2311d, and a mass-reducing portion. Its first panel 2312 includes a concave portion 2312a, and a convex portion 2312b. These aforementioned features of the first door piece 233 of the third example embodiment 23 may be substantially similar to those of the first door piece 211 of the first example embodiment 21 in terms of their structure; hence, their descriptions thereof shall not be repeated.

Within the third example embodiment 23, its second door piece 232 includes a second frame 2321 and a second panel 2322. Its second frame 2321 includes an arc periphery 2321a, radial peripheries that include a first radial periphery 2321b and a second radial periphery 2321c, a receiving point 2321d, and a mass-reducing portion. Its second panel 2322 includes a concave portion 2322a and a convex portion 2322b. These aforementioned features of the second door piece 232 of the third example embodiment 23 may be substantially similar to those of the second door piece 212 of the first example embodiment 21 in terms of their structure; hence, their descriptions thereof shall not be repeated.

Within the third example embodiment 23, the arc periphery 2311a of the first frame 2311 is joined to the concave portion 2312a of the first panel 2312 along the lateral extent of the concave portion 2312a. Furthermore, first frame 2311 is joined along the first panel 2312 at a first end of the first panel 2312.

Within the third example embodiment 23, the arc periphery 2321a of the second frame 2321 is joined to the concave portion 2322a of the second panel 2322 along the lateral extent of the concave portion 2322a, and the second frame 2321 is joined along the second panel 2322 at a first end of the second panel 2322.

Within the third example embodiment 23, the first panel 2312 of the first door piece 231 is formed with different lateral lengths. More specifically, its first end shall have a first lateral length that is preferably equivalent to the arc length of the arc periphery 2311a of the first frame 2311. Along the longitudinal extent of the first panel 2312, there is a steep change in its lateral length, and it will have a second lateral length that is preferably equivalent to at least half the arc length of the arc periphery 2311a of the first frame 2311. Preferably, this change in lateral length is formed with a right angle, and the edge that defines this change may be henceforth referred to as a discontinuation portion. With this, by way of example, the first panel 2312 may be in the form of a curved "L" shape.

Within the third example embodiment 23, the first panel 2312 of the first door piece 231 is further formed with a serrated surface profile 2312c along the concave portion 2312a, which may extend laterally across the concave portion 2312a. Preferably, this serrated surface profile 2312c is at a distance away from the first end of the first panel 2312, and is located around the discontinuation portion of the first panel 2312. More specifically, it is formed along the first panel 2312 laterally along the first panel 2312 having the first lateral length, and is adjacent to where the second lateral length along the first panel 2312 begins.

Within the second door piece 232 of the third example embodiment 23, the second frame 2321 further comprises an arcuate member 23211 joined thereto. Preferably, the arcuate member 23211 is joined to the second frame 2321 along a surface of the second frame 2321 that faces towards the first end of the second panel 2322. The arcuate member 23211 is a curved structure having a curvature that is substantially similar to the curvature of the arcuate periphery 2321a of the second frame 2321. The curved perimeter of the arcuate member 23211 is joined to the lateral portions of the second frame 2321 at a distance away from the arcuate periphery 2321a and may extend from one radial periphery to the other, or beyond both radial peripheries. Hence, the arcuate member 23211 has an arc length that is at least equivalent to or larger than the arc length of the arcuate periphery 2321a.

Within the second door piece 232 of the third example embodiment 23, the arcuate member 23211 comprises a concave portion 23211a and a convex portion 23211b. The convex portion 23211b of the arcuate member 23211 faces towards the arcuate periphery 2321a of the second frame 2321, while the convex portion 23211b faces away from the arcuate periphery 2321a of the second frame 2321. In particular, the arcuate member 23211 further comprises serrated surface profile 23211c along the convex portion 23211b.

Within the second door piece 232 of the third example embodiment 23, the second panel 2322 has a lateral length that is at least half the arc length of the arc periphery 2321a of the second frame 2321, or a lateral length that is equivalent to the second lateral length along the first panel 2312 of the first door piece 231. Preferably, second frame 2321 and the second panel 2322 are joined in such a way that a vertex of the second frame 2321 that includes the arc periphery 2321a and one radial periphery meets with a vertex of the second panel 2322.

Within the third example embodiment 23, it is to be noted that the first panel 2312 of the first door piece 231 has a longitudinal length that is substantially longer than the second panel 2322 of the second door piece 232. More specifically, the second panel 2322 of the second piece 232 extends from the discontinuation portion of the first panel 2312 of the first door piece 231 to the second end of the first panel 2312 of the first door piece 231.

Furthermore, when the third example embodiment 23 is formed from assembly of the first door piece 231 and the second door piece 232, (i) the first frame 2311 and the second frame 2321 are substantially aligned to each other, (ii) the first panel 2312 and the second panel 2322 are substantially in symmetry with each other when viewed from the front, and (iii) the serrated surface profile 2312c of the first panel 2312 will be aligned to and underneath the serrated surface profile 23211c of the arcuate member 23211.

Within the third example embodiment 23, its plate piece 233 may include a first cut out and a second cut out. These aforementioned features of the plate piece 233 of the third example embodiment 23 may be substantially similar to those of the plate piece 213 of the first example embodiment 21 in terms of their structure and configuration, hence, their descriptions thereof shall not be repeated.

Within the third example embodiment 23, its plurality of support members includes first support member 2341 and a second support member 2342.

The first support member 2341 of the third example embodiment 23 is substantially similar to the first support member 2141 of the first example embodiment 21 in terms of its structure and configuration with the door pieces. Hence, its description thereof shall not be repeated. With this, it is understood that within the third example embodiment 23, there is a space that is defined to be between the first frame 2311 of the first door piece 231 and the second frame 2321 of the second door piece 232, which shall henceforth be referred to as a "transmission member space."

The second support member 2342 is a shaft or rod-like structure that acts as an intermediary between at least one driving unit and the door pieces 231, 232. Moreover, the second support member 2342 has a first end that is connected to a driving unit, and its remaining portions penetrate through the second cut-out formed on the plate piece 233 to reach the transmission member space. Moreover, the second support member 2342 has a length that extends until its second end is substantially adjacent or near to the first frame 2311 of the first door piece 231.

Within the third example embodiment 23, it only has a single transmission member that includes a first transmission member 2351.

In particular, within the third example embodiment 23, there are no gear trains, and the first transmission member 2351 may directly actuate both door pieces 231, 232.

The first transmission member 2351 is mounted on the second support member 2342. More specifically, the first transmission member 2351 is along the second support member 2342, and is in engagement with the first panel 2312 of the first door piece 231 and the second frame panel 2322 of the second door piece 232. Even more specifically, the first transmission member 2351 is in engagement with both the serrated surface profile 2312c of the first panel 2312 and the serrated surface profile 23211c of the arcuate member 23211 of the second frame 2321.

The first transmission member 2251 is in the form of a gear, and by way of example, it may be a conventional spur gear, helical gear, or the like.

It is to be noted that within the third example embodiment 23, the distance between its first frame 2311 and its second frame 2321 may be shorter than the distance between the first frame 2111 and the second frame 2121 of the first example embodiment 21 due to a lesser amount of transmission members being present. This shall allow maximise space usage of the panels 2312, 2322 of the third example embodiment 23.

Whilst it has been shown in FIGS. 35-44 that the first transmission member 2351 is positionally placed at a midpoint along the first lateral length of the first panel 2312, it is to be noted that the first transmission member 2351 may be also positionally placed adjacently along a lateral edge of the first panel 2312 and be configured accordingly to perform its intended functionality.

The operational steps of the third example embodiment 23 for it to transition from the close state to the open state shall now be described. These steps are to occur in a near-simultaneous manner or a sequential manner.

In a first step of opening, the step of driving second support member 2342 to axially rotate about a first direction is performed. The first direction may be, for example, a clockwise direction. With this, the first transmission member 2351 is driven to axially rotate about the first direction.

In a second step of opening, the step of actuating the door pieces 231, 232 is performed.

More specifically, the first transmission member 2351, which is in engagement with the serrated surface profile 2312c of the first panel 2312 of the first door piece 231 and in engagement with the serrated surface profile 23211c of the arcuate member 23211 of the second frame 2321 of the second door piece 232, causes both door pieces 231, 232 to rotate with respect to the first support member 2341.

Since the serrated surface profiles 2312c, 23211c engaged with the first transmission member 2351 are in substantial opposition with respect to each other, the axial rotation of the first transmission member 2351 about the first direction shall cause both door pieces 231, 232 to move in opposing directions and away from each other. Preferably, each door piece 231, 232 experiences an equal and opposing force, and shall rotatably move, or counter-rotate, by an equal angle and distance with respect to each other while hinged to the first support member 2341.

In a third step of opening, the step of moving the door pieces 231, 232 until both frames 2311, 2321 are at a maximum separation angle between each other is performed.

In particular, this occurs when the first transmission member 2351 had traversed or tracked through portions of or an entire arc of both serrated surface profiles 2312c, 23211c of the first door piece 231 and the second door piece 232. With this, the panels 2312, 2322 will be maximally separated from each other. The third example embodiment 23 will now be in an open state.

The operational steps of the third example embodiment 23 for it to transition from the open state to the close shall now be described. These steps are to occur in a near-simultaneous manner or a sequential manner.

In a first step of closing, the step of driving the second support member 2342 to axially rotate about a second direction is performed. The second direction may be, for example, an anti-clockwise direction. With this, the first transmission member 2351 is driven to axially rotate about the second direction.

In a second step of closing, the step of actuating the door pieces 231, 232 is performed.

More specifically, the first transmission member 2351, which is in engagement with the serrated surface profile 2312c of the first panel 2312 of the first door piece 231 and in engagement with the serrated surface profile 23211c of the arcuate member 23211 of the second frame 2321 of the second door piece 232, causes both door pieces 231, 232 to rotate with respect to the first support member 2341. The axial rotation of the first transmission member 2351 about the second direction shall cause both door pieces 231, 232 to move in opposing directions and approach each other. Preferably, each door piece 231, 232 experiences an equal and opposing force, and shall rotatably move, or counter-rotate, by an equal angle and distance with respect to each other while hinged to the first support member 2341.

In a third step of closing, the step of moving the door pieces 231, 232 until both frames 2311, 2321 are at a minimum separation angle between each other is performed.

In particular, this occurs when the first transmission member 2351 had traversed or tracked through portions of or an entire arc of both serrated surface profiles 2312c, 23211c of the first door piece 231 and the second door piece 232. With this, the panels 2312, 2322 will be minimally separated from each other and preferable meet. The third example embodiment 23 will now be in a close state.

FIGS. 45-53 are depictions of the door assembly 2 in a fourth example embodiment 24, which shall henceforth be directly referred to as the "fourth example embodiment."

Figure 45:
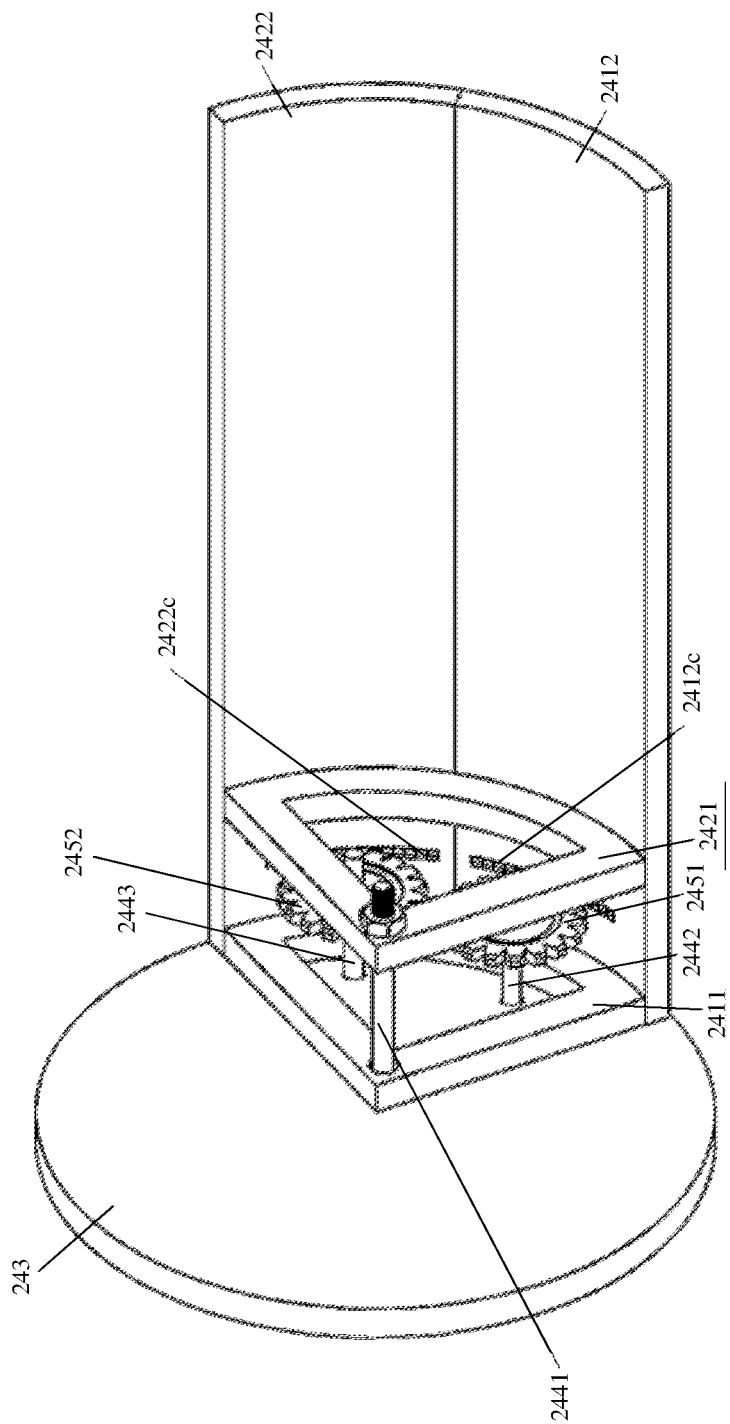
FIG. 45 is a diagram illustrating a perspective view of the door assembly, as provided by the present invention, in a fourth example embodiment.

In particular, FIG. 45 illustrates a perspective view of this fourth example embodiment 24.

Figure 47:
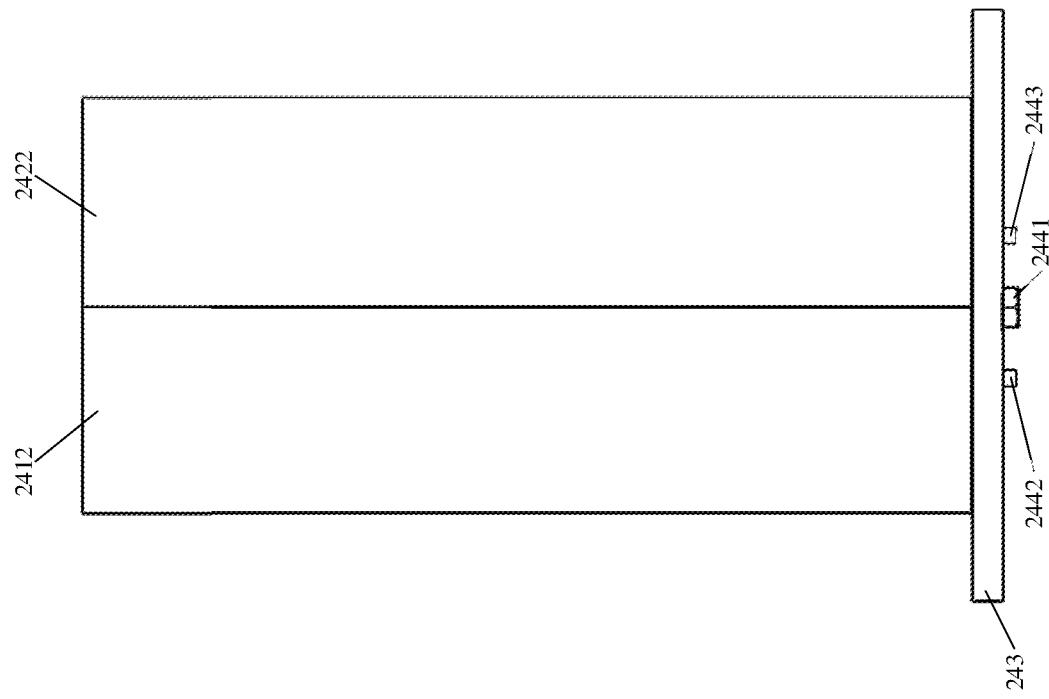
FIG. 47 is a diagram illustrating a bottom view of the door assembly of the fourth example embodiment as shown in FIG. 45, when it is in a close state.
Figure 46:
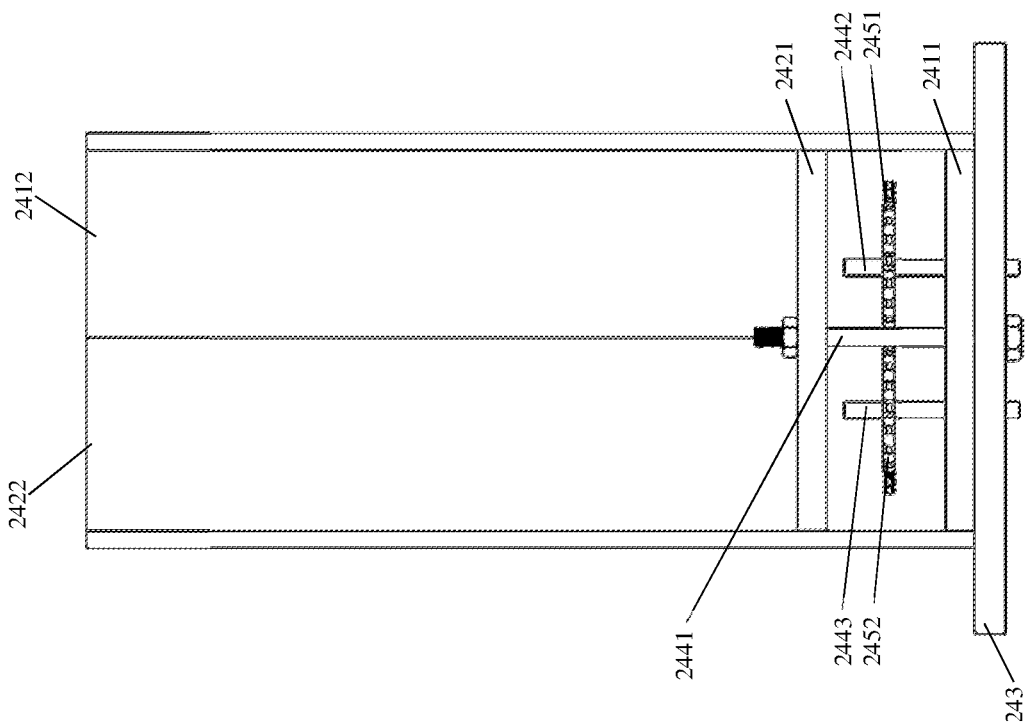
FIG. 46 is a diagram illustrating a top view of the door assembly of the fourth example embodiment as shown in FIG. 45, when it is in a close state.

In particular, FIGS. 46-47 illustrate top views of the fourth example embodiment 24. More specifically, FIG. 46 illustrates its top view when it is in a close state, and FIG. 47 illustrates its bottom view when it is in a close state.

Figure 48:
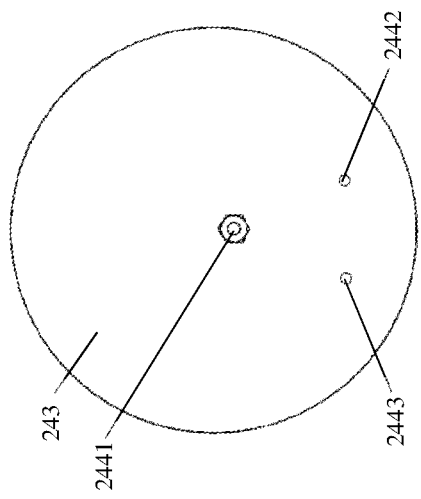
FIG. 48 is a diagram illustrating a rear view of the door assembly of the fourth example embodiment as shown in FIG. 45.
Figure 49:
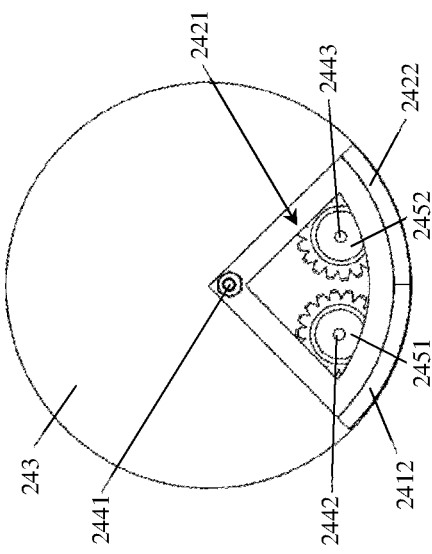
FIG. 49 is a diagram illustrating a front view of the door assembly of the fourth example embodiment as shown in FIG. 45, when it is in a close state.

In particular, FIGS. 48-49 illustrate rear and front views of the fourth example embodiment 24. More specifically, FIG. 48 illustrates its rear view, and FIG. 49 illustrates its front view when it is in a close state.

Figure 50:
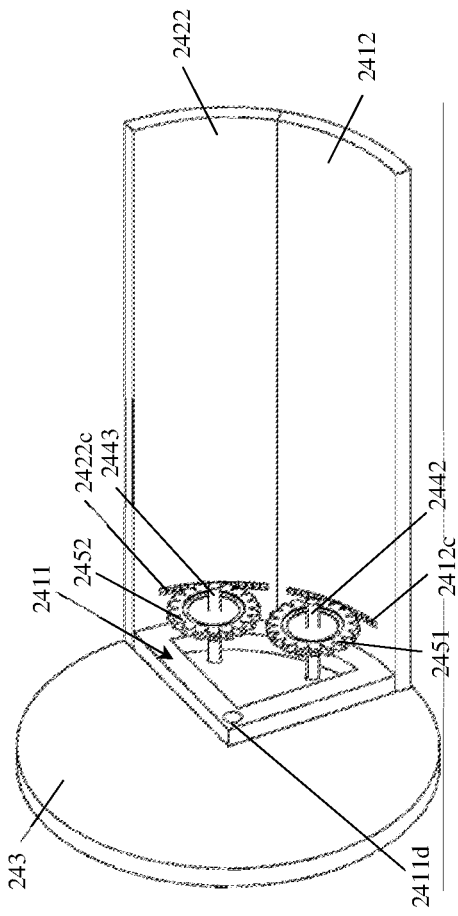
FIG. 50 is a diagram illustrating a perspective top view of the door assembly of the fourth example embodiment as shown in FIG. 45, when it is in a close state.
Figure 51:
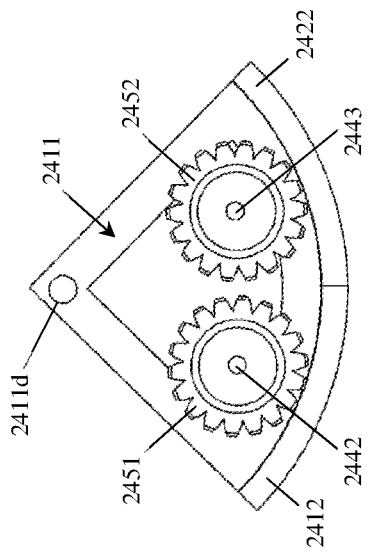
FIG. 51 is a diagram illustrating a rear view of the first door piece and the second door piece of the door assembly of the fourth example embodiment as shown in FIG. 45, when it is in a close state.

In particular, FIGS. 50-51 illustrate further perspective views of the fourth example embodiment 24 without its second frame. More specifically, FIG. 50 illustrates a perspective without its second frame, and FIG. 51 illustrates its front view without its second frame when it is in a close state.

Figure 52:
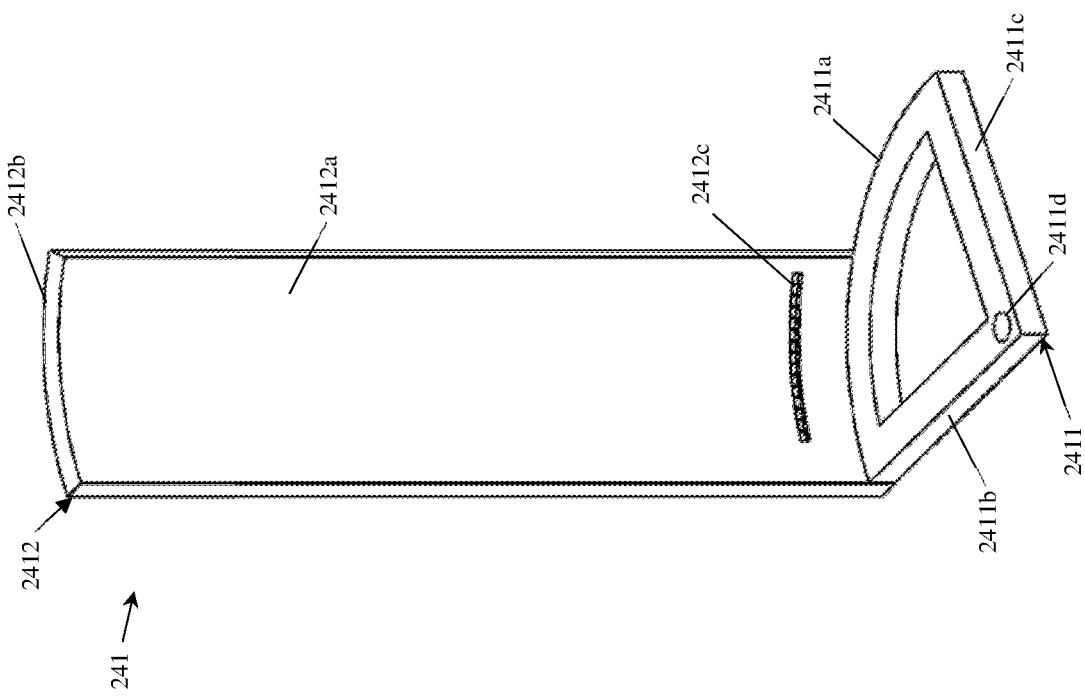
FIG. 52 is a diagram illustrating a perspective front view of the first door piece of the door assembly of the fourth example embodiment as shown in FIG. 45.

In particular, FIG. 52 illustrates a perspective view of the first door piece of the fourth example embodiment 24.

Figure 53:
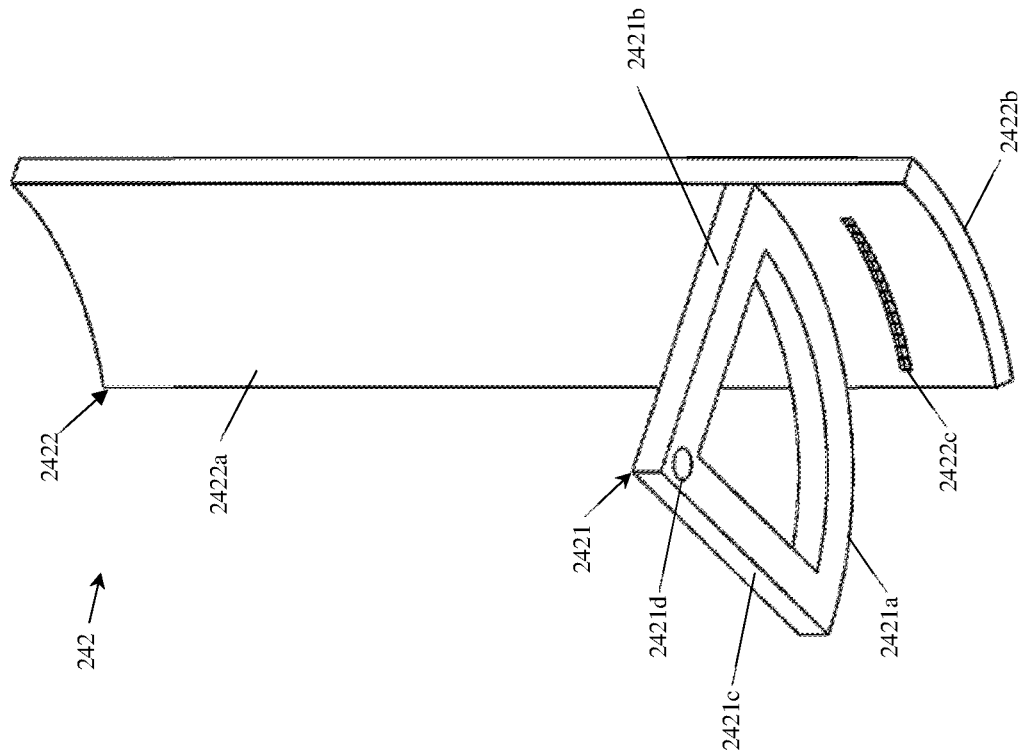
FIG. 53 is a diagram illustrating a perspective bottom view of the second door piece of the door assembly of the fourth example embodiment as shown in FIG. 45.

In particular, FIG. 53 illustrates a perspective view of the second door piece of the fourth example embodiment 24.

The fourth example embodiment 24 shall now be described based on FIGS. 45-53.

The fourth example embodiment 24 at least comprises a first door piece 241, a second door piece 242, and a plate piece 243 in which the first door piece 241 and the second door piece 242 are in substantial connection thereto. Furthermore, for this fourth example embodiment 24 to operate accordingly, it further comprises a plurality of support members, and a plurality of transmission members.

However, within the fourth example embodiment 24, it has no gear train as it is configured to have two gears that each directly actuates corresponding door pieces 241, 242 in a manner that is different from the first example embodiment 21. More specifically, there is one gear that is substantially engaged with one panel of a door piece, and another gear that is substantially engaged with one panel of a remaining door piece. Hence, the configuration of the support members and transmission members within the fourth example embodiment 24 differs from the first example embodiment 21.

Within the fourth example embodiment 24, its first door piece 241 includes a first frame 2411 and a first panel 2412. Its first frame 2411 includes an arc periphery 2411a, radial peripheries that include a first radial periphery 2411b and a second radial periphery 2411c, a receiving point 2411d, and a mass-reducing portion. Its first panel 2412 includes a concave portion 2412a and a convex portion 2412b. These aforementioned features of the first door piece 241 of the fourth example embodiment 24 are substantially similar to those of the first door piece 211 of the first example embodiment 21 in terms of their structure and configuration, and hence, their descriptions thereof shall not be repeated.

Within the fourth example embodiment 24, its second door piece 242 includes a second frame 2421 and a second panel 2422. Its second frame 2421 includes an arc periphery 2421a, radial peripheries that include a first radial periphery 2421b and a second radial periphery 2421c, a receiving point 2421d, and a mass-reducing portion. Its second panel 2422 includes a concave portion 2422a and a convex portion 2422b. These aforementioned features of the second door piece 242 of the fourth example embodiment 24 are substantially similar to those of the second door piece 212 of the first example embodiment 21 in terms of their structure and configuration, and hence, their descriptions thereof shall not be repeated.

Within the first piece 241 of the fourth example embodiment 24, its first panel 2412 is further formed with a serrated surface profile 2412c along the concave portion 2412a, which may extend laterally across the concave portion 2412a.

Within the second piece 242 of the fourth example embodiment 24, its second panel 2422 is further formed with a serrated surface profile 2422c along the concave portion 2422a, which may extend laterally across the concave portion 2422a.

Within the fourth example embodiment 24, it is noted that the first door piece 241 and the second door piece 242 are dimensionally similar to each other. More specifically, the first frame 2411 and the second frame 2421 are congruent. More specifically, the first panel 2412 and the second panel 2422 have similar lateral and longitudinal lengths.

Furthermore, when the fourth example embodiment 24 is formed from assembly of the first door piece 241 and the second door piece 242, (i) the first frame 2411 and the second frame 2421 are substantially aligned to each other, and (ii) the first panel 2412 and the second panel 2422 are substantially in symmetry with each other with their serrated surface profiles 2412c, 2422c substantially being in alignment.

Within the fourth example embodiment 24, its plate piece 243 may include a first cut-out, a second cut-out, and a third cut-out. These aforementioned features of the plate piece 243 of the fourth example embodiment 24 may be substantially similar to those of the plate piece 223 of the second example embodiment 22 in terms of their structure and configuration, hence, their descriptions thereof shall not be repeated.

Within the fourth example embodiment 24, its plurality of support members includes a first support member 2441, a second support member 2442, and a third support member 2443.

The first support member 2441 of the fourth example embodiment 24 is substantially similar to the first support member 2141 of the first example embodiment 21 in terms of its structure and configuration with the door pieces. Hence, its description thereof shall not be repeated. With this, it is understood that there is a space that is defined to be between the first frame 2411 of the first door piece 241 and the second frame 2421 of the second door piece 242, which shall henceforth be referred to as a "transmission member space."

The second support member 2442 and the third support member 2443 are shafts or rod-like structures that act as intermediaries between at least one driving unit and the door pieces 241, 242.

The second support member 2442 has a first end that is connected to a driving unit, and its remaining portions penetrate through the second cut-out formed on the plate piece 243 to reach the transmission member space. The third support member 2443 also has a first end that is connected to a driving unit, and its remaining portions penetrate through the third cut-out formed on the plate piece 243 to reach the transmission member space. The first end of the second support member 2442 and the third support member 2443 may be connected to different driving units or a diving unit of the same.

The second support member 2442 and the third support member 2443 have lengths that extend until their second ends are substantially adjacent or near to the first frame 2411 of the first door piece 241. Furthermore, the second support member 2442 may be positionally nearer to the first panel 2412 compared to the third support member 2443, while the third support member 2443 may be positionally nearer to the second panel 2422 compared to the second support member 2442. Preferably, the second support member 2442 and the third support member 2443 are both coplanar with respect to a longitudinal axis of the fuselage 10, and they are also both parallel to the first support member 2441.

Within the fourth example embodiment 24, its plurality of transmission members includes a first transmission member 2451 and a second transmission member 2452.

In particular, within the fourth example embodiment 24, there are no gear trains, and the first transmission member 2451 may actuate one door piece, while the second transmission member 2452 may actuate the remaining door piece.

The first transmission member 2451 is mounted on the second support member 2442. More specifically, the first transmission member 2451 is along the second support member 2442, and is in engagement with the first panel 2412 of the first door piece 241. Even more specifically, the first transmission member 2451 is in engagement with the serrated surface profiles 2412*c* of the first panel 2412 of the first door piece 241.

The second transmission member 2452 is mounted on the third support member 2443. More specifically, the second transmission member 2452 is along the third support member 2443, and is in engagement with the second panel 2422 of the second door piece 242. Even more specifically, the second transmission member 2452 is in engagement with the serrated surface profiles 2422*c* of the second panel 2422 of the second door piece 242.

The first transmission member 2451 and second transmission member 2452 may be in the form of a conventional spur gear, helical gear, or the like.

It is to be noted that within the fourth example embodiment 24, the distance between its first frame 2411 and its second frame 2421 may be shorter than the distance between the first frame 2111 and the second frame 2121 of the first example embodiment 21 due to a lesser amount of transmission members being present. This shall allow maximise space usage of the panels 2412, 2422 of the fourth example embodiment 24.

Whilst it has been shown in FIGS. 45-53 that the first transmission member 2451 and the second transmission member 2452 are each positionally placed along the lateral extent of the panels 2412, 2422, it is to be noted that the transmission member 2451, 2452 may each be positionally placed adjacently along a lateral edge of the first panel 2412 and the second panel 2422, respectively, and may both be configured accordingly to perform their intended functionalities.

The operational steps of the fourth example embodiment 24 for it to transition from the close state to the open state shall now be described. These steps are to occur in a near-simultaneous manner or a sequential manner.

In a first step of opening, the step of driving the second support member 2442 to axially rotate about a first direction is performed and driving the third support member 2243 to axially rotate about a second direction is performed. The first direction may be, for example, a clockwise direction, and the second direction, may be, for example, an anti-clockwise direction. With this, the first transmission member 2451 is driven to axially rotate about the first direction, and the second transmission member 2452 is driven to axially rotate about the second direction.

In a second step of opening, the step of actuating the door pieces 241,242 by the first transmission member 2451 and the second transmission member 2452 is performed.

More specifically, the first transmission member 2451, which in engagement with the serrated surface profile 2412*c* of the first panel 2412 causes the first frame 2411 to rotatably move during its axial rotation along the first direction, thereby causing a rotation of the first door piece 241 with respect to the first support member 2441.

More specifically, the second transmission member 2452, which in engagement with the serrated surface profile 2422*c* of the second panel 2422 causes the second frame 2421 to rotatably move during its axial rotation along the second direction, thereby causing a rotation of the second door piece 242 with respect to the first support member 2441.

Since the first direction and the second direction are opposite of each other, during the third step, the first door piece 241 and the second door piece 242 shall move in opposing directions and away from each other. Preferably, each door piece 241, 242 experiences an equal and opposing force, and shall rotatably move, or counter-rotate, by an equal angle and distance with respect to each other while hinged to the first support member 2441.

In a third step of opening, the step of moving the door pieces 241, 242 until both frames 2411, 2421 are at a maximum separation angle between each other is performed.

In particular, this occurs when the first transmission member 2451 had traversed or tracked through portions of or an entire arc of the serrated surface profile 2412*c* of the first panel 2412, and the second transmission member 2452 had traversed or tracked through portions of or an entire arc of the serrated surface profile 2422*c* of the second panel 2422. With this, the panels 2412, 2422 will be maximally separated from each other. The fourth example embodiment 24 will now be in an open state.

The operational steps of the fourth example embodiment 24 for it to transition from the open state to the close state shall now be described. These steps are to occur in a near-simultaneous manner or a sequential manner.

In a first step of closing, the step of driving the second support member 2442 to axially rotate about a third direction is performed and driving the third support member 2243 to axially rotate about a fourth direction is performed. The third direction, may be, for example, an anti-clockwise direction, and the fourth direction, may be, for example, a clockwise direction. With this, the first transmission member 2451 is driven to axially rotate about the third direction, and the second transmission member 2452 is driven to axially rotate about the fourth direction.

In a second step of closing, the step of actuating the door pieces 241,242 by the first transmission member 2451 and the second transmission member 2452 is performed.

More specifically, the first transmission member 2451, which in engagement with the serrated surface profile 2412*c* of the first panel 2412 causes the first frame 2411 to rotatably move during its axial rotation along the third direction, thereby causing a rotation of the first door piece 241 with respect to the first support member 2441.

More specifically, the second transmission member 2452, which in engagement with the serrated surface profile 2422*c* of the second panel 2422 causes the second frame 2421 to rotatably move during its axial rotation along the fourth direction, thereby causing a rotation of the second door piece 242 with respect to the first support member 2441.

Since the first direction and the second direction are opposite of each other, during the third step, the first door piece 241 and the second door piece 242 shall move in opposing directions and approach each other. Preferably, each door piece 241, 242 experiences an equal and opposing force, and shall rotatably move, or counter rotate, by an equal angle and distance with respect to each other while hinged to the first support member 2441.

In a third step of closing, the step of moving the door pieces 241, 242 until both frames 2411, 2421 are at a minimum separation angle between each other is performed.

In particular, this occurs when the first transmission member 2451 had traversed or tracked through portions of or an entire arc of the serrated surface profile 2412*c* of the first panel 2412, and the second transmission member 2452 had traversed or tracked through portions of or an entire arc of the serrated surface profile 2422*c* of the second panel 2422. With this, the panels 2412, 2422 will be minimally separated from each other and preferably meet. The fourth example embodiment 24 will now be in a close state.

Figure 54:
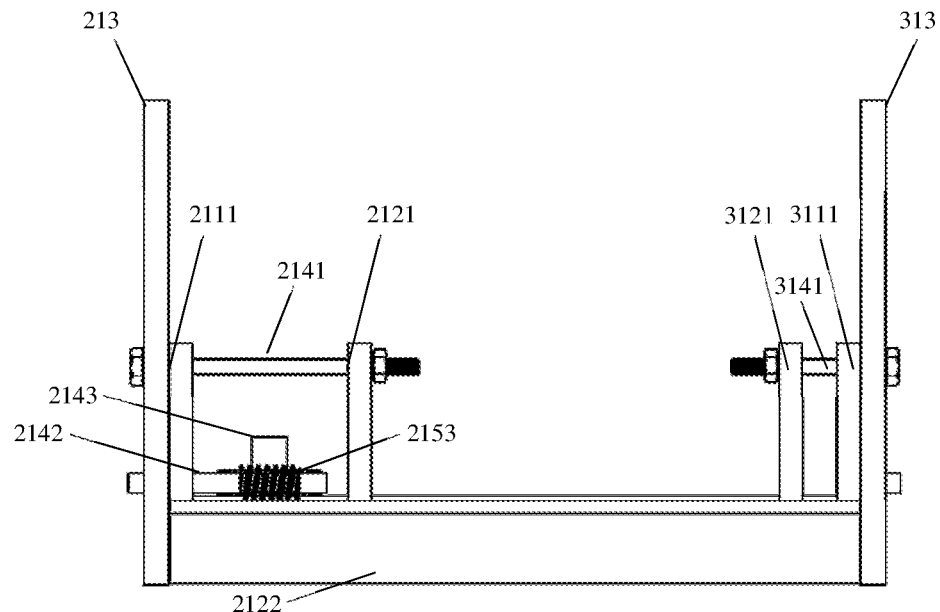
FIG. 54 is a diagram illustrating a side view of a door assembly of the present invention that is configured to further include ancillary members.
Figure 55:
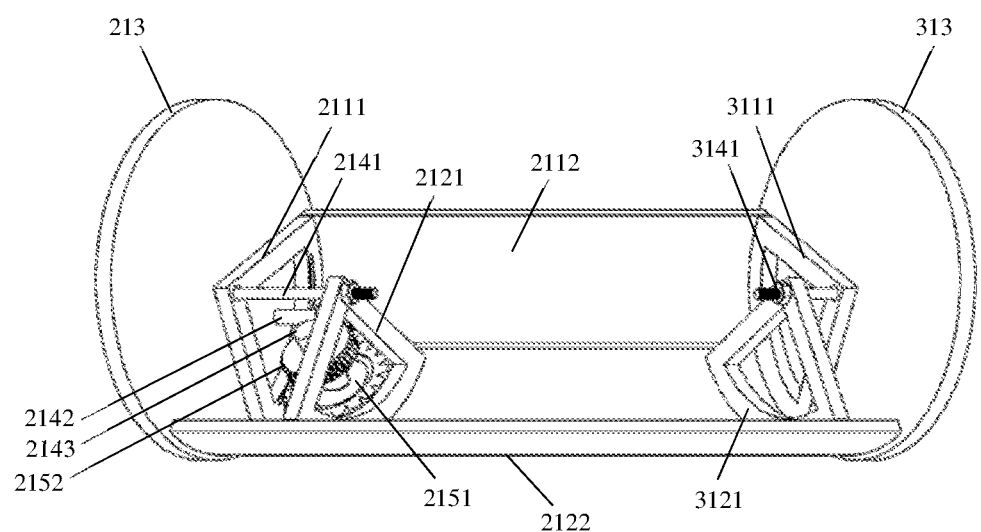
FIG. 55 is a diagram illustrating a perspective top view of the door assembly of the present invention that is configured to further include ancillary members.

FIGS. 54-55 illustrates an example configuration of the door assembly configured to further include ancillary members at opposing ends of its panels, which are to provide further support. In particular, FIG. 54 illustrates such a side view of such a configuration, while FIG. 55 illustrates a perspective view of such a configuration. The door assembly is illustrated in FIGS. 54-55 corresponds to the door assembly of the first example embodiment 21, but the concepts of this example configuration may similarly extend to the other example embodiments as described.

In particular, for the first example embodiment 21, such a configuration shall have the door assembly further include ancillary members such as a first ancillary frame 3111, a second ancillary frame 3121, and an ancillary plate piece 313, which are in connection with each other with the first ancillary frame 3111 and second ancillary frame 3121 hinged to an additional support member 3141 that extends from the ancillary plate piece 313. The first ancillary frame 3111 may be joined to the first panel 2112 in a manner similar to the first frame 2111, while the second ancillary frame 3121 may be joined to the second panel 2122 in a manner similar to the second frame 2121. Such a configuration is to provide further support by ensuring the stability of both panels 2112, 2122 as they assume between the open state and the close state. In particular, the ancillary plate piece 313 may provide functionality that is similar to partitions 13.

Furthermore, it is to be noted that the distance between the first ancillary frame 3111 and the second ancillary frame 3121 may be shorter than the distance between the first frame 2111 and the second frame 2121 to maximise space of the panels 2112, 2122.

Figure 56:
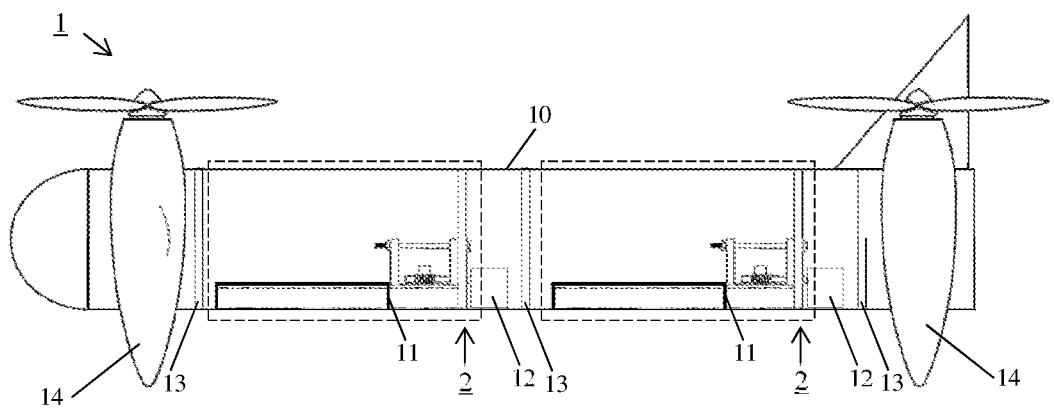
FIG. 56 is a diagram illustrating a side view of a first example aerial vehicle that is configured to have more than one door assemblies of the present invention.
Figure 57:
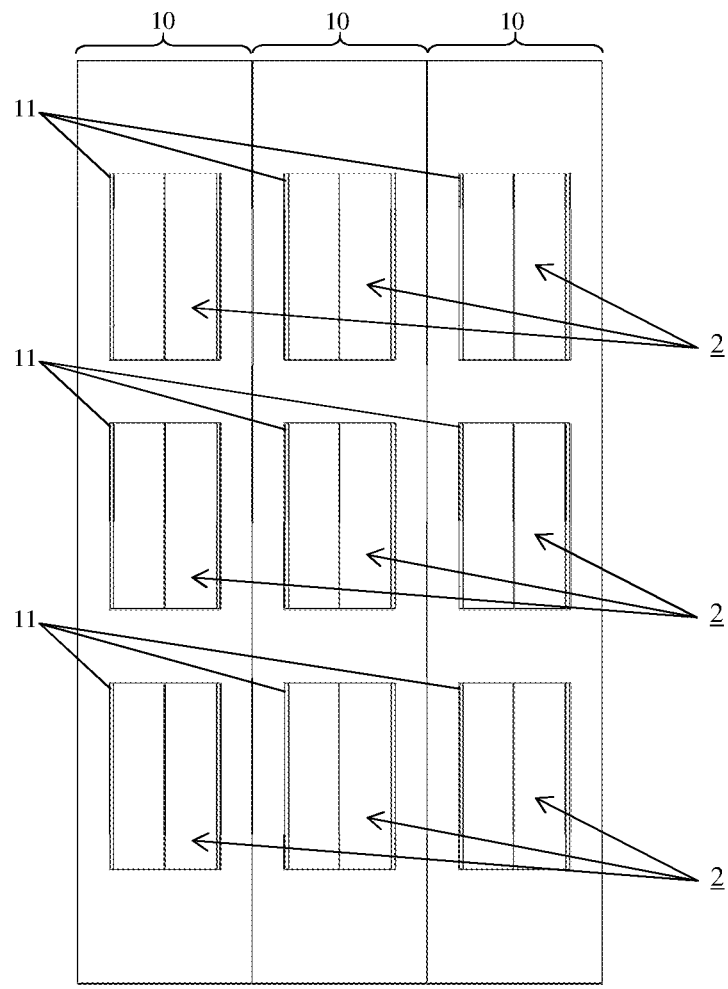
FIG. 57 is a diagram illustrating a bottom view of a second example aerial vehicle that is configured to have more than one door assemblies of the present invention.

FIGS. 56-57 illustrates an example configuration of the aerial vehicle 1 for it to have a plurality of door assemblies 2 which may be according to any one of the first example embodiment 21 to the fourth example embodiment 24.

In particular, FIG. 56 illustrates a side view of an example aerial vehicle 1 having a fuselage 10 of the aerial vehicle accommodates more than one door assembly 2. Thus, in such a configuration, the aerial vehicle 1 has an array of door assemblies 2 and corresponding driving units 13. Each door assembly 2 may be configured to open and close independent manner. Furthermore, each door assembly 2 is to correspond to a compartment within the fuselage of the aerial vehicle 1, the compartment is defined to be a space that extends between two partitions 13, between a partition 13 and a plate piece of the door assembly, or between, or between an ancillary plate piece and a plate piece of the door assembly.

In particular, FIG. 57 illustrates a bottom view of an example aerial vehicle 1 where it has a primary body or fuselage 100 with multiple secondary bodies or fuselages 110. Each secondary bodies or fuselages 110 may accommodate a plurality of door assemblies 2 therein. Thus, in such a configuration, the aerial vehicle 1 has a matrix of door assemblies 2. Each door assembly 2 may be configured to open and close independently according to as previously described. There shall be one or more compartments independently according to as previously described.

FIGS. 58-64 are a series of diagrams illustrating a method flow for delivering goods that involves an example delivery good being dispatched, via a system for delivering goods that includes an aerial vehicle 1 having at least one door assembly 2 of the present invention.

FIGS. 65-69 are diagrams illustrating a method flow for delivering goods that involves the example delivery good being received, via the system for delivering goods that includes the aerial vehicle 1 having at least one door assembly 2 of the present invention.

Preferably, the system for delivering goods may include a dispatch platform 8 comprising a base 81 in which one or more receiving members 82 and at least one stage 83 thereon. Preferably as well, at least one delivery good 7 is to be placed upon the stage 83.

In particular, the receiving members 82 are to receive the tilt-wing assemblies 14 of the aerial vehicle 1 as the aerial vehicle 1 lands on the dispatch platform 8. The receiving members 82 are preferably inverted conical, inverted frustoconical, or funnel-like in shape, so that the tilt-wing assemblies 14 of the aerial vehicle 1 may substantially fit into them during the landing of the aerial vehicle 1. Preferably, each receiving member 82 is uniform in terms of its shape, orientation, and dimension. As the aerial vehicle 1 lands on the dispatch platform 8, each end of its tilt-wing assemblies 14 is to be fitted or rested within the receiving members 82. More specifically, the tilt-wing assemblies 14 of the aerial vehicle 1 enter receiving members 82 and subsequently slide to a bottommost portion of the receiving members 82 by force of gravity. Thus, the aerial vehicle 1 substantially becomes levelled without tilt. The receiving members 82 may be distributed across the dispatch platform 8 in a manner that takes into consideration the size of the aerial vehicle 1 and the locations of its tilt-wing assemblies 14. In one example of the dispatch platform 8, there are four receiving members 82 that each correspond receive a tilt wing assembly of the aerial vehicle 1.

In particular, the stage 83 allows placement of the delivery good 7 in an elevated manner with respect to the receiving members 82. Preferably, the upper portion of the stage 83 is substantially tapered so that it may have a substantially frustum-like shape. The upper portion of the stage 83 may also have a footprint that is substantially smaller than the area of the delivery goods placed thereupon. The stage 83 may be located along the dispatch platform 8 in a manner that takes into consideration the size of the aerial vehicle 1 and the locations of its door assemblies 2. Preferably, the dispatch platform 8 has at least one stage 83 in which the delivery good 7 is placed, but this number may vary depending on configurations of the aerial vehicle 1.

Preferably, the system for delivering goods may include a receipt platform 9 comprising a base 91 having one or more receiving members 92. Preferably as well, at least one delivery goods 7 is to be dropped onto the base 91. The structure and function of the receiving members 92 of the receipt platform 9 is similar to the receiving members 82 of the dispatch. Hence, their descriptions thereof shall not be repeated.

In particular, the aerial vehicle 1 may further include at least one computer that acts as a flight controller, delivery controller, and door assembly controller so that it may appropriately operate within the system for delivering goods.

In particular, the aerial vehicle 1 may further include Global Positioning System (GPS) sensors, or the like, so that the aerial vehicle 1 may be enabled to travel between locations along a flight path accurately.

In particular, the aerial vehicle 1 may further include at least one detection means, while the dispatch platform 8 and the receipt platform 9 may further include at least one identification means. This is so that the aerial vehicle 1 may detect either one or both the dispatch platform 8 or the receipt platform 9 upon arrival at a location and lands thereon.

The method flow for delivering goods that involves an example delivery goods 7 being dispatched now be described based on FIGS. 58-64. It is noted that the steps described for the method are not to be interpreted as non-limiting, and minor modifications to the steps (e.g., combinations, additions, omissions, or swaps) are permissible by a skilled person without substantial deviation from as described. Furthermore, all steps or some of the steps may occur in a simultaneous or non-simultaneous manner.

Figure 58:
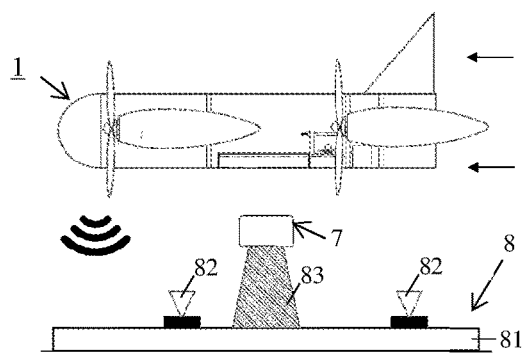
FIG. 58 is a diagram illustrating a first step of a method flow for delivering goods that involves an example payload being dispatched, via a system for delivering goods that includes an aerial vehicle having at least one door assembly of the present invention.

In a first step as shown in FIG. 58, the step of placing a delivery goods 7 onto the stage 83 of the dispatch platform 8 is performed. Furthermore, this step may further include the arrival of an aerial vehicle 1, having at least one compartment that is without delivery goods, which detects the dispatch platform 8. The step may further include the aerial vehicle 1 detecting the location of receiving member 82 of the dispatch platform 8.

Figure 59:
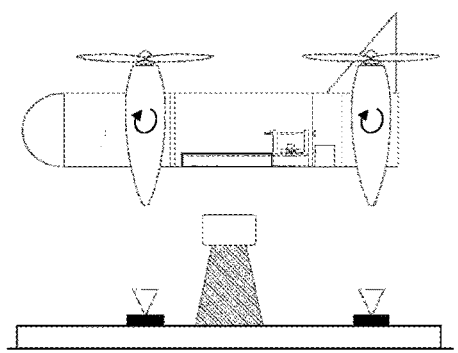
FIG. 59 is a diagram illustrating a second step of a method flow for delivering goods that involves an example payload being dispatched, via a system for delivering goods that includes an aerial vehicle having at least one door assembly of the present invention.

In a second step as shown in FIG. 59, the step of rotating, by the aerial vehicle 1, its tilt assemblies 14, is performed. With this, the aerial vehicle may begin its vertical descent.

Figure 60:
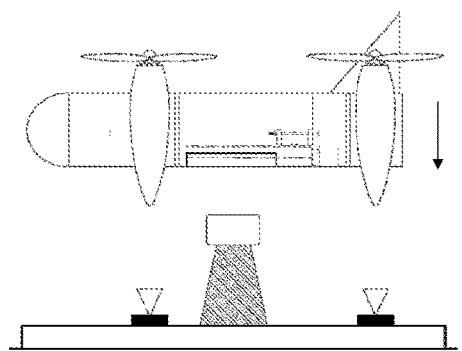
FIG. 60 is a diagram illustrating a third step of a method flow for delivering goods that involves an example payload being dispatched, via a system for delivering goods that includes an aerial vehicle having at least one door assembly of the present invention.

In a third step as shown in FIG. 60, the step of actuating a door assembly 2, which corresponds to a compartment that is without a delivery goods, is performed. In particular, the door assembly 2 is actuated for it to transition from a close state to an open state, through its door pieces being rotatably moved, more specifically, with them being counter-rotated. Preferably, this step is performed as the aerial vehicle performs its vertical descent.

Figure 61:
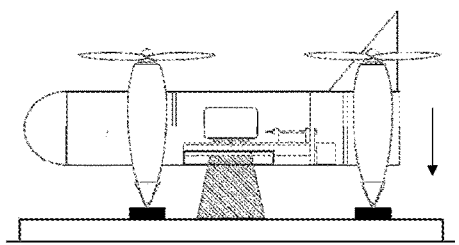
FIG. 61 is a diagram illustrating a fourth step of a method flow for delivering goods that involves an example payload being dispatched, via a system for delivering goods that includes an aerial vehicle having at least one door assembly of the present invention.

In a fourth step as shown in FIG. 61, the step of completing the vertical descent is performed by the aerial vehicle 1. In particular, during this step, as the blades of the tilt-wing assemblies 14 of the aerial vehicle 1 stop rotating, the tilt-wing assemblies 14 fit into the receiving members 82 by force of gravity for them to rest thereupon. With this, the aerial vehicle 1 is now levelled without tilt. Furthermore, at this point, since the door assembly 2 of the aerial vehicle 1 is in an open state, the entirety of the delivery goods 7 and portions of the stage 83 are allowed to enter the aerial vehicle 1 via its access portion 11 and become within a compartment of the fuselage 10 of the aerial vehicle 1.

Figure 62:
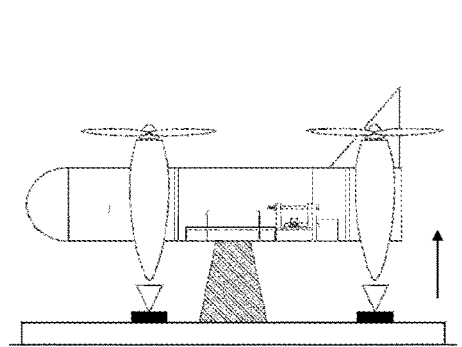
FIG. 62 is a diagram illustrating a fifth step of a method flow for delivering goods that involves an example payload being dispatched, via a system for delivering goods that includes an aerial vehicle having at least one door assembly of the present invention.

In a fifth step as shown in FIG. 62, the step of rotating the blades of the tilt-wing assemblies 14 of the aerial vehicle 1 is performed for the aerial vehicle 1 to begin its vertical ascent. Simultaneously, the door assembly 2, which was in the open state, is actuated for it to transition from the open state to the close state, through its door pieces being rotatably moved, more specifically, with them being counter-rotated. As the door assembly 2 gradually assumes the close state, it picks up the delivery goods 7 by substantially scooping the delivery goods 7 off the stage 83.

Figure 63:
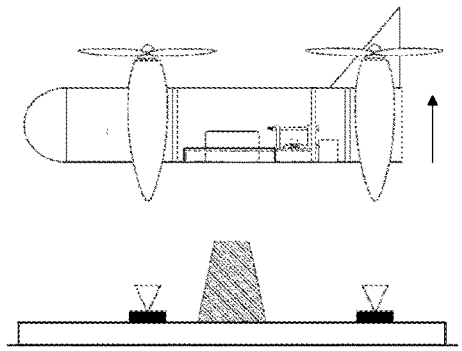
FIG. 63 is a diagram illustrating a sixth step of a method flow for delivering goods that involves an example payload being dispatched, via a system for delivering goods that includes an aerial vehicle having at least one door assembly of the present invention.

In a sixth step as shown in FIG. 63, the step of continuing the vertical ascent of the aerial vehicle 1 is performed. At this point, the delivery goods 7 have been picked up from stage 83, and are now within a compartment of the fuselage 10 of the aerial vehicle 1. Furthermore, at this point, the door assembly 2 is in a close state, and the delivery goods 7 rests against panels of the door assembly 2.

Figure 64:
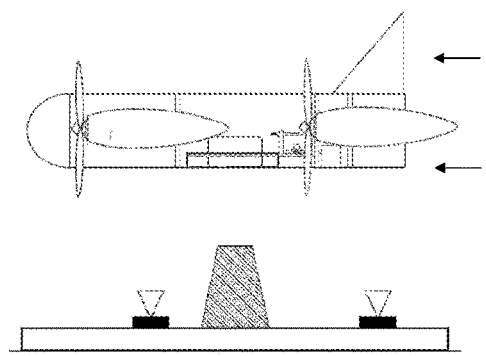
FIG. 64 is a diagram illustrating a seventh step of a method flow for delivering goods that involves an example payload being dispatched, via a system for delivering goods that includes an aerial vehicle having at least one door assembly of the present invention.

Finally, in a seventh step as shown in FIG. 64, the step of rotating, by the aerial vehicle 1, its tilt assemblies 14, is performed. With this, the aerial vehicle 1 is enabled to perform a horizontal movement for it to travel and transport the delivery goods 7 to an intended destination.

The method flow for delivering goods that involves an example delivery goods 7 being received now be described based on FIGS. 65-69. It is noted that the steps described for the method are not to be interpreted as non-limiting, and minor modifications to the steps (e.g., combinations, additions, omissions, or swaps) are permissible by a skilled person without substantial deviation from as described. Furthermore, all steps or some of the steps may occur in a simultaneous or non-simultaneous manner.

Figure 65:
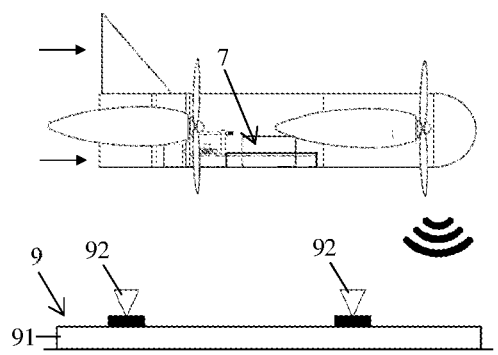
FIG. 65 is a diagram illustrating a first step of a method flow for delivering goods that involves an example payload being received, via a system for delivering goods that includes an aerial vehicle having at least one door assembly of the present invention.

In a first step as shown in FIG. 65, the step of the arriving at an intended destination, by the aerial vehicle 1, is performed. In particular, the aerial vehicle 1 includes a delivery goods 7 which is to be dropped off at the intended destination. The step may further include the aerial vehicle 1 detecting the location of a receipt platform 9. The step may further include the aerial vehicle 1 detecting the location of receiving member 92 of the receipt platform 9.

Figure 66:
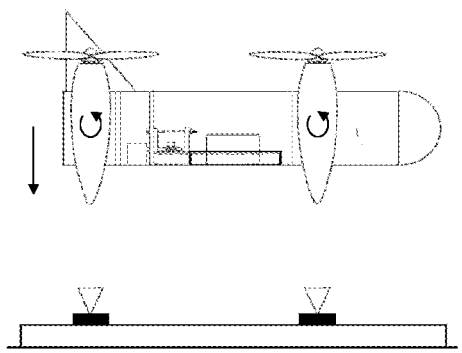
FIG. 66 is a diagram illustrating a second step of a method flow for delivering goods that involves an example payload being received, via a system for delivering goods that includes an aerial vehicle having at least one door assembly of the present invention.

In a second step as shown in FIG. 66, the step of rotating tilt assemblies 14 by the aerial vehicle 1 is performed. With this, the aerial vehicle may begin its vertical descent.

Figure 67:
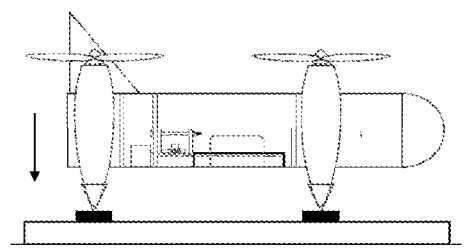
FIG. 67 is a diagram illustrating a third step of a method flow for delivering goods that involves an example payload being received, via a system for delivering goods that includes an aerial vehicle having at least one door assembly of the present invention.

In a third step as shown in FIG. 67, the step of completing the vertical descent is performed by the aerial vehicle 1. In particular, during this step, as the blades of the tilt-wing assemblies 14 of the aerial vehicle 1 stop rotating, the tilt-wing assemblies 14 fit into the receiving members 92 by force of gravity for them to rest thereupon. With this, the aerial vehicle 1 is now levelled without tilt.

Figure 68:
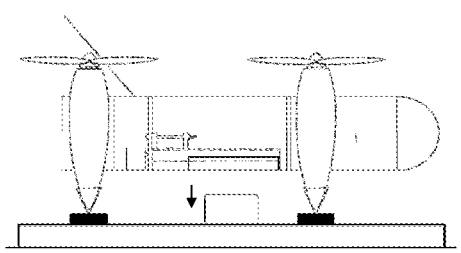
FIG. 68 is a diagram illustrating a fourth step of a method flow for delivering goods that involves an example payload being received, via a system for delivering goods that includes an aerial vehicle having at least one door assembly of the present invention.

In a fourth step as shown in FIG. 68, the step of actuating the door assembly 2 for it to transition from a close state to an open state is performed. The door pieces of the door assembly 2 are rotatable moved, or more specifically, counted-rotated for this transition between states. With this, the delivery goods 7, which was resting on the panels of the door assembly 2 is dropped off from the aerial vehicle 1 onto the base 91 of the receipt platform 9.

Figure 69:
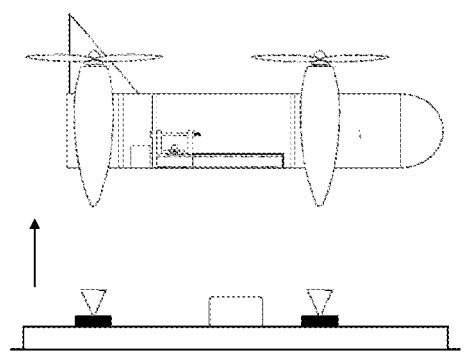
FIG. 69 is a diagram illustrating a fifth step of a method flow for delivering goods that involves an example payload being received, via a system for delivering goods that includes an aerial vehicle having at least one door assembly of the present invention.

In a fifth step as shown in FIG. 69, the step of vertically ascending is performed by the aerial vehicle 1. At this point, the delivery goods 7 have been dropped off onto the receipt platform 9. Furthermore, at this point, the door assembly 2 is actuated for it to transition from the open state to the close state, though its door pieces being rotatably moved, more specifically, with them being counter-rotated.

Finally, in a sixth step (not shown), the step of rotating, by the aerial vehicle 1, its tilt assemblies 14, is performed. With this, the aerial vehicle 1 is enabled to perform a horizontal movement for it to travel and transport the delivery goods 7 to other intended destinations.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

What is claimed is:

1. A door assembly for a fuselage of an aerial vehicle, comprising:
   a pair of complementary door pieces; and
   an actuation mechanism that includes a first transmission member;
   wherein the first transmission member actuates either one or both door pieces for portions thereof to be in a sliding action with respect to the fuselage while maintaining close conformity thereto as either one or both of them are actuated to either meet or separate;
   wherein the actuation mechanism enables the door pieces to counter-rotate for:
   the door pieces to scoop staged delivery goods, so that the delivery goods are supported thereon them, as they are actuated to meet; and
   the door pieces to release the delivery goods supported thereon, as they are actuated to separate;

wherein the door pieces comprise a first door piece that includes a first frame and a first panel, and a second door piece that includes a second frame and a second panel;

wherein the first door piece is formed by an arc periphery of the first frame being joined to a concave portion of the first panel laterally near a first end of the first panel, and the second door piece is formed by an arc periphery of the second frame being joined to a concave portion of the second panel laterally near a first end of the second panel;

wherein the first frame further comprises a serrated surface profile that is formed a distance away from its arc periphery and facing away from the first end of the first panel, and the second frame further comprises a serrated surface profile that is formed a distance away from its arc periphery and facing towards the first end of the second panel.

2. The door assembly according to claim 1, wherein the actuation mechanism further comprises:
a second transmission member and a third transmission member located between the first frame and the second frame;
a first support member in which the first frame and the second frame are hinged thereto; and
a second support member and a third support member located between the first frame and the second frame.

3. The door assembly according to claim 2, wherein:
the second support member is parallel to the first support member, and is mounted with the third transmission member; and
the third support member is parallel to a surface normal of both panels of the door pieces, and is mounted with the first transmission member and second transmission member;
with the third transmission member being engaged with the second transmission member; and
the first transmission member being engaged to the serrated surface profiles of both frames of the door pieces;
for a rotation by the third transmission member to be transferred to the second transmission member to cause the first transmission member to actuate both door pieces to rotate with respect to the first support member for them to meet or separate.

4. The door assembly according to claim 2, wherein:
the plurality of transmission members further comprises a fourth transmission member, a fifth transmission member, and a sixth transmission member located between the first frame and the second frame; and
a fourth support member and a fifth support member located between the first frame and the second frame.

5. The door assembly according to claim 4, wherein:
the second support member is parallel to the first support member, and is mounted with the third transmission member;
the third support member is parallel to a surface normal of the first panel, and is mounted with the first transmission member and second transmission member;
the fourth support member is parallel to the first support member, and is mounted with the sixth transmission member;
the third support member is parallel to a surface normal of the second panel, and is mounted with the fourth transmission member and fifth transmission member;
with:
the third transmission member being engaged to the second transmission member;
the first transmission member being engaged to the serrated surface profile of the first frame;
the sixth transmission member being engaged to the fifth transmission member; and
the fourth transmission member being engaged to the serrated surface profile of the second frame;
for a rotation by the third transmission member or sixth transmission member to be transferred to the second transmission member or the fourth transmission member to cause the first transmission member to actuate the first door piece to rotate with respect to the first support member, or the fourth transmission member to actuate the second door piece to rotate with respect to the first support member, for the door pieces to meet or separate.

6. The door assembly according to claim 1, wherein:
the first door piece is formed by an arc periphery of the first frame being joined to a concave portion of the first panel laterally at a first end of the first panel; and
the second door piece is formed by an arc periphery of the second frame being joined to a concave portion of the laterally at a first end of the second panel.

7. The door assembly according to claim 6, wherein:
the first panel further comprises a serrated surface profile that is formed at a distance away from its first end; and
the second frame further comprises an arcuate member at a distance away from its arc periphery and facing towards the first end of the second panel, with the arcuate member having a serrated surface profile;
wherein the arcuate member is positioned above the serrated surface profile of the second panel for the serrated surface profile of the arcuate member to be aligned thereto.

8. The door assembly according to claim 7, wherein the actuation mechanism further comprises:
a first support member in which the first frame and the second frame are hinged thereto; and
a second support member located between the first frame and the second frame.

9. The door assembly according to claim 8, wherein:
the second support member is parallel to the first support member, and is mounted with the first transmission member;
with the first transmission member being engaged to both the serrated surface profile of the first panel and the serrated surface profile of the arcuate member;
for a rotation by the first transmission member to actuate both door pieces to rotate with respect to the first support member for them to meet or separate.

10. The door assembly according to claim 9, wherein:
the second panel further comprises a serrated surface profile that is formed at a distance away from its first end.

11. The door assembly according to claim 10, wherein the actuation mechanism further comprises:
a second transmission member located between the first frame and the second frame;
a first support member in which the first frame and the second frame are hinged thereto; and
a second support member and a third support member located between the first frame and the second frame.

12. The door assembly according to claim 11, wherein:
the second support member is parallel to the first support member, and is mounted with the first transmission member; and the third support member is parallel to the first support member, and is mounted with the second transmission member;

with the first transmission member being engaged to the serrated surface profile of the first panel, and the second transmission member being engaged to the serrated surface profile of the second panel;

for a rotation by the first transmission member or the second transmission member to actuate the first door piece to rotate with respect to the first support member, or the second door piece to rotate with respect to the first support member, for the door pieces to meet or separate.

13. The door assembly according to claim 1, wherein:
the first frame has a first radial periphery and a second radial periphery; and
the second frame has a first radial periphery and a second radial periphery.

14. The door assembly according to claim 13, wherein the first frame and the second frame have an angle formed therebetween as the door pieces are actuated to either meet or separate, with the angle being formed between the first radial periphery of the first frame and the second radial periphery of the second frame; or
being formed between the second radial periphery of the first frame and the first radial periphery of the second frame.

15. An aerial vehicle, comprising:
a fuselage formed with at least one access portion; and
at least one door assembly that corresponds to the access portion that enables opening or closing of the access portion, comprising:
a pair of complementary door pieces; and
an actuation mechanism that includes a first transmission member;
wherein the first transmission member actuates either one or both door pieces to counter-rotate for portions thereof to be in a sliding action with respect to the fuselage while maintaining close conformity thereto as either one or both of them are actuated to either meet or separate so that
the door pieces scoop staged delivery goods, for the delivery goods to be supported thereon them and enter the fuselage through the access portion, as they are actuated to meet; and
the door pieces release the delivery goods supported thereon from the fuselage as they are actuated to separate;
wherein the door pieces comprise a first door piece that includes a first frame and a first panel, and a second door piece that includes a second frame and a second panel;
wherein the first door piece is formed by an arc periphery of the first frame being joined to a concave portion of the first panel laterally at a first end of the first panel, and the second door piece is formed by an arc periphery of the second frame being joined to a concave portion of the second panel laterally near a first end of the second panel;
wherein the first frame further comprises a serrated surface profile that is formed a distance away from its arc periphery and facing away from the first end of the first panel, and the second frame further comprises a serrated surface profile that is formed a distance away from its arc periphery and facing towards the first end of the second panel.

16. A system for delivering goods, comprising:
an aerial vehicle that comprises:
a fuselage formed with at least one access portion; and
at least one door assembly that corresponds to the access portion that enables opening or closing of the access portion, comprising:
a pair of complementary door pieces; and
an actuation mechanism that includes a first transmission member;
wherein the first transmission member actuates either one or both door pieces to counter-rotate for portions thereof to be in a sliding action with respect to the fuselage while maintaining close conformity thereto as either one or both of them are actuated to either meet or separate so that
the door pieces scoop staged delivery goods, for the delivery goods to be supported thereon them and enter the fuselage through the access portion, as they are actuated to meet; and
the door pieces release the delivery goods supported thereon from the fuselage as they are actuated to separate;
wherein the door pieces comprise a first door piece that includes a first frame and a first panel, and a second door piece that includes a second frame and a second panel;
wherein the first door piece is formed by an arc periphery of the first frame being joined to a concave portion of the first panel laterally at a first end of the first panel, and the second door piece is formed by an arc periphery of the second frame being joined to a concave portion of the second panel laterally near a first end of the second panel;
wherein the first frame further comprises a serrated surface profile that is formed a distance away from its arc periphery and facing away from the first end of the first panel, and the second frame further comprises a serrated surface profile that is formed a distance away from its arc periphery and facing towards the first end of the second panel.

17. A fuselage, for an aerial vehicle, which formed with at least one access portion, with an opening or closing of the access portion being enabled by a corresponding door assembly of the access portion, the door assembly comprising a pair of complementary door pieces and an actuation mechanism that includes a first transmission member;
wherein the first transmission member actuates either one or both door pieces to counter-rotate for portions thereof to be in a sliding action with respect to the fuselage while maintaining close conformity thereto as either one or both of them are actuated to either meet or separate so that
the door pieces scoop staged delivery goods, for the delivery goods to be supported thereon them and enter the fuselage through the access portion, as they are actuated to meet; and
the door pieces release the delivery goods supported thereon from the fuselage as they are actuated to separate;
wherein the door pieces comprise a first door piece that includes a first frame and a first panel, and a second door piece that includes a second frame and a second panel;
wherein the first door piece is formed by an arc periphery of the first frame being joined to a concave portion of the first panel laterally at a first end of the first panel, and the second door piece is formed by an arc periphery of the second frame being joined to a concave portion of the second panel laterally near a first end of the second panel;

wherein the first frame further comprises a serrated surface profile that is formed a distance away from its arc periphery and facing away from the first end of the first panel, and the second frame further comprises a serrated surface profile that is formed a distance away from its arc periphery and facing towards the first end of the second panel.

18. A door assembly for a fuselage of an aerial vehicle, comprising:

a pair of complementary door pieces; and an actuation mechanism that includes a first transmission member;

wherein the first transmission member actuates either one or both door pieces for portions thereof to be in a sliding action with respect to the fuselage while maintaining close conformity thereto as either one or both of them are actuated to either meet or separate;

wherein the actuation mechanism enables the door pieces to counter-rotate for:

the door pieces to scoop staged delivery goods, so that the delivery goods are supported thereon them, as they are actuated to meet; and the door pieces to release the delivery goods supported thereon, as they are actuated to separate;

wherein the door pieces comprise a first door piece that includes a first frame and a first panel, and a second door piece that includes a second frame and a second panel;

wherein the first door piece is formed by an arc periphery of the first frame being joined to a concave portion of the first panel laterally at a first end of the first panel, and the second door piece is formed by an arc periphery of the second frame being joined to a concave portion of the laterally at a first end of the second panel;

wherein the first panel further comprises a serrated surface profile that is formed at a distance away from its first end, and the second frame further comprises an arcuate member at a distance away from its arc periphery and facing towards the first end of the second panel, with the arcuate member having a serrated surface profile;

wherein the arcuate member is positioned above the serrated surface profile of the second panel for the serrated surface profile of the arcuate member to be aligned thereto.

19. A door assembly for a fuselage of an aerial vehicle, comprising:

a pair of complementary door pieces; and an actuation mechanism that includes a first transmission member;

wherein the first transmission member actuates either one or both door pieces for portions thereof to be in a sliding action with respect to the fuselage while maintaining close conformity thereto as either one or both of them are actuated to either meet or separate;

wherein the actuation mechanism enables the door pieces to counter-rotate for:

the door pieces to scoop staged delivery goods, so that the delivery goods are supported thereon them, as they are actuated to meet; and the door pieces to release the delivery goods supported thereon, as they are actuated to separate;

wherein the door pieces comprise a first door piece that includes a first frame and a first panel, and a second door piece that includes a second frame and a second panel;

wherein the first panel further comprises a serrated surface profile that is formed at a distance away from its first end, and the second panel further comprises a serrated surface profile that is formed at a distance away from its first end.

* * * * *